(12) United States Patent
Vangeel et al.

(10) Patent No.: US 10,349,494 B2
(45) Date of Patent: Jul. 9, 2019

(54) SYSTEMS AND METHODS FOR LIGHTING CONTROL

(71) Applicant: SIGNIFY HOLDING B.V., Eindhoven (NL)

(72) Inventors: Jurgen Mario Vangeel, Beerse (BE); Mark Henricus Verberkt, Eindhoven (NL); Peter Fitski, Helmond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/647,529

(22) Filed: Jul. 12, 2017

(65) Prior Publication Data

US 2018/0077778 A1    Mar. 15, 2018

Related U.S. Application Data

(63) Continuation of application No. 14/865,849, filed on Sep. 25, 2015, now Pat. No. 9,730,298.

(30) Foreign Application Priority Data

Sep. 29, 2014 (IN) .......................... 4854/CHE/2014
Nov. 28, 2014 (EP) ..................................... 14195337

(51) Int. Cl.
| | |
|---|---|
| *H05B 37/02* | (2006.01) |
| *H05B 39/04* | (2006.01) |
| *H05B 41/36* | (2006.01) |
| *G05B 15/02* | (2006.01) |
| *H04B 10/116* | (2013.01) |
| *G06F 8/654* | (2018.01) |
| *F24F 11/30* | (2018.01) |
| *F24F 11/62* | (2018.01) |

(Continued)

(52) U.S. Cl.
CPC .......... *H05B 37/0245* (2013.01); *F24F 11/30* (2018.01); *F24F 11/62* (2018.01); *G05B 15/02* (2013.01); *G05B 19/04* (2013.01); *G06F 8/654* (2018.02); *G06F 8/658* (2018.02); *H04B 10/116* (2013.01); *H04L 67/34* (2013.01); *H05B 33/0845* (2013.01); *H05B 33/0857* (2013.01); *H05B 37/02* (2013.01); *H05B 37/029* (2013.01); *H05B 37/0218* (2013.01); *H05B 37/0227* (2013.01); *H05B 37/0254* (2013.01); *H05B 37/0263* (2013.01); *H05B 37/0272* (2013.01); *G05B 2219/163* (2013.01); *G05B 2219/2642* (2013.01); *H04B 10/502* (2013.01); *Y02B 20/44* (2013.01)

(58) Field of Classification Search
None
See application file for complete search history.

(56) References Cited

U.S. PATENT DOCUMENTS 5,357,170 A * 10/1994 Luchaco ................ H05B 37/02
                                                                  315/149
2011/0160881 A1    6/2011 Grey
(Continued)

FOREIGN PATENT DOCUMENTS

WO    2014060903 A1    4/2014

*Primary Examiner* — Anh Q Tran
(74) *Attorney, Agent, or Firm* — Meenakshy Chakravorty

(57) ABSTRACT

Lighting units, systems, and methods are described herein for determining whether occupancy detections are legitimate or not. Methods and systems are further described herein for powering down a network of power over ethernet (PoE) components.

8 Claims, 35 Drawing Sheets

(51) Int. Cl.
  *G06F 8/658*   (2018.01)
  *H04L 29/08*   (2006.01)
  *G05B 19/04*   (2006.01)
  *H05B 33/08*   (2006.01)
  *H04B 10/50*   (2013.01)

(56) References Cited

U.S. PATENT DOCUMENTS

| | | |
|---|---|---|
| 2012/0143357 A1 | 6/2012 | Chemel et al. |
| 2012/0153568 A1 | 6/2012 | Grey et al. |
| 2013/0069542 A1 | 3/2013 | Curasi et al. |
| 2014/0088904 A1 | 3/2014 | Covaro |
| 2014/0245071 A1 | 8/2014 | Drees et al. |
| 2015/0305123 A1* | 10/2015 | Vora .................. H05B 37/0272 315/153 |

* cited by examiner

SYSTEMS AND METHODS FOR LIGHTING CONTROL

CROSS REFERENCE TO RELATED APPLICATIONS

This application is a Continuation of U.S. patent application Ser. No. 14/865,849, which claims the benefit of priority from Indian Patent Application No. 4854/CHE/2014, filed Sep. 29, 2014, and EP Patent Application No. 14195337.2, filed Nov. 28, 2014.

TECHNICAL FIELD

The present invention is directed generally to the management of environmental conditions within physical structures. More particularly, various inventive systems and methods disclosed herein relate to adjusting environmental conditions such as lighting conditions, temperature, and humidity based on automatically and manually generated requests. Some inventive systems and methods disclosed herein also relate to monitoring energy consumption and the utilization of resources within physical structures, and adjusting system behavior accordingly.

BACKGROUND

Digital lighting technologies, i.e. illumination based on semiconductor light sources, such as light-emitting diodes (LEDs), offer a viable alternative to traditional fluorescent, HID, and incandescent lamps. LEDs offer many advantages, including controllability, high energy conversion and optical efficiency, durability, and lower operating costs. Recent advances in controllable LED technology have provided efficient and robust full-spectrum lighting sources that enable a variety of lighting effects in many applications.

Alongside the development of controllable LEDs, rapid developments have been made in the area of sensor technologies. Sensors todays are not only able to effectively measure natural illumination and occupancy, but have also become significantly smaller, and therefore able to easily fit inside small devices, including devices housing controllable LEDs and cameras. For example, existing natural illumination based lighting control systems are able to employ individually controllable luminaires with dimming ballasts as well as one or more natural illumination photo sensors to measure the average workplane illumination within a naturally illuminated space. In such systems, one or more controllers, in order to respond to daylight egress and maintain a minimum workplane illumination, may monitor the output of one or more photosensors and control illumination provided by the luminaires.

More recently, innovations in the realms of wireless communication and smart mobile devices have launched a generation of smart phones and tablet computers with unparalleled mobility and computational power. For example, mobile smart phones with access to applications on cloud servers are able to gather, and process data from their immediate environments in real time. Additionally, location-based services allow for the customization of information delivered to mobile devices. Smart mobile devices, used in conjunction with controllable LEDs and appropriate sensors can therefore be used to customize illumination in physical spaces in real time.

Today, two other significant technological developments present even greater opportunities for innovations in the area of environmental management and control: Power over Ethernet (PoE) and Coded Light (CL). PoE allows for the delivery of electrical power along with data over a single cable to devices such as lighting devices, IP cameras or wireless access points. The advent of PoE technology makes it feasible to power devices in remote locations within building structures, by significantly reducing the need for electricians to install conduit, electrical wiring, and outlets. Unlike other devices, the potential location of a PoE device is not limited based on the placement of AC outlets within a structure. For example, PoE allows wireless LAN access points to be placed on ceilings for more optimal RF reception.

CL technology can be used to embed unique identifiers, or codes, into the light output from different light sources. Using these identifiers, the light emanating from a specific light source can be differentiated even in the presence of illumination contributions from multiple other light sources. CL can therefore be used to identify and locate individual light sources and devices relative to other such sources and devices. The use of light as a means for device identification, location and communication opens the door to innovative systems and methods for managing environmental conditions by allowing fine-grained interactions between devices such as individually controllable LEDs, sensors, and control devices such as smart phones that were not previously feasible.

Existing systems and methods for managing environmental conditions within physical structures do not simultaneously leverage the benefits of the aforementioned technologies. Some existing systems merely utilize controllable LEDs and sensors to automatically control lighting in areas such as offices and living rooms in response to changes in, for example, occupancy and natural illumination in the area. Other existing systems provide mobile applications that allow users to remotely control the behavior of lighting devices within such spaces. But no existing system provides the hardware and software infrastructure necessary to effectively manage the complex interaction of a multitude of PoE and CL enabled devices (e.g. lighting devices and heating, ventilation, and air conditioning, or "HVAC", appliances), smart mobile controllers, wall-mounted controllers, and sensors monitoring the activity and environmental conditions in large facilities such as office buildings. The effective management of environmental conditions within such spaces poses several unique technological challenges discussed below. The embodiments disclosed herein offer solutions to these and other challenges.

Large office buildings or other large commercial buildings usually have areas that are used for a variety of purposes. An office building may have conference or meeting rooms, large open-plan spaces with a multitude of cell offices, hallways, cafeterias, and auditoriums. Some of these areas may be generally used for group discussions or large presentations (e.g. conference rooms and auditoriums), while others may be used for individual work (e.g. cell offices). Given their different purposes, some modes of controlling environmental conditions (e.g. personalized control) may therefore be better suited to some areas (e.g. cell offices) rather than other areas (auditoriums and cafeterias). Unlike single family homes or apartments, large office buildings also accommodate sizable numbers of individuals, often in close quarters. These individuals may have differing and often conflicting interests regarding environmental conditions they wish to create in the spaces they occupy. When the same space is being used by different individuals, therefore, it is crucial to resolve conflicting requests to adjust environmental conditions in a meaningful rather than arbitrary way. Moreover, the amount of control a user may be allowed to exert in any space may depend on his or her role within an organization. It may be problematic, for example, if an employee attending a presentation in a large auditorium is able to use an application on his/her smart phone to change lighting conditions in the whole auditorium at any time.

Managing environmental conditions inside large structures therefore involves effectively prioritization and coordinating the potentially numerous concurrent control requests arising from a large number of stationary and mobile controllers representing a variety of users. These requests would need to be successfully routed to appropriate lighting devices and HVAC appliances in order to produce the requested changes within a time frame that also reasonably meets user expectations.

The variety of lighting and HVAC devices/appliances that typically operate in large buildings presents another fundamental challenge to any system for controlling environmental conditions. These devices do not all produce data in the same format, nor do they all support communications over the same protocols. Yet, under many circumstances, it may be necessary for these devices to communicate with each other, directly or through intermediate modules. To ensure that devices are able to communicate with each other, either direct or indirectly, when necessary, systems for managing environmental conditions will need to provide the means necessary for such communication to occur.

Yet another challenge facing systems for managing environmental conditions is that once the numerous sensor, control and other devices and system components are installed and operational within a large structure, new devices designed to produce or receive data in formats not supported by the system become available. For systems for managing environmental conditions in large structures, this problem is even more acute since these systems likely utilize many more types of devices as compared to simpler systems for managing environmental conditions in smaller spaces such as residential homes. Such larger-scale systems will need to be adaptable enough to accommodate the use of such new devices in order to be able to take advantage of improvements in technology. As a result, it is very important that these systems are designed to be easily extensible to accommodate new devices and technologies so that they may be integrated into the system with minimal effort and without undue disruption to the operation of the system.

Although existing systems for managing environmental conditions in relatively smaller spaces, such as in apartments or homes, may monitor device usage for a variety of reasons, the amount of such usage data generated by such systems is relatively small. By contrast, a large building or structure will likely generate large amounts of usage data due to the large numbers of devices (lighting and HVAC devices and sensors) in these structures. This data will need to be gathered, categorized and analyzed in order for the system to gain any useful insights for use in, for example, fine tuning existing energy conservation strategies. In order to make good use of the data, without overwhelming or degrading the performance of the system as a whole, a system for managing environmental conditions in a large structure needs to be designed to accommodate the potentially large influx of usage data. Some such systems may be designed such that the management of usage data is significantly decentralized. For example, device usage data gathered from different floors of a building may be managed by separate modules using separate data storage facilities.

Lastly, while there are privacy issues surrounding the management of usage data in smaller settings, the issues are not comparable in scale to the privacy issues that must be dealt with in much larger settings. For example, an environment management system designed for a residential setting such as an apartment may only have a few individual users whose personal information needs to be handled in a manner that does not create risk of disclosure to unintended parties. By contrast, a large entity occupying a large office space may have hundreds of users who frequent the space, accessing various system components via a multitude of user interfaces on a variety of devices, including their personal mobile devices. For example, the use of personal mobile computing devices as controllers for CL enabled lighting and other devices can result in, for example, useful but sensitive associations between a user's identity and particular frequented spaces. Accordingly, the design of environment management systems for deployment in large structures needs to provide for the implementation of strategies to prevent both unauthorized access to such sensitive information from within the system itself (e.g. one system user accessing information on the whereabouts of another), and from outside the system (e.g. cyber security breaches exposing such sensitive information to the outside world).

In environments in which multiple intelligent lighting units are deployed, each lighting unit may be configured and/or commissioned to operate in a particular way in order to fulfill a particular role. For example, multiple lighting units may be pointed towards a particular point of interest, such as a piece of art. Each of those lighting units may be configured to emit light having various properties selected, for instance, to increase visual appeal of the piece of art. In some scenarios, two lighting units may output light having disparate properties that are selected to complement one another and/or to illuminate the piece of art (or another point of interest) in a particular way. If one of the two lighting units malfunctions or is otherwise rendered inoperative, light emitted by the remaining lighting unit may no longer be satisfactory. In other scenarios, a particular intelligent lighting unit may include (or be in communication with) a presence sensor. When that presence sensor raises a presence signal, the intelligent lighting unit may energize in a particular way. However, if the intelligent lighting unit is inoperative, it may no longer energize in response to a presence signal (or may not even detect the signal).

No matter the scenario, to replace an inoperative intelligent lighting unit that previously played a particular role within a plurality of lighting units, the replacement intelligent lighting unit must be commissioned with the same lighting operation parameters as the replaced lighting unit, in order to perform the same role formerly played by the replaced lighting unit. Manually commissioning replacement lighting units can be cumbersome and/or impractical, especially in large installations. Techniques exist for utilizing a central backup server to automate the process of commissioning replacement lights. However, such servers may be too expensive to justifiably install in a relatively small installation, may constitute a single point of failure, may require sophisticated and/or arduous maintenance, and/or may require that intelligent lighting units be configured to communicate over networks otherwise used primarily for computer data, which could, for instance, expose those intelligent lighting units to cyberattacks.

No existing system for managing environmental conditions provides solutions to at least the aforementioned challenges. The systems and methods presented below provide solutions designed to address these and other challenges.

SUMMARY

Various embodiments are directed herein to systems and methods for managing environmental conditions within a physical structure, in order to address the problems set forth in the previous section. This section presents a simplified summary of some of these methods and systems in order to provide a basic understanding of various system components, the interaction between such components, and the various steps involved in various embodiments. This summary is not intended as an exhaustive overview of all inventive embodiments. The system components and method steps described in this section are not necessarily critical components or steps. The purpose of this summary section is to present an overview of various concepts in a more simplified form, as an introduction to the detailed description that follows.

In one aspect, a lighting unit may include: one or more light sources; one or more occupancy sensors; and a control module. In various embodiments, the control module may be configured to: receive, from the one or more occupancy sensors, a signal indicative of detection, by the one or more occupancy sensors, of occupancy near the lighting unit; determine one or more occupancy states of one or more remote lighting units within a given proximity of the lighting unit; determine an occupancy history associated with the lighting unit; calculate, based on the one or more occupancy states and the detected occupancy history, a likelihood that the detection of occupancy by the one or more occupancy sensors is legitimate; and set an occupancy state of the lighting unit based on the calculated likelihood.

In various embodiments, the occupancy history may include records of legitimate detections of occupancy by the one or more occupancy sensors. In various embodiments, the occupancy history may include records of illegitimate detections of occupancy by the one or more occupancy sensors. In various embodiments, the control module may be configured to set the occupancy state of the lighting unit to an occupied state in response to a determination that the calculated likelihood satisfies a threshold. In various embodiments, the control module may be further configured to energize the one or more light sources while the lighting unit is in the occupied state. In various embodiments, the control module may be configured to disregard the one or more signals in response to a determination that the calculated likelihood fails to satisfy a threshold.

In various embodiments, the lighting unit may further include a communication interface operably coupled with the control module. In various versions, the control module may be further configured to receive data indicative of the one or more occupancy states of the one or more remote lighting units via the communication interface. In various versions, the control module may be further configured to receive data indicative of the occupancy history via the communication interface. In various embodiments, the lighting unit may further include memory operably coupled with the control module, wherein the memory stores the occupancy history.

In another aspect, a method of powering down a network of power over ethernet (PoE) components may include: transmitting, from a PoE component installed in an area to an area controller, data indicative that the PoE component has not detected occupancy for a first threshold amount of time; awaiting, by the area controller for a second threshold amount of time, a transmission, by one or more PoE components installed in the area, of data indicative of occupancy detection; transmitting, from the area controller to a floor controller after passage of the second threshold amount of time, data indicative that the area controller has not detected occupancy for the second threshold amount of time; awaiting, by the floor controller for a third threshold amount of time, a transmission, by one or more area controllers monitored by the floor controller, of data indicative of occupancy detection by the one or more area controllers; and transmitting, from the floor controller to a PoE switch after passage of the third threshold amount of time without receiving data indicative of occupancy detection by the one or more area controllers, a command to power down one or more PoE components.

In various embodiments, the PoE component is a luminaire equipped with an occupancy detection sensor. In various embodiments, the method may further include stopping, by the gateway module in response to the data indicative that the floor controller has not detected occupancy for the third threshold amount of time, metric collection pertaining to the one or more PoE components installed in the area.

Other embodiments may include a non-transitory computer readable storage medium storing instructions executable by a processor to perform a method such as one or more of the methods described herein. Yet other embodiments may include a system including a memory and one or more processors operable to execute instructions, stored in the memory, to perform a method such as one or more of the methods described herein.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED.

For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above). A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The terms "lighting fixture" and "luminaire" are used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two devices, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user" as user herein refers to any entity, human or artificial, that interacts with systems and methods described herein. For example, the term includes, without limitation, occupants of a space such as an office worker or visitor, remote users of a space, a facility manager, a commissioning engineer, a building IT manager, a service engineer, and an installer.

The term "lighting operation parameters" may refer to information that guides operation and/or behavior of a lighting unit. Particularly in the present context, lighting operation parameters may be thought of as a "role" the lighting unit is to play among a plurality of lighting units. Lighting operation parameters may include myriad lighting parameters. For example, one or more characteristics of light to be emitted, such as intensity, saturation, hue, temperature, dynamic lighting patterns, and so forth, may be included in lighting operation parameters. Lighting operation parameters may additionally or alternatively include one or more rules to guide a lighting unit's operation and/or behavior. These rules may, for instance, dictate when a lighting unit emits light, how it emits light, where it emits light, and so forth. Additionally or alternatively, lighting operation parameters may identify one or more sensors that may produce signals to which a lighting unit is to respond to by selectively energizing one or more light sources. For example, lighting operation parameters may identify one or more motion sensors, light sensors (e.g., daylight, infrared), pressure wave sensors, haptic sensors, and so forth, and may also include one or more instructions as to how a lighting unit should energize its one or more light sources in response to signals from these one or more sensors.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Reference is now made in detail to illustrative embodiments of the invention, examples of which are shown in the accompanying drawings.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known systems, apparatuses and methods may be omitted so as to not obscure the description of the representative embodiments. Such systems, methods and apparatuses are clearly within the scope of the present teachings.

Figure 1A:
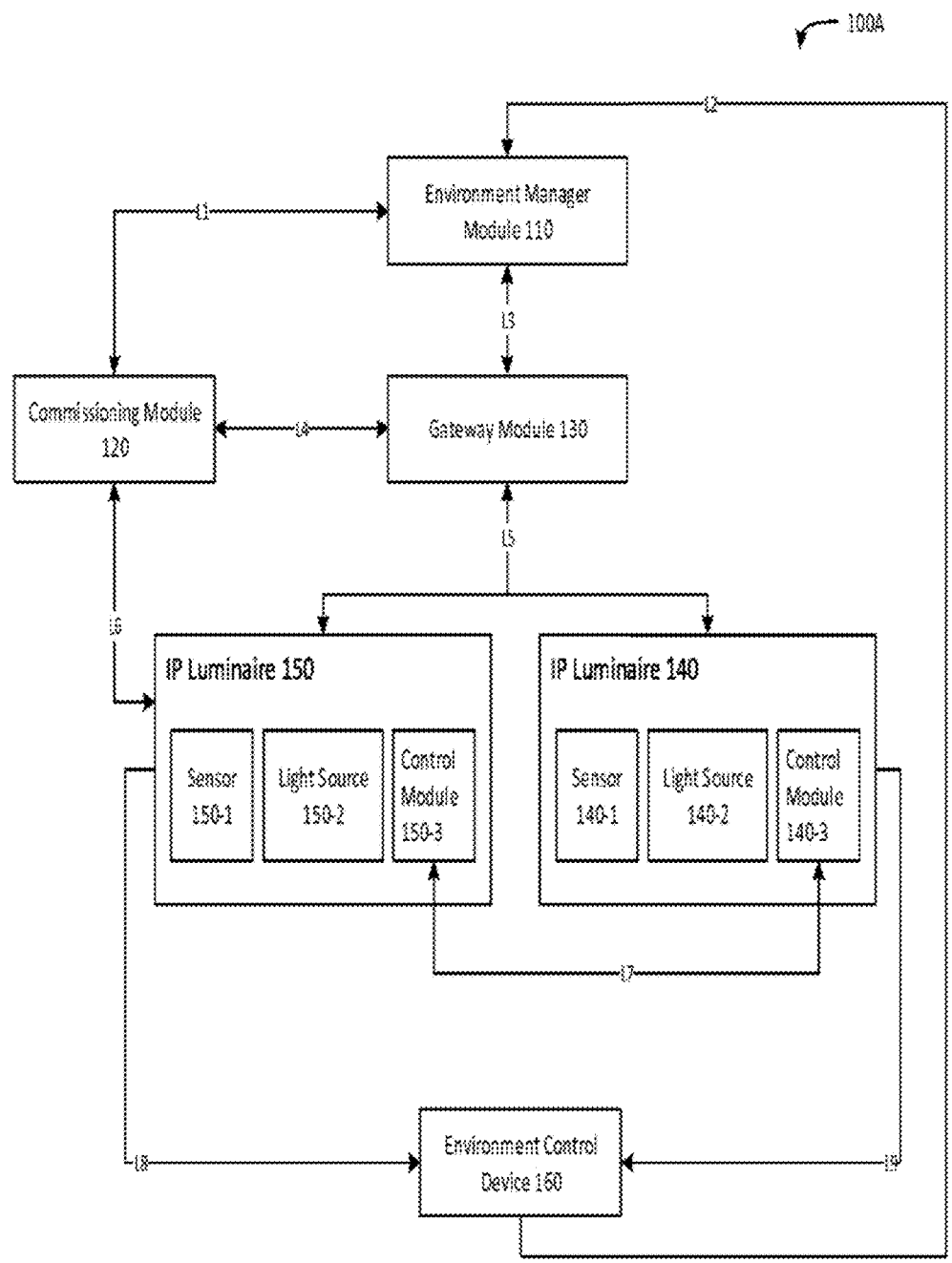
FIG. 1A illustrates a block diagram of an embodiment of a system for managing environmental conditions within a physical structure, the embodiment comprising several modules, two IP luminaires and an environment control device.

FIG. 1A illustrates a system 100A for managing environmental conditions within a physical structure. The system includes an environment manager module 110, a commissioning module 120, a gateway module 130, IP luminaires 140 and 150 and an environment control device 160. Other embodiments of system 100A may include additional or fewer environmental manager modules, IP luminaires, commissioning modules, gateway modules and/or environment control devices. The components of system 100A are communicatively linked using links L1 through L9, as depicted in FIG. 1. The term "physical structure" as used herein refers to any building structure, whether or not freestanding, permanent, enclosed, or covered. This term includes for example, office, residential, recreational, educational, governmental, and commercial buildings and complexes, as well as parking lots and garages. The term "link" as used herein refers to any connection or component that enables the communication of information between at least two system components. For example, a link includes a wired or wireless communications connection, a radio frequency communications connection, and an optical communications connection. A link may also indicate a shared communication protocol, software or hardware interface, or remote method invocations or procedure calls.

Environment manager module 110 may be implemented in hardware, any combination of hardware and computer code (e.g. software or microcode), or entirely in computer code. This module may be executed on one or multiple processors.

In some embodiments, environment manager module 110 may provide an Interactive System Productivity Facility (ISPF) based central monitoring and management dashboard. Environment manager module 110 may additionally or alternatively provide interactive user interfaces for various features such as the visualization of current lighting or other environmental statuses within system 100A, visualization of occupancy information at various levels of granularity, visualization of energy consumption information at various levels of granularity, and visualization of alarms.

Figure 4A:
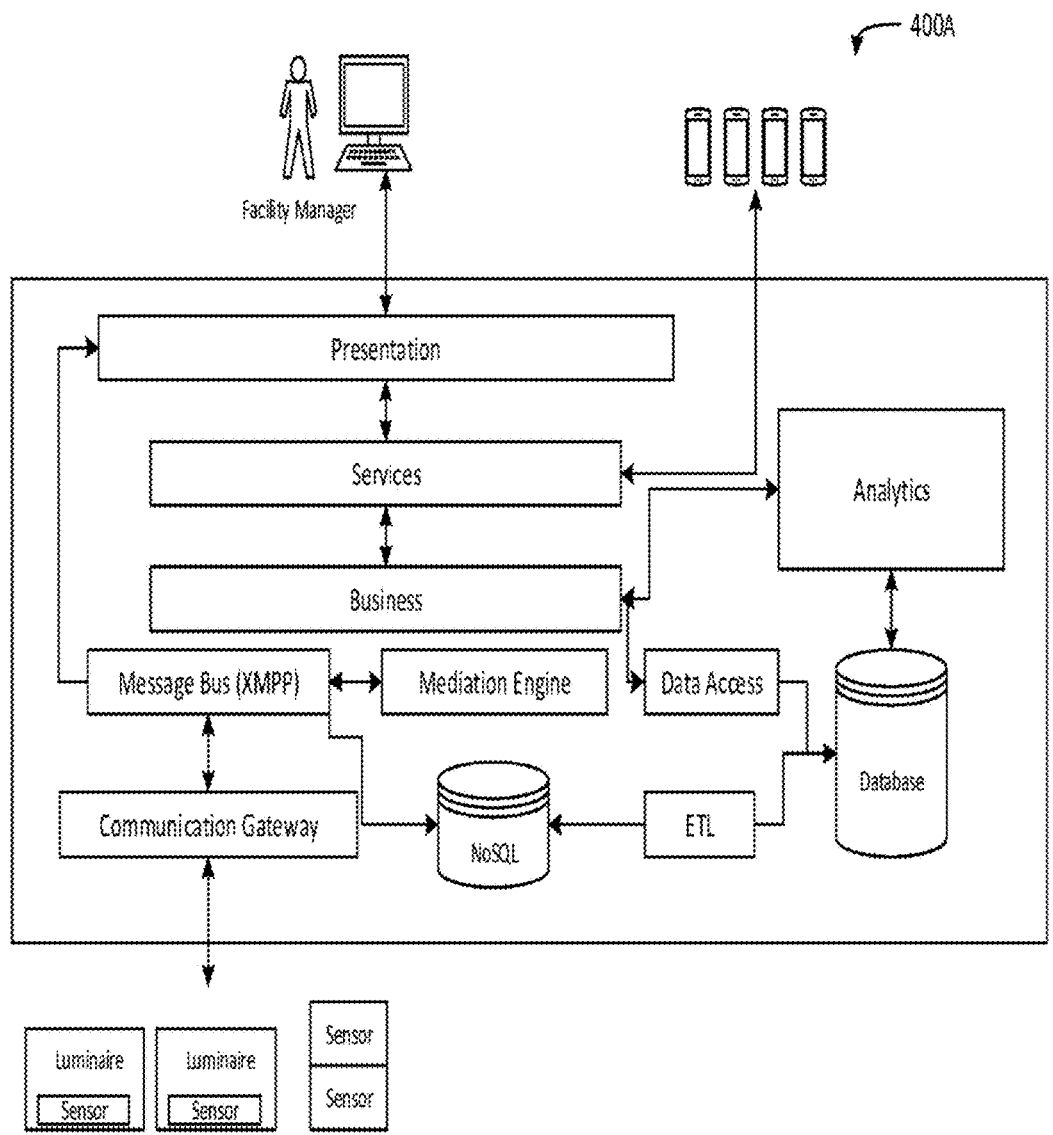
FIG. 4A illustrates a block diagram of components of an embodiment of an environment manager module, along with other devices and components with which the environment manager module is communicatively connected.

In some embodiments, manager module 110 may receive personal control commands (e.g. related to light level and temperature) from smart phone applications and translate such commands into lighting control and/or heating, ventilating, and air conditioning ("HVAC") control commands, manage system-wide lighting control, and manage scheduling of tasks. Environment manager module 110 may also participate in software updates, manage monitoring data such as data related to energy consumption and occupancy, and manage alarms and other system health diagnostic data. FIG. 4A illustrates various components of an embodiment of an environment manager module, and the description of FIG. 4A provides further details on this module. Additional details on functional and other aspects of environment manager modules such as the environment manager module 110 may be found throughout the specification.

As depicted in FIG. 1A, environment manager module 110 may be configured to receive information from environment control device 160 via link L2. L2 may be, for example, a personal control interface for a smart phone. Environment manager module 110 may also be configured to communicate with commissioning module 120 via link L1. L1 may, in some instances, facilitate the communication of commissioning module project files. In some embodiments, L1 may also represent an XML database with extensions for xCLIP compatible luminaires. Lastly, manager module 110 is also able to communicate with gateway module 130 via link L3. L3 represents, according to some embodiments, the EnvisionIP interface. Various links (e.g., L1, L2, L3, etc.) described herein may be configured to facilitate communication between components using one or more of various technologies, including but not limited to ad hoc technologies such as ZigBee, coded light, Ethernet, RS485, wireless (e.g., Wi-Fi, BlueTooth), and so forth.

Commissioning module 120 may be implemented in hardware, any combination of hardware and computer code (e.g. software or microcode), or entirely in computer code. This module may be executed on one or multiple processors. In many embodiments of system 100A, commissioning module 120 is used to commission devices such as IP luminaires/intelligent lighting units, switches and/or sensors. Commissioning module 120 may also be used to prepare a floor plan for a space, discover and associate devices with system 100A, localize devices by, for example, coded light detection techniques. It may also be used for pre-commissioning system 100A and the devices associated with it. For example, commissioning module 120 may be used for creating groups of devices and allocating spaces within a structure for specific purposes. In many embodiments of system 100A, commissioning module 120 may be used to commission devices such as IP luminaires/intelligent lighting units, and control devices, by, for example, localizing devices in accordance with prepared floor plans, programming lighting scenes, configuring device and control parameters, and calibrating sensors. Commissioning module 120 may also be used to for performing software updates. Other functionality associated with commissioning module 120 may be found throughout the specification, and particularly in the description associated with FIG. 5.

As depicted in FIG. 1A, commissioning module 120 is able to communicate with environment manager module 110 via link L1, gateway module 130 via link L4, with IP luminaire 150 via link L6. L1 has been described above in connection with the description of environment manager module 110. In many embodiments, L4 may represent an EnvisionIP or xCLIP interface, and L6 may represent an EnvisionIP interface.

Gateway module 130 may be implemented in hardware, any combination of hardware and computer code (e.g. software or microcode), or entirely in computer code. This module may be executed on one or multiple processors. In some embodiments, a hardware implementation of gateway module 130 may involve an STM32 chip. Gateway module 130 may be associated with a particular space (e.g., a floor) of a physical structure, and may send and/or receive data from multiple devices such as IP luminaires and/or intelligent lighting units located on that floor. In some embodiments, gateway module 130 may send and/or receive data from more than 1000 devices such as IP luminaires, sensors and HVAC devices.

Gateway module 130 may be configured to provide a variety of functions. For example, it may provide a gateway between an EnvisionIP interface for use in commissioning luminaires and the RS-485 standard, as well as provide services for translating various application and network protocols. In many embodiments, it may also facilitate the routing of data between multiple gateway modules within system 100A, and participate in system diagnostics and/or hardware roll calls during which the gateway module 130 may determine whether or not devices under its control are still online. Gateway module 130 may also be configured to cache and/or report offline devices to various other components, such as environment manager module 110. Gateway module 130 may also be responsible for local scheduling tasks and the management of monitoring and diagnostic data. For example, gateway module 130 may monitor one or more areas within a physical structure for energy consumption and occupancy, and diagnose and report system health information on the area level. It may also store area monitoring information.

In some embodiments, gateway module 130 monitors all traffic in a part of the system, including DyNet and EnvisionIP traffic. It may store and/or cache this information, and forward it to the environment manager module 110 so that the environment manager module has an exact overview of the state of all the commissioned devices at any given time. With respect to scheduling, time critical events may be forwarded by gateway module 130 to the environment manager module 110 immediately, while events that are not time critical may be locally cached and uploaded to the manager module 110 in batches. In cases where the manager module 110 cannot be reached, all events may be locally cached and uploaded to the manager module 110 when it becomes reachable again. Gateway module 130 may also interface with an HVAC system associated with system 100A, and discover new devices. In many embodiments, multiple gateway modules such as gateway module 130 may be communicatively linked with a single environment manager module 110, where each gateway module 130 acts as a floor controller for a particular floor of a building. In many embodiments, gateway module 130 may also: log and store all or a subset of received environment control commands; log and report all events and state changes within the system back to environment manager module 110, send commands coming from the commissioned units that this gateway module 130 controls and/or monitors to another gateway module that controls and/or monitors another part of the system (common area send responsibility); send commands coming from another gateway module that controls and/or monitors another part of the system to the commissioned units that this gateway module 130 controls and/or monitors (common area receive responsibility); (transparently) bridge between EnvisionIP networks and DyNet RS485 networks, allowing the system to be extended, for example, with all existing DyNet (RS485) products; actively monitor, log and store the availability of all commissioned units and devices, and report any change in their availability to the environment manager module 110.

As depicted in FIG. 1A, gateway module 130 is able to exchange information with IP luminaires 140 and 150 via link L5, and with environment manager module 110 via link L3, and commissioning module 120 via link L4. L3 and L4 were previously described in connection with manager module 110 and commissioning module 120 respectively. In many embodiments, L5 may represent an EnvisionIP or an xCLIP interface.

IP luminaire 140 is associated with sensor 140-1, light source 140-2, and control module 140-3, which may alternatively be referred to as a "controller." In some embodiments, sensor 140-1 and light source 140-2 are located within the same device or housing. In some embodiments, control module 140-3 (or "controller") comprises computer code (e.g. software or microcode) executing on one or more processors housed within the same device or housing as sensor 140-1 and/or light source 140-2. Light source 140-2 may be capable of performing one or more light actuating functions, such as turning on/off, dimming, and tunable white light or colored light production. Sensor 140-1 is a sensor capable of sensing, for example, one or more of daylight, occupancy, IR, pressure wave (sound), movement, carbon dioxide, humidity and temperature. Control module 140-3 provides one or more control functions for controlling the behavior of other modules and devices, such as one or more of light source 140-2, sensor 140-1, commissioning module 120, environment manager module 110, gateway module 130, and IP luminaire 150.

IP luminaire 140 may provide one or more external interfaces for communicating with other modules of system 100A. For example, IP luminaire 140 may provide an EnvisionIP interface (e.g. links L5 and L7) for use in commissioning light source 140-2 and/or for use by control module 140-3 to influence the behavior of other area luminaires and sensors communicatively connected to itself (e.g. light source 150-2 and sensor 150-1), light source 140-2, or sensor 140-1. IP luminaire 140 may also provide an xCLIP interface for use by control module 140-3 to access and control basic capabilities of light source 140-2 or other light sources communicatively connected to IP luminaire 140. The xCLIP interface may also be used by other system modules (e.g. gateway module 130) for accessing sensor data generated by sensors accessible to IP luminaire 140 (e.g. sensors 140-1 and 150-1), and energy consumption and diagnostic data available to light source 140-2 and/or IP luminaire 140. FIG. 1C and its associated description provide further details regarding the components of an IP luminaire and the various interfaces used by these components.

Environment control device 160 may be any device for controlling environmental conditions in a space. Such devices include, without limitation, smart phones such as the iPhone®, tablet or handheld computing devices such as the iPad®, laptop computers, touch sensitive and/or voice activated input and/or display devices communicatively connected to one or more processors, desktop computing devices, set top boxes, wearable computing devices (e.g., smart watches and glasses), and so forth.

In some embodiments, the components of system 100A depicted in FIG. 1A may interact in the following way. Environment control device 160 receives a user's input indicating his/her desire to change an environment condition in his or her vicinity. For example, control device 160 may be a smart phone, and the user may indicate, using a graphical user interface displayed on the smart phone, his/her desire to increase the level or intensity of light in a work zone, such as a table top in the room where the user is physically present. The graphical user interface may also be used to control other lighting parameters, such as color, color temperature and direction.

Meanwhile, IP luminaires 140 and 150, which control illumination in the aforementioned work zone, each generate coded light signals comprising codes identifying, for example, themselves and/or light sources 140-2 and 150-2 respectively. IP luminaire 150 transmits the coded light signal comprising the code identifying itself and/or light source 150-2 to environment control device 160 via link L8 and IP luminaire 140 transmits the coded light signal comprising the code identifying itself or light source 140-2 via link L9. Via link L2, environment control device 160 transmits one or more signals comprising an environment control request. The environment control request contains information regarding changes the user of the environment control device 160 wishes to make in his or her environment, as well as information on the devices, such as IP luminaires, which may be used to carry out the user's wishes. For example, the environment control request may encode the user's desire to increase the level of light in a work zone such as a table top, as well as identification information from the coded light signals received by environment control device 160.

Environment manager module 110, executing on one or more processors, receives the one or more signals comprising the environment control request from the environment control device 160, and generates an environment control command. In many embodiments, the environment control command comprises the information encoded in the environment control request, but in a format understandable by the gateway module or commissioned units (e.g. IP luminaire) to which it is transmitted. Furthermore, while the environment control request may contain more general information regarding desired environmental changes in a particular room or work zone, the environment control command is more specific with regard to the implementation of the requested changes encoded in the environment control request. For example, the environment control command may contain specific instructions that, when processed by a group of IP luminaires, cause the IP luminaires to effect specific changes in illumination. Environment manager module 110 thereafter may transmit, via link L3, the environment control command to gateway module 130. Gateway module 130 may store data associated with the environment control command, such as identification information associated with the IP luminaire(s) that will respond to the user's desired change in lighting level. Gateway module 130 may then communicate via link L5 to instruct IP luminaire 150 and/or IP luminaire 140 to adjust their illumination to produce the light level requested by the user.

Figure 1B:
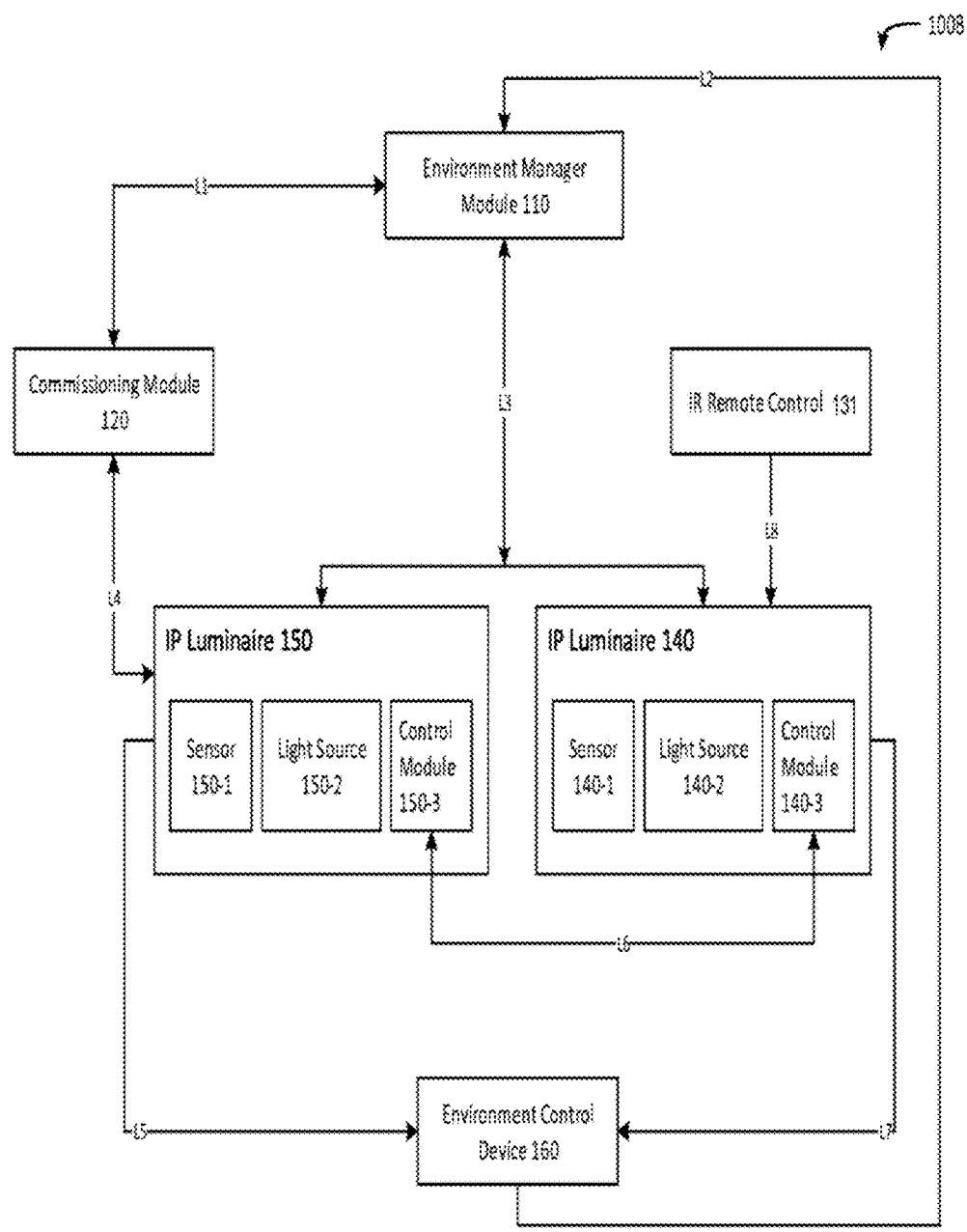
FIG. 1B illustrates a block diagram of an embodiment of a system for managing environmental conditions within a physical structure, the embodiment comprising several modules, two IP luminaires, an environment control device and an IR remote control device.
Figure 1C:
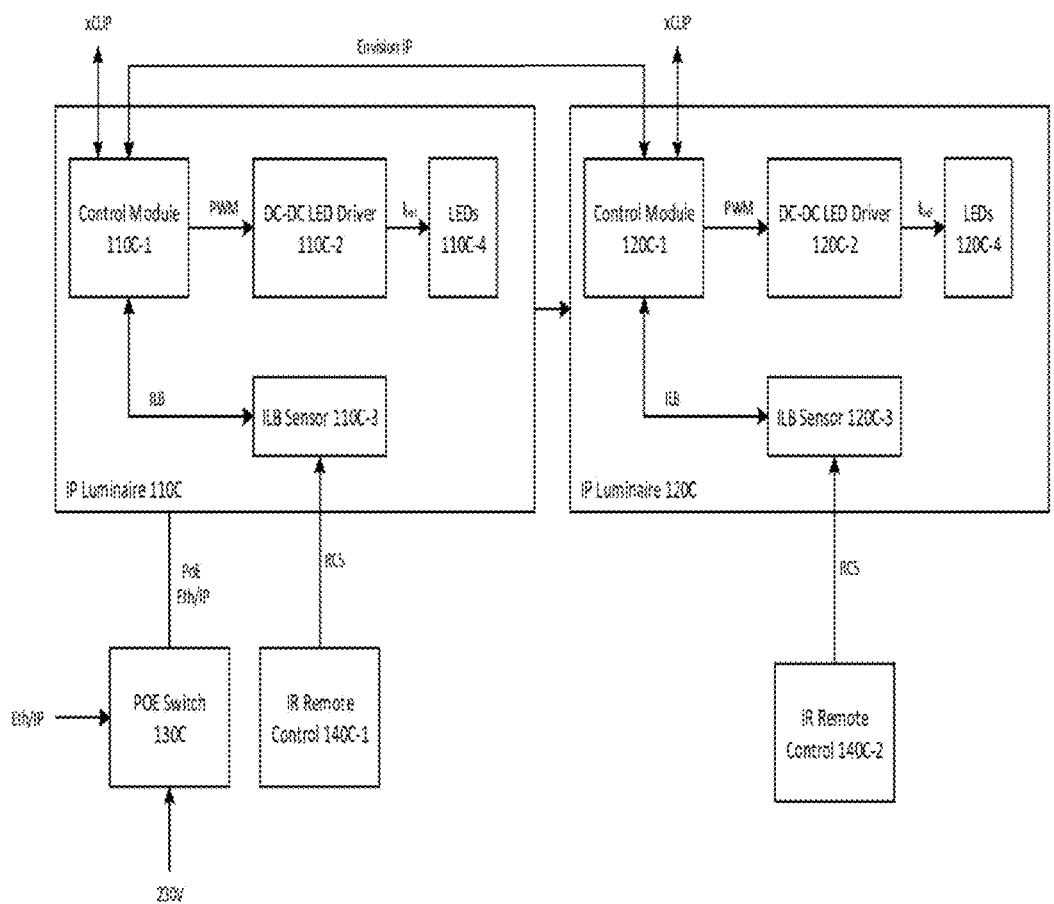
FIG. 1C illustrates components of IP luminaires and the interfaces linking the components in accordance with some embodiments.

FIG. 1B illustrates a system 100B for managing environmental conditions within a physical structure. The system includes an environment manager module 110, a commissioning module 120, an IR remote control 131, IP luminaires 140 and 150, and an environment control device 160. IP luminaire 140 is associated with sensor 140-1, light source 140-2, and control module 140-3, and IP luminaire 150 is associated with sensor 150-1, light source 150-2 and control module 150-3 (which also may be referred to as a "controller"). Some other embodiments of system 100B may include additional or fewer environmental manager modules, IP luminaires, commissioning modules, environment control devices and/or IR remote controls. The components of system 100B are communicatively linked using links L1 through L7, as depicted in FIG. 1B. Identically named components of systems 100A and 100B may be identical in their makeup and behavior. However, environment manager module 110 and IP luminaires 140 and 150 may behave differently in the altered configuration of system 100B. Additionally, links L1 and L2 of system 100B are the same as links L1 and L2 of system 100A; links L5, L6, and L7 of system 100B are the same as links L8, L7, and L9, respectively, of system 100A.

IR remote control 131 is any device that uses infrared light to issue commands to receiver devices. IR remote control 131 may use link L8 to issue control commands to IP luminaire 140 or its components, such as sensor 140-1 and light source 140-2. In many embodiments of system 100B, link L8 may represent the RC-5 protocol.

In some embodiments, the components depicted in FIG. 1B may interact in the following way. Environment control device 160 receives a user's input indicating his/her desire to change an environment condition in his or her vicinity. For example, control device 160 may be a smart phone, and the user may indicate, using a graphical user interface displayed on the smart phone, his/her desire to increase the level of light in a work zone, such as a table top in a room where the user is not physically present. Meanwhile, IP luminaires 140 and 150, which control illumination in the aforementioned work zone, each generate coded light signals comprising codes identifying luminaires 140-2 and 150-2 respectively. IP luminaire 140 transmits the coded light signal comprising the code identifying light source 140-2 to environment control device 160 via link L7, and IP luminaire 150 transmits the coded light signal comprising the code identifying light source 150-2 to environment control device 160 via link L5. Via link L2, environment control device 160 transmits one or more signals comprising an environment control request. The environment manager module 110, executing on one or more processors, receives the one or more signals comprising the environment control request from the environment control device 160, and generates an environment control command. Details on the environment control request and environment control command were specified previously in the context of FIG. 1A. Environment manager module 110 may thereafter transmit, via link L3, the environment control command to IP luminaire 140 and/or IP luminaire 150 to adjust the illumination produced by light source 140-2 and/or light source 150-2 in order to achieve the level of illumination requested by the user of environment control device 150. The same or a different user may also use IR remote control 131 while located proximally to IP luminaire 140, to directly issue a command to IP luminaire 140 in order to adjust the illumination produced by light source 140-2.

FIG. 1C illustrates components of IP luminaires 110C and 120C and the interfaces linking the components in accordance with some embodiments. IP luminaire 110C comprises components control module 110C-1, DC-DC LED driver 110C-2, ILB sensor 110C-3, and one or more LEDs 110C-4. Likewise, IP luminaire 120C comprises components control module 120C-1, DC-DC LED driver 120C-2, ILB sensor 120C-3, and one or more LEDs 120C-4. Control modules 110C-1 and 120C-1 may be any type of control module described in the context of FIG. 1A. In some embodiments control modules 110C-1 and/or 120C-1 may be STM32 based PoE devices. Control Modules 110C-1 and 120C-1 are shown to encode data for transmission to DC-DC LED drivers 110C-2 and 120C-2, respectively, using pulse width modulation (PWM).

In LEDs, as voltage increases, current tends to increase rapidly. Accordingly, even small fluctuations in voltage tends to cause large fluctuations in current, which in turn causes damage to LEDs. Due to the risk of damage to LEDs owing to such voltage fluctuations, LED drivers are used to connect LEDs to a voltage source such as a mains power or a battery. LED drivers control input power to the LEDs, so that they may be safely operated. LED drivers 110C-2 and 120C-2 are electronic circuits which convert input power into a current source in which current is constant despite voltage fluctuations. Control modules 110C-1 and 120C-1 may communicate with other system modules over xCLIP interfaces, and with each other over the EnvisionIP interface. ILB sensors 110C-3 and 120C-3 receive control signals from IR remote controls 140C-1 and 140C-2, respectively, over RC5 interfaces. PoE switch 130C receives data over EtherNet/IP interfaces, and transmits the received data as well as electrical power to IP luminaire 110C via PoE and EtherNet/IP interfaces.

Figure 1D:
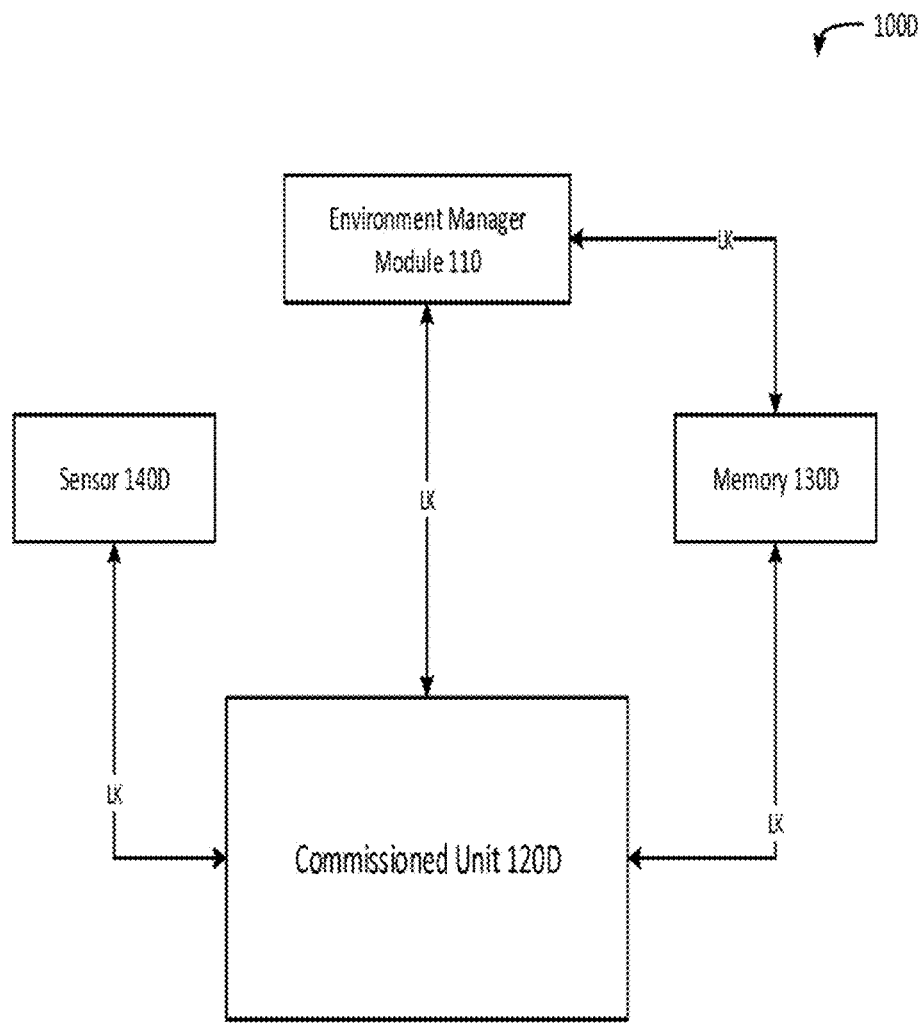
FIG. 1D illustrates a block diagram of an embodiment of a system for managing environmental conditions within a physical structure, the embodiment comprising an environment manager module, a sensor, a memory and a commissioned unit.

FIG. 1D illustrates a system 100D for managing environmental conditions within a physical structure. The system comprises an environment manager module 110, at last one commissioned unit 120D, at least one memory 130D, and at least one sensor 140D. Environment manager module 110 is communicatively connected to commissioned unit 120D via link L3, and to memory 130D via link LK. Commissioned unit 120D is communicatively connected to sensor 140D and memory 130D via link LK. LK is any connection or component that enables the communication of information between at least two system components. For example, a LK includes a wired or wireless communications connection, a radio frequency communications connection, and an optical communications connection. LK may also indicate a shared communication protocol, software or hardware interface, or remote method invocations or procedure calls.

Commissioned unit 120D may comprise one or more devices that are associated with each other within a system such as system 100A or 100D, and that behave according to particular configurations of internal triggers (triggers arising from within the commissioned unit) and external triggers (triggers arising outside the commissioned unit). Triggers may include, for example, sensor data, or a manual or central control. A single device may be part of multiple commissioned units. Commissioned units such as commissioned unit 120D may also be hierarchically organized. For example, a commissioned unit may comprise other commissioned units, and may influence the behavior of these commissioned units. In some embodiments, sensor 140D is a sensor in a designated zone within the physical structure. Sensor 140D is configured to produce data indicative of, for example, motion, occupancy, sound, the presence of one or more gases, illumination, humidity, and temperature. In such embodiments, commissioned unit 120D, which is communicatively connected to sensor 140D through link LK and to environment manager module 110 through link L3, is configured to receive the data produced by sensor 140D. Commissioned unit 120D may also be configured to determine whether or not the sensor data represents a status change associated with the designated zone. In many embodiments, commissioned unit 120D is also configured to update, through link LK, at least a memory 130D, in accordance with the sensor data representing the status change.

Figure 2A:
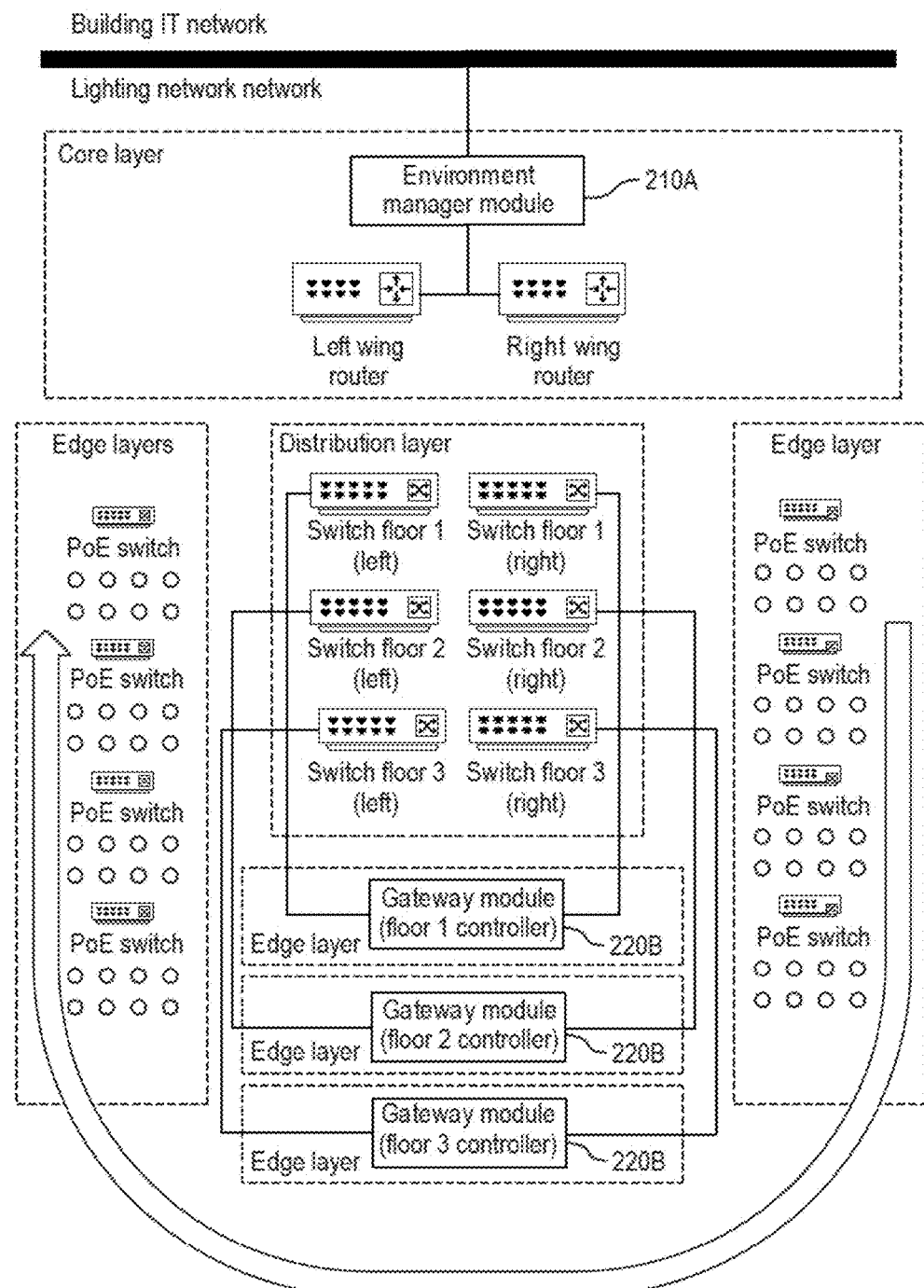
FIG. 2A illustrates the component architecture of a lighting network in accordance with some embodiments.

FIG. 2A depicts the component architecture 200A of a lighting network in accordance with some embodiments. In the illustrated architecture, there are three main component layers: a core layer, a distribution layer, and an edge layer, each surrounded by dotted lines. The core layer comprises an environment manager module 210A that is communicatively connected to a left wing router and a right wing router. The routers may have flash card backup capabilities and may be configured such that they each has access to one IP subnet per port. Environment manager module 210A is directly or indirectly communicatively connected to: various components in the lighting network of a system for managing environmental conditions (e.g. left wing router, right wing router and floor switches in the distribution layer), and to the IT network of the structure whose environment the environment manager module 210A is managing. In many embodiments, the environment manager module 210A may gain access to HVAC-related data through the structure's IT network.

The distribution layer may consist of one IP switch per floor of the structure, and per core layer router (depicted as Switch Floor 1 (Left), Switch Floor 1 (Right), Switch Floor 2 (Left), Switch Floor 2 (Right) . . . Switch Floor N (Left), Switch Floor N (Right)). In many embodiments, these IP switches support the spanning tree protocol. The edge layer consists of a number of rings (depicted as a single curved arrow through side edge layers) per distribution layer switch, and a gateway module per floor for providing floor-level lighting control. Each ring consists of a number of PoE switches, daisy chained and connected to two ports of the respective distribution layer switch in a ring. Such an arrangement provides the advantage that if a ring of PoE switches is broken at any point in the ring configuration, all of the PoE switches may still be reached over the network.

Figure 2B:
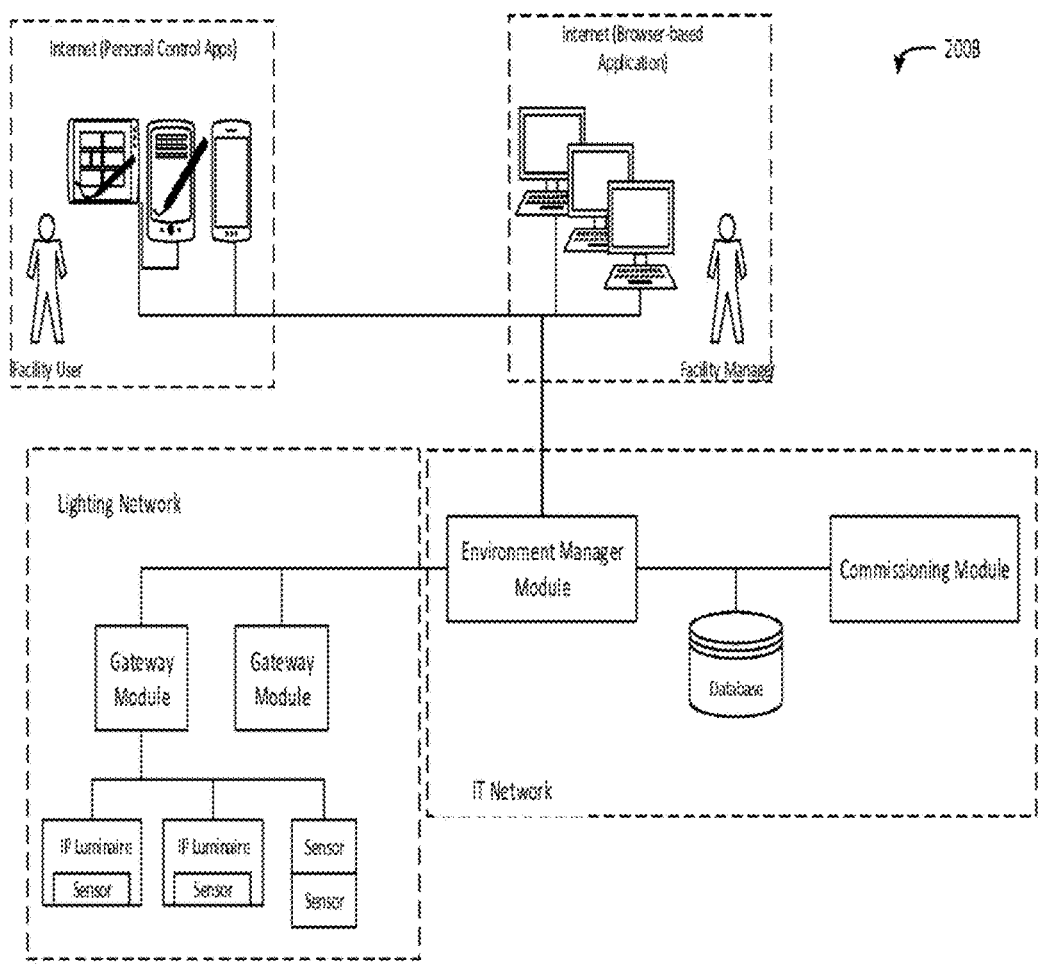
FIG. 2B illustrates a block diagram of an embodiment of a system for managing environmental conditions within a physical structure, and the different network environments associated with various components of the system.

FIG. 2B illustrates a block diagram of an embodiment 200B of a system for managing environmental conditions within a physical structure, and the different network environments associated with various components of the system. Embodiment 200B comprises an environment manager module, a commissioning module, and multiple gateway modules that may be any type of environment manager module, commissioning module, and gateway module, respectively, described in the context of FIG. 1A. The multiple gateway modules are depicted as being communicatively linked to multiple commissioned units (e.g. luminaires and sensors). In this embodiment, facility users may use hand held devices such as smart phones executing personal control applications (apps) to send requests for environmental changes to the environment manager module via the depicted communication link. The smart phones executing the personal control apps are shown to be operational within the Internet but not within the IT network or the lighting network associated with the system for managing environmental conditions. Additionally, facility managers may utilize browser-based applications (also connected to the Internet) such as a central dashboard or other environmental management application to send similar requests for environmental changes to the environment manager module via the Internet. The personal control apps and the browser based applications may also receive information (e.g. data on energy consumed by luminaires within the lighting network) from the environment manager module for display on their user interfaces. In the depicted embodiment, the environment manager module, the commissioning module and their shared one or more databases are within the physical structure's private IT network. The multiple gateway modules and commissioned units are, however, within the structure's private lighting network. Data leaving or entering the private networks via the environment manager module may be required to pass through firewalls.

Figure 3A:
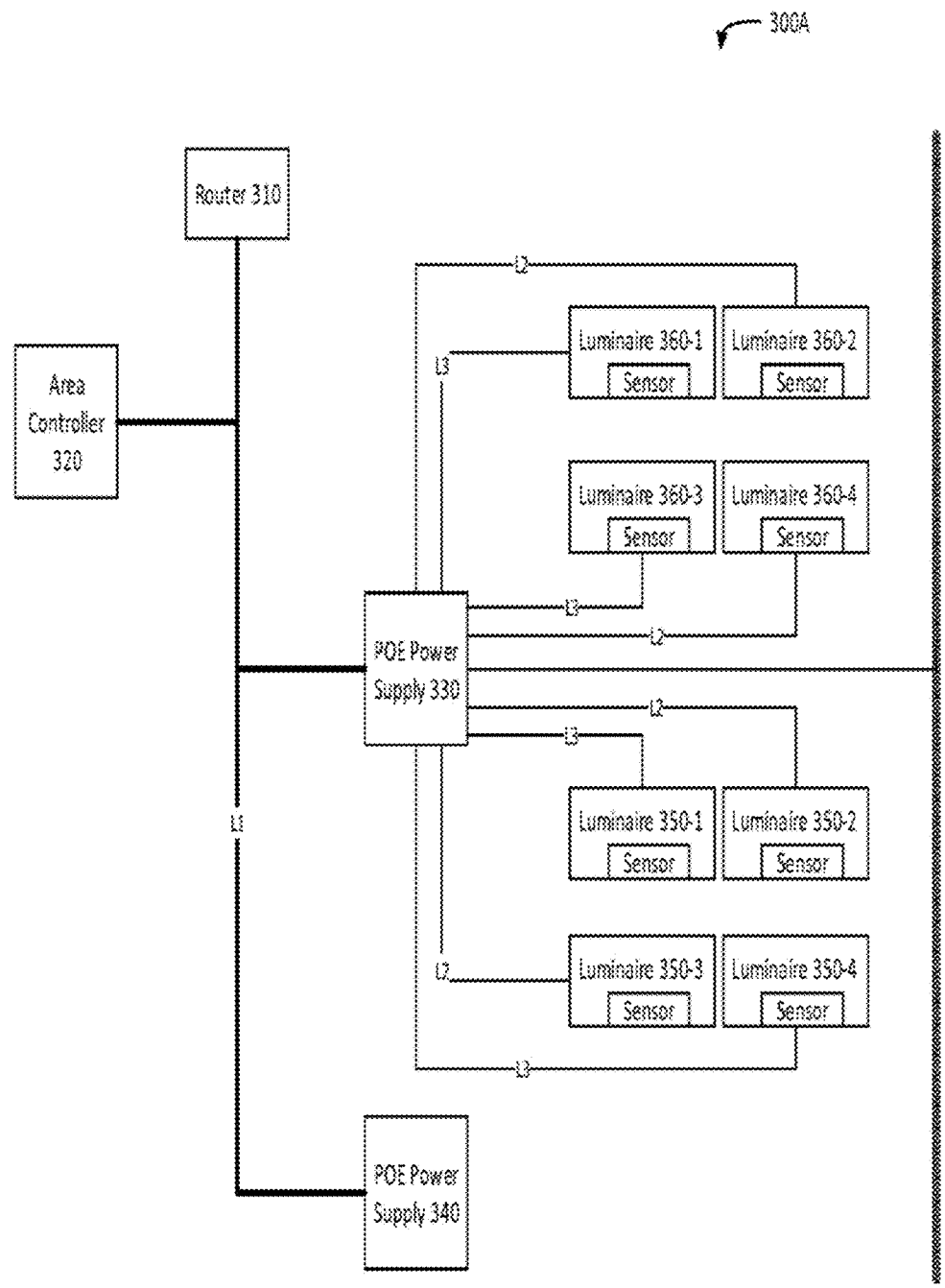
FIG. 3A illustrates an embodiment of a stand-alone, connected configuration of a system for managing environmental conditions.

FIG. 3A illustrates an embodiment 300A of a stand-alone, connected configuration of a system for managing environmental conditions. Embodiment 300A includes router 310, area controller 320, PoE power supplies, or "switches," 330 and 340, and two clusters of luminaires 350-1 through 350-4 and 360-1 through 360-4. In the configuration of embodiment 300A, the IP infrastructure need not be connected to the Internet.

Router 310 is any networking device that forwards data packets in a computer network. It is connected to PoE switches 330 and 340 and area controller 320 via link L1, which provides an xCLIP interface for accessing data from the depicted clusters of luminaires as well as sensor, energy consumption and diagnostics data available from the luminaires. Power over Ethernet or PoE refers to any systems (standardized or ad-hoc) for providing electrical power and data on Ethernet cabling. PoE allows a single cable to provide both a data connection and electrical power to devices such as wireless access points, IP Phones, IP luminaires or IP cameras. Although other standards such as USB can provide power to devices over data cables, PoE allows for far longer cable lengths. In PoE systems, data and power may be carried on the same conductors, or on dedicated conductors on a single cable. PoE therefore eliminates the need for power supplies at the Ethernet/IP device.

Area controller 320 may be implemented in hardware, any combination of hardware and computer code (e.g. software or microcode), or entirely in computer code executing on one or more processors. Area controller 320 may be used to perform various area control functions for a defined area (e.g. a floor of a building). In many embodiments, area controller 320 provides an interactive graphical user interface for system users to manage the control functions. Other such control functionality may be additionally or alternatively be performed by devices such as luminaires or IP luminaires with which area controller 320 interacts. According to some embodiments, area controller 320 may, for example: (a) control multiple commissioned units or zones within a building; (b) be used to group devices and/or commissioned units during the commissioning process; (c) determine area occupancy and adjust lighting for an area accordingly; (d) adjust background light levels or regulate lighting levels based on changes in available natural light for a group of commissioned units; (e) collect and analyze sensor and/or energy consumption data from one or more luminaires and sensors; and (f) participate in scheduling environmental changes such as changes in lighting levels within an area. Software downloads may also occur through area controller 320. In many embodiments, area controller 320 may play an intermediate role, where it fetches a software download from a central server, and distributes the update to respective luminaires and other devices appropriately. Area controller 320 may also act as a security bridge between the luminaire clusters operating within a private lighting network, and a third party private network such as a network comprising a building management system (BMS). In some embodiments, area controller 320 operates within a private IP network, and software tools such as a maintenance tool being executed on an authorized system user's hand held device may exchange data with area controller 320 by temporarily connecting to the IP network.

Luminaires 350-1 through 350-4, and 360-1 through 360-4 may be IP luminaires such as IP luminaire 140 or luminaires comprising light sources such as light source 140-2, described in the context of FIG. 1A. Luminaire networks in embodiment 300A may be compliant with IP standards, and may be able to operate in an IP network. The luminaires are each connected to PoE switch 330 through either link L2 or L3. Link L2 and/or L3 may provide a PoE interface, an xCLIP interface, or an IP interface for communications between PoE switch 330 and the luminaires.

Figure 3B:
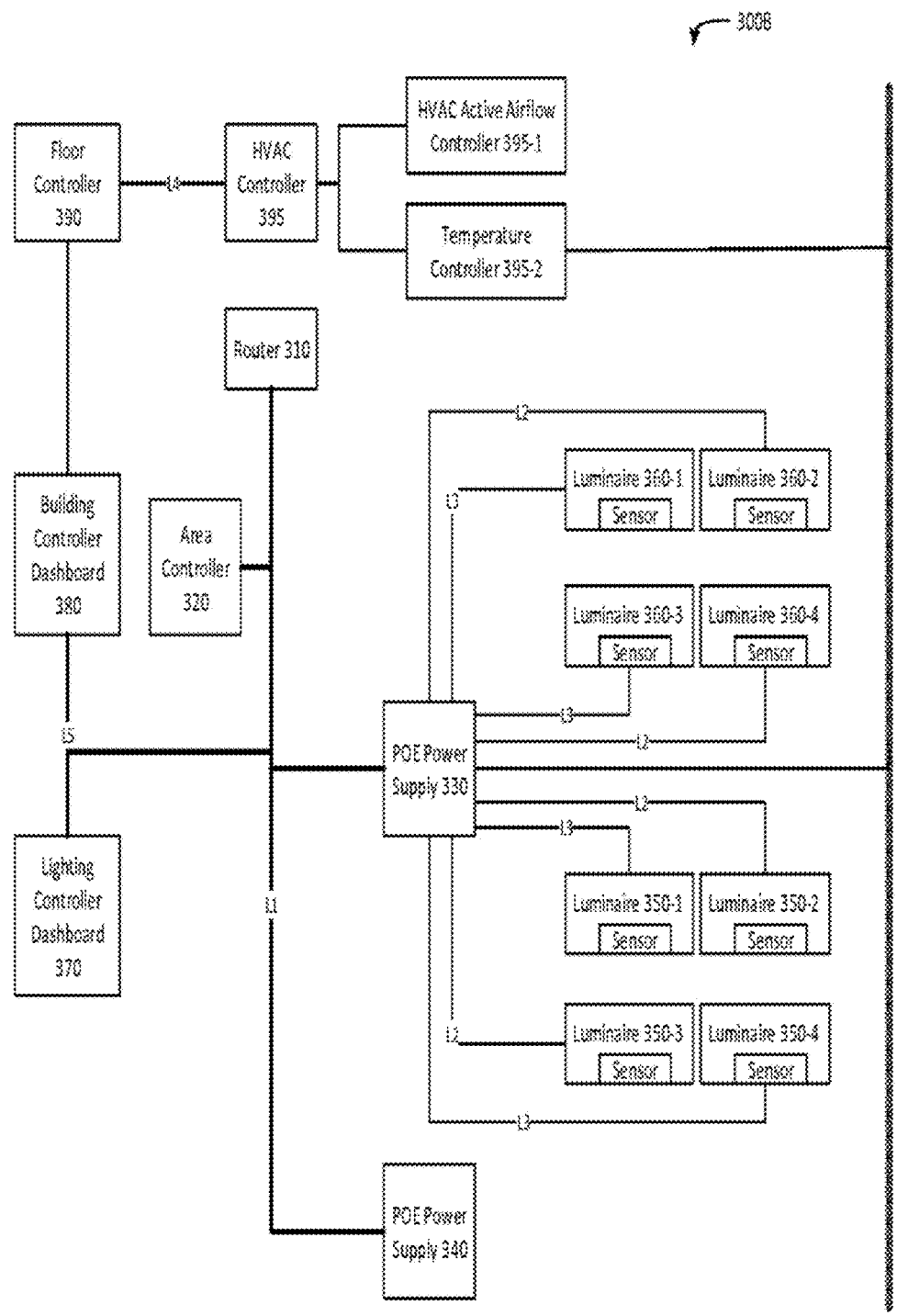
FIG. 3B illustrates an embodiment of an end-to-end integrated configuration of a system for managing environmental conditions.

FIG. 3B depicts an embodiment 300B of an end-to-end integrated configuration of a system for managing environmental conditions. Embodiment 300B includes router 310, area controller 320, PoE switches 330 and 340, two clusters of luminaires 350-1 through 350-4 and 360-1 through 360-4, lighting controller dashboard 370, building controller dashboard 380, floor controller 390, HVAC controller 395, HVAC active airflow controller 395-1 and temperature controller 395-2. Many of the components of embodiment 300B may be similar or identical to identically-named components of embodiment 300A. For example, router 310, area controller 320, PoE switches 330 and 340, and luminaires 350-1 through 350-4 and 360-1 through 360-4 may be, respectively, any type of router, area controller, PoE power supply and luminaire device described with respect to embodiment 300A of FIG. 3A.

Lighting controller dashboard 370 may be, for example, computer code displaying a user interface that is a part of, or executing on one or more processors communicatively connected to, system modules such as environment manager module 110 of FIG. 1. The user interface of lighting controller dashboard may be displayed on any environment control device discussed in the context of FIG. 1, such as environment control device 160. For example, lighting controller dashboard 370 may be an application executing on a handheld device such as an iPhone® or iPad®. Dashboard 370 is communicatively connected to area controller 320, router 310 and PoE switches 330 and 340 through links L1 and L5, which may provide an xCLIP or IP interface for the exchange of data. Lighting controller dashboard 370 may also be used for monitoring purposes (e.g. monitoring energy consumption and system health), and for deployment of lighting schedules. Dashboard 470 may also collect and aggregate information, such as energy consumption, system health, and occupancy information, from multiple area controllers to provide its users a complete and current view of the functioning system.

Building controller dashboard 380, floor controller 390, and HVAC controller 395 may be implemented in hardware, any combination of hardware and computer code (e.g. software or microcode), or entirely in computer code executing on one or more processors. These components of embodiment 300B may be used to perform various functions related to the management of a building's HVAC system, such as monitoring and control of a building's temperature and air flow. In many embodiments, building controller dashboard 380 may display a user interface that is a part of, or executing on one or more processors communicatively connected to, system modules such as environment manager module 110 of FIG. 1. The user interface of the building controller dashboard 380 may be displayed on any environment control device discussed in the context of FIG. 1, such as environment control device 160. For example, building controller dashboard 380 may be an application executing on a handheld device such as an iPhone® or iPad®. There may be multiple floor controllers that provide dashboard 380 information regarding environmental conditions on different floors of a building, which the dashboard may then display on its user interface.

In the configuration of embodiment 300B, the lighting subsystem (e.g. luminaire clusters, PoE power supplies, area controller and router) may be communicatively connected to a $3^{rd}$ party IP network infrastructure, which may also be connected to the Internet. In these embodiments, the building controller dashboard 380, floor controller 390, HVAC controller 395, HVAC active airflow controller 395-1 and temperature controller 395-2 may be integral components of a $3^{rd}$ party building management system operating within the $3^{rd}$ party IP network infrastructure. The $3^{rd}$ party IP network may share building information such as HVAC information with the lighting subsystem and the lighting controller dashboard 370 when necessary. For example, the lighting controller dashboard 370 may display HVAC information such as temperature in particular areas close to commissioned units with large numbers of luminaires. This temperature information may be obtained by the lighting controller dashboard 370 via a connection to the $3^{rd}$ party IP network infrastructure.

FIG. 4A illustrates a block diagram of the components of an embodiment of an environment manager module, along with other devices and components with which the environment manager module is communicatively connected. The architecture of the environment manager module may be based on the n-tier enterprise server-client architectural model, in which functions such as application processing, application data management, and presentation are physically and/or logically separated.

The front end of the environment manager module may be a web-based application that executes on top of an Indoor Service Presentation Framework (ISPF). In FIG. 4A, the front end of the environment manager module may be displayed on the device (e.g. laptop computing device) indicated by the monitor icon and located next to the icon depicting a facility manager. ISPF is a software framework that enables the creation of web-based applications for lighting control, status monitoring, and energy management for HVAC and lighting management systems. It is a cloud-based and enterprise-wide software solution that is capable of interfacing with controllers in a system for managing environmental conditions such as system 100 of FIG. 1. An environment manager module web-based application that interfaces with the end user (e.g. facility manager) provides, in many embodiments, an application frame, a portal application, a login module, and help functionality. The ISPF framework, on top of which the environment manager module executes, provides the environment manager module with the information necessary to provide the application frame and portal application, as described in further detail below.

The presentation layer of the environment manager module depicted in FIG. 4A is based on the Model-View-Controller (MVC) design paradigm. A layer is a common logical structuring mechanism for various elements that constitute a software solution. The presentation layer mainly consists of standard portlets such as a control portlet, a scheduler portlet, a macro portlet, a user settings portlet, and a notifications portlet. Portlets are pluggable software user interface (UI) components that are displayable in a web portal. A portlet also typically comprises a set of JavaScript objects. They produce fragments of markup code (e.g. HTML, XHTML, WML), which are then aggregated into a complete UI for the web portal. In many embodiments, a web portal may comprise a plurality of non-overlapping portlet windows. In such embodiments, each portlet window may display the UI component(s) of a specific portlet. The presentation layer may be implemented, for example, using Liferay® portal server, DOJO®, MxGraph®, JqChart® and JavaScript®.

In many embodiments, the presentation layer invokes the service layer using the REST/SOAP interface, as the ISPF exposes available services as REST and SOAP interfaces. These services typically utilize the business objects defined in the business layer to realize their functionality. The service layer may also expose the REST APIs in XML and JSON format, as input and output. Client web applications may interact with the environment manager application executing as a server by invoking the REST/SOAP interface over HTTP/HTTPS using XML/JSON.

The business layer manages business objects that interface with one or more database servers and controllers, in its associated system for managing environmental conditions, via the data access layer and communication gateway. In many embodiments, business objects are modularized such that multiple services associated with the service layer may invoke the same business object to realize its exposed functionality. In many embodiments, one service may use multiple business layer objects to realize its functionality. The business layer may also invoke the message bus for communicating with controllers in its associated system for managing environmental conditions.

The data access layer provides a way to reduce the degree of coupling between business logic and persistence logic. Application business logic often requires domain objects which are persisted in a database. The data access layer allows for the encapsulation of code to perform create, read, update and delete (CRUD) operations against persistence data without affecting the rest of the application layers (e.g. the presentation layer). This means that any change in the persistence logic will not adversely affect any other layers of the environment manager module. The data access layer therefore enables applications such as an environment manager module web-based application to seamlessly integrate with a new database provider.

The mediation engine provides rule-based routing of data within the environment manager module. In some embodiments, the mediation engine may comprise a Java® object-based implementation of enterprise integration patterns that uses an API to configure routing and mediation rules. For example, the rule-based routing of the mediation engine may ensure that all alarm events encountered by the environment manager module are routed to a database for persisting, and all network events are persisted in another database.

The message bus provides queuing functionality and is used for processing all communications from controllers that are received by the environment manager module. Particularly, the message bus provides queuing functionality for the prioritizing of information received from the business layer and from the communication gateway. For example, all information (e.g. requests) received by the communication gateway (e.g. from commissioned units) are routed through the message bus using the mediation engine. Any responses to such requests from the communication gateway are routed through the message bus. In many embodiments, the message bus may be used, for example, for: (a) prioritizing and forwarding communication gateway requests received from the business layer, notification emails and SMS messages; (b) pushing status and alarm messages to the presentation layer for display on a UI; (c) executing asynchronous processes; (d) synchronous and asynchronous messaging; and (d) dispatching messages in serial and in parallel to multiple modules.

In many embodiments, the message bus comprises a synchronization manager component, used for publishing real time updates from controllers and commissioned devices to front end applications. Applications (e.g. a central dashboard presenting information processed by the environment manager module) may subscribe to real time updates from controllers (e.g. alarms, lighting events, energy updates). Whenever a real-time update is received, for example, by the communication gateway, the synchronization manager may notify all subscribers.

The NoSQL database (an in-memory database) is used for storing the most recent 24 hours of trend data. In many embodiments, all the data in the in-memory database shall be stored in a cache and shall not be persisted. In many embodiments, this database is executed in a separate process as compared to the environment manager module itself, and the database may be accessed using SQL.

The database server is used to store control, management and monitoring data. The database server may be local or remote to the environment manager module. If local, the database server may be created during product installation. A remote database may be a new or existing database that may be customer-managed. The database server may access multiple schemas to manage the variety of information it stores. For example, an OpenFire® schema may contain XMPP server related tables. These tables may contain information related to users, rooms, and permissions. A Liferay® schema may contain tables for managing portals, portlets, users, and UI personalization data. An alarm schema may comprise tables for schedule and alarm management.

Communication gateway provides a means for the environment manager module to communicate with devices and commissioned units. In various embodiments, the communication gateway subscribes to device events using COM Java® wrapper classes it uses to communicate with a Field Service Layer (FSL) accessible to the devices and commissioned units (FSL not shown in FIG. 4A). When events such as lighting events are registered by commissioned units, the communication gateway is notified of the event by the FSL. The communication gateway thereafter transmits the event information as appropriate to the upper layers (e.g. message bus, business layer, services layer, presentation layer). The communication gateway communicates with the upper layers of the environment manager module in two ways: (1) through REST services accessible only by the business layer components, and (2) using the message bus (e.g. using the XMPP protocol for all requests and responses). Both these mechanisms are configurable. When the environment manager module has been deployed on a cloud such that the communication gateway is hosted on a private network, the message bus communication option may be enabled.

In many embodiments, to transmit data to the upper layers from the FSL, the communication gateway converts FSL objects received from the FSL layer to an ISPF common object model. To transmit data from the upper layers of the environment manager module to the FSL (which is how the communication gateway interfaces with commissioned units), the communication gateway converts ISPF common object model objects to FSL objects. In some embodiments, the communication gateway uses the ComfyJ library to communicate with the FSL. The ComfyJ library provides the JNI wrapper classes for the FSL COM objects. In such embodiments, the communication gateway may be executed in a separate JVM process, for which a minimum of 2 GB of heap space may be allocated.

In many embodiments, the communication gateway comprises a communication gateway API, code for converting domain specific objects to the ISP common object model, and ComfyJ generated wrapper classes (e.g. ComfyJ generated wrapper classes of the FSL for control and monitoring purposes). The communication gateway API is typically used for sending and receiving messages from the message bus.

ISPF ETL (Extract Transform and Load) is used to extract data from the NoSQL Audit Schema and transform the data into a star data model for loading into the trend schema of the database server. In many embodiments, ETL is a separate process in ISPF which runs in a separate execution context. The ETL process also runs on a scheduled basis, which is configurable. A default schedule may be to execute the ETL process once every 12 hours.

The analytics layer analyzes data produced by commissioned units and produces textual and graphical reports for display on front end applications. The analytics layer may utilize a report design or publishing toolset to control the look and feel of the reports generated and may also use an analysis toolset (e.g. Pentagon Mondrian) for data analysis. The analytics layer may also provide an online analytical processing (OLAP) solution where data such as lighting network log data is collected into a central repository and analyzed for use by multiple end user applications.

Figure 4B:
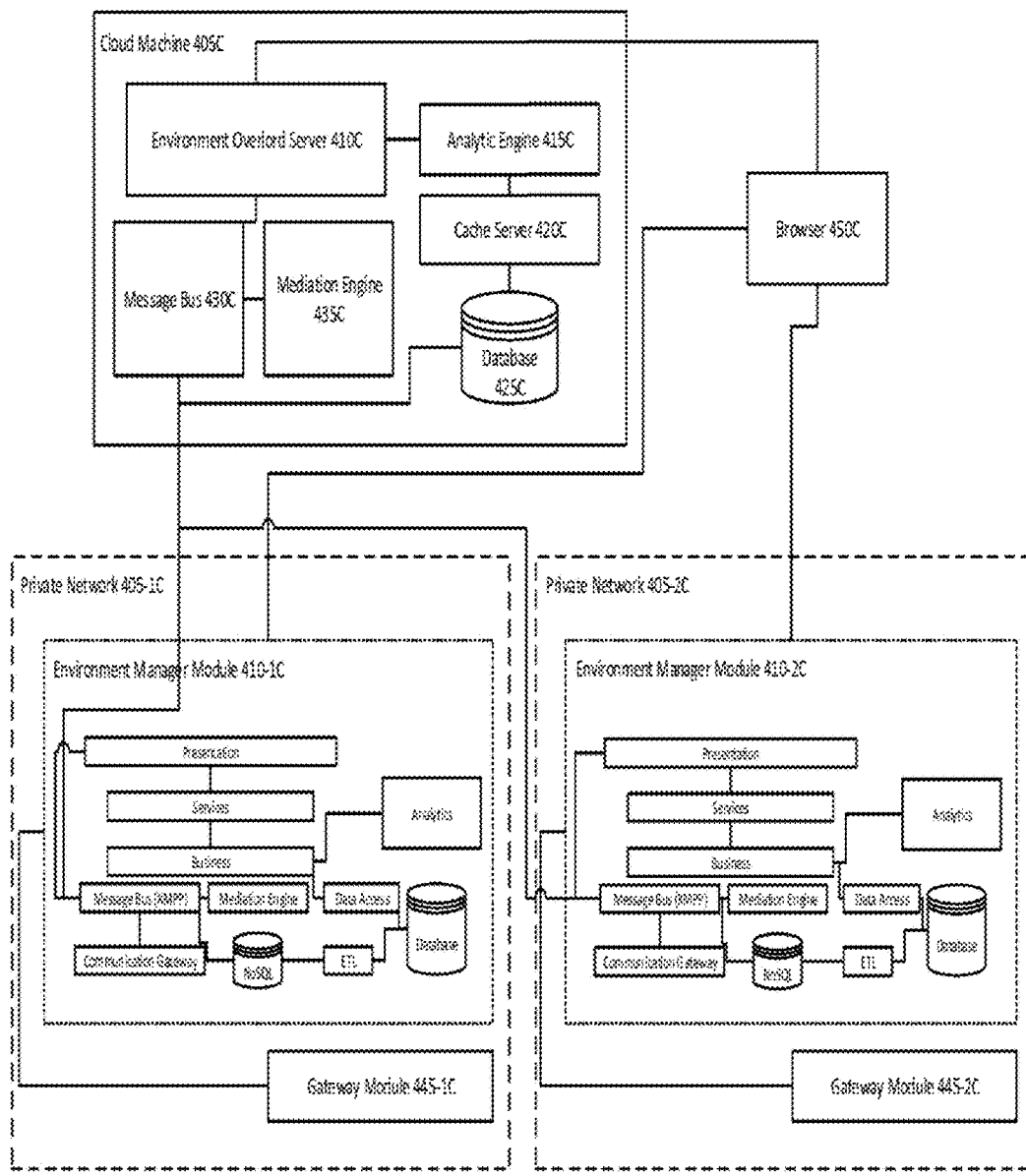
FIG. 4B illustrates a block diagram of various selected components of an ISPF cloud-deployed embodiment of a system for managing environmental conditions within a physical structure.

FIG. 4B illustrates a block diagram of various selected components of an ISPF cloud-deployed embodiment of a system for managing environmental conditions within a physical structure. The cloud deployment comprises a cloud machine 405C executing an environment overlord server 410C and its related modules (message bus 430C, mediation engine 435C, analytic engine 415C, cache server 420C and database server 425C). These related modules may be similar to similarly named modules in FIG. 4A. In the cloud deployment of FIG. 4B, however, multiple environment manager modules (e.g. 410-1C and 410-2C) are deployed within separate private networks (e.g. 405-1C and 402-2C). These multiple envision manager modules may exchange data with the cloud machine 405C through their respective message buses as indicated. Connections between the overlord server 410C and the environment manager modules 410-1C and 410-2C may be secured over a TLS protocol.

In the embodiment depicted in FIG. 4B, the environment overlord server 410C, analytic engine 415C, cache server 420C, database 425C, message bus 430C and mediation engine 435C are all execution environments executing on the cloud machine, which is a hardware device. The analytic engine 415C may comprise a Pentaho Mondrian® engine, the cache server 420C may be an EhCache® server, the database 425C may be an MS. SQL® database server, and the mediation engine 435C may be an Apache® Camel engine. Gateway modules 445-1C and 445-2C may be any type of gateway modules described in the context of FIG. 1A. The overlord server 410 may utilize or otherwise incorporate technologies such as Liferay® v6.1, JRE 1.6, Apache CXF, DOJO v1.8, MXGraph, Spring 3, Strophe, JQChart, JasperReports, True License, InstallAnyWhere, and/or JPivot.

Commissioning

As initially discussed above in the context of FIG. 1A, commissioning module 120 participates in a commissioning process performed, for example, by system 100A for managing environmental conditions within a physical structure. According to some embodiments, the commissioning process comprises the steps depicted in FIG. 5. In various other embodiments, the steps in the process need not be performed in the order shown, one or more steps may be omitted, and one or more steps not depicted may be added to the process shown in FIG. 5. The steps include step 500, in which one or more devices are localized; step 510, during which commissioned units are created; step 520, in which commissioned units are bound to devices (e.g. sensors) or other commissioned units; step 530, in which commissioned units are linked; step 540, in which commissioned units are configured for use within a system such as system 100A; and step 550, in which commissioned units are programmed as necessary.

Figure 5:
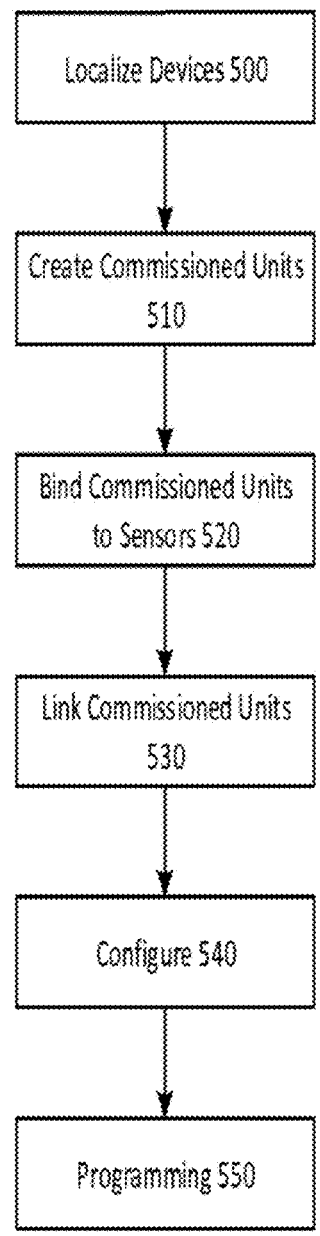
FIG. 5 illustrates a block diagram of a commissioning and configuration process utilized by components of a system for managing environmental conditions, in accordance with some embodiments.
Figure 18:
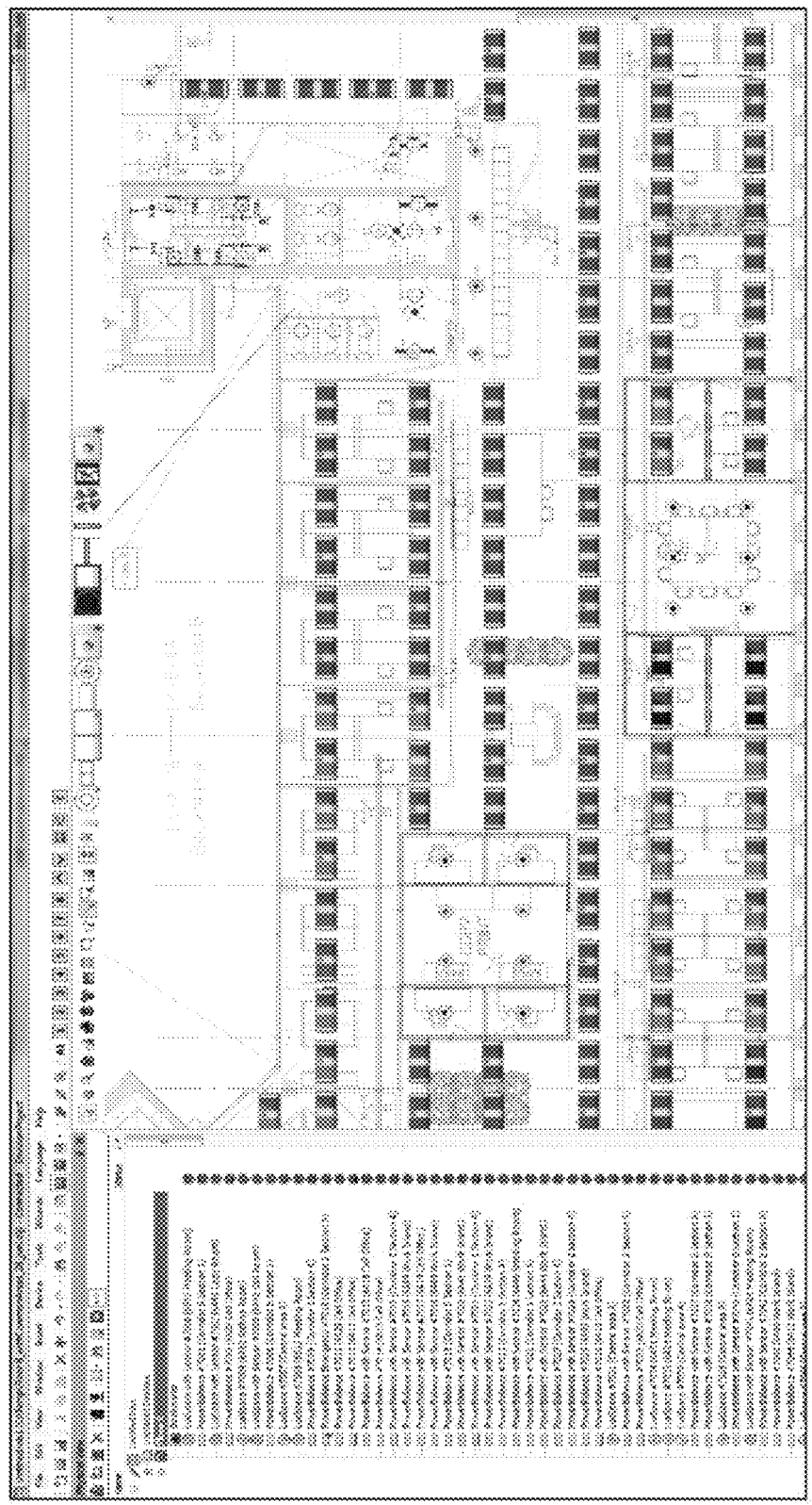
FIG. 18 illustrates an interactive digital floor plan depicting the location of commissioned units, in accordance with some embodiments of a system for managing environmental conditions.

In step 500 of FIG. 5, devices to be associated with a system such as system 100A are localized. Localization is the mapping of devices such as luminaires, sensors and controllers to a physical location within a physical structure such as a building. Physical structures such as buildings are generally associated with a hierarchy. For example, a campus may comprise multiple buildings, a building may comprise multiple floors, and a floor may comprise multiple rooms. During step 500, a device such as a sensor may be localized by being associated with a particular corner or a room within a building. Additionally, devices as well as spaces within structures may be associated with functions during the localization process. For example, a room may be assigned the function of a cell-office, a corridor, a restroom, a meeting room, or an open-plan office. A device may be assigned the function of, for example, occupancy sensing, light sensing, light production or control. During the commissioning process, a digital floor-plan of a structure, such as a building, may also be created. According to some embodiments, the floor plan may comprise all the details regarding the hierarchy of the structure (e.g. floors, functional spaces within floors, devices and their locations within the functional spaces). A floor plan may also contain information on functional links between control devices and commissioned units. The floor plan may be interactively created by an authorized user accessing a commissioning tool executed by one or more processors associated with the commissioning module 120, wherein the commissioning tool visually illustrates the various levels of hierarchy associated with the structure. An exemplary digital floor plan is depicted in FIG. 18. The floor plan may also visually identify all localized devices and their properties.

Localization may also involve devices such as luminaires or commissioned units comprising luminaires being triggered to flash and visually identify their location. Localization may also be accomplished using coded light technology. Generally, coded light technology involves a non-visible modulation of light to contain information about the light source, such as a unique identifier and location information. Examples of devices that may be localized using coded light technology includes, without limitation, area controllers, gateway modules, luminaires, ILB sensors, PoE sensors, PoE manual control user interfaces, and PoE switches. During and/or following the localization process, devices may report their properties to a commissioning tool associated, for example, with commissioning module 120 of FIG. 1A. A luminaire may report, for example, information indicative of its type (e.g. CCT, max output), available sensors, hardware version, software version and a unique ID. As a result of the localization step of 500, the digital floor map may graphically reflect the various localized devices at their appropriate locations, along with their properties (e.g. type, unique ID).

In step 510, commissioned units are created. A commissioned unit comprises one or more devices that are associated with each other within a system such as system 100A, and that behave according to particular configurations of internal triggers (triggers arising from within the commissioned unit) and external triggers (triggers arising outside the commissioned unit). Triggers may include, for example, sensor data, or a manual or central control. A device may be part of multiple commissioned units. And commissioned units may be used to define a hierarchy within a physical structure such as a building. For example, a commissioned unit may be (1) a group of devices such as luminaires and sensors, (2) one or more individual devices, or (3) a combination of one or more commissioned units and individual devices. A commissioned unit may also be an area (e.g. a work space, room, corridor) comprising one or more groups of devices such as luminaires, sensors, and controllers.

In many embodiments, a commissioned unit may be assigned one or more templates. Templates are a collection of predefined system settings or device parameter configurations designed to adjust the behavior of one or more devices so as to produce a set of environmental conditions. A system for managing environmental conditions, such as system 100A, operating within a large space may need to create different lighting and other environmental conditions in different parts of the space that face different circumstances (e.g. high foot traffic, low occupancy). Templates provide an efficient mechanism for capturing the preferred behavior of devices in these different spaces under commonly occurring circumstances. Templates may specify, for example, minimum light levels in a corridor of an office building during work hours.

Figure 7:
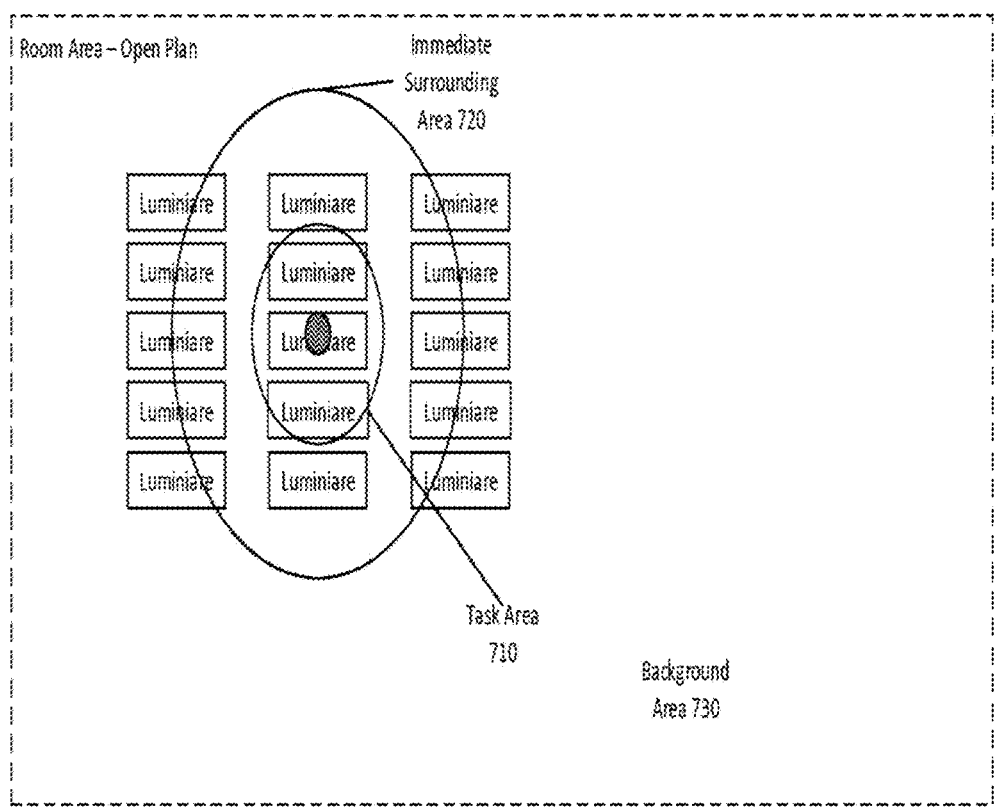
FIG. 7 illustrates a commissioned unit such as an open-plan room, a system user in the open-plan room, several zones surrounding the user, and devices that lie within and outside of these zones.

In some embodiments, commissioning of units in step 510 may be rule-based. In rule-based commissioning, multiple devices may be commissioned as a single commissioned unit based on predefined rules. In some such embodiments, the rule may indicate the size of the commissioned unit in terms of the number of devices that may be included as part of the unit. Moreover, other dynamic parameters such as the position of a system user in an area, and the dimensions and mounting positions of the devices around the user, a temporary or permanent commissioned unit may be formed. FIG. 7 depicts an embodiment of rule-based commissioning, where the central dark spot represents a system user. In this embodiment, devices that are at least partially located within the first circular area surrounding the user (the task area 710) may form one commissioned unit, and devices primarily located in the outer circular area that lies outside the first circular area surrounding the user (immediate surrounding area 720) may form another commissioned unit. Each commissioned unit may be controlled separately, and lighting rules may apply differently to the same device, depending upon which commissioned unit it is associated with.

Figure 6:
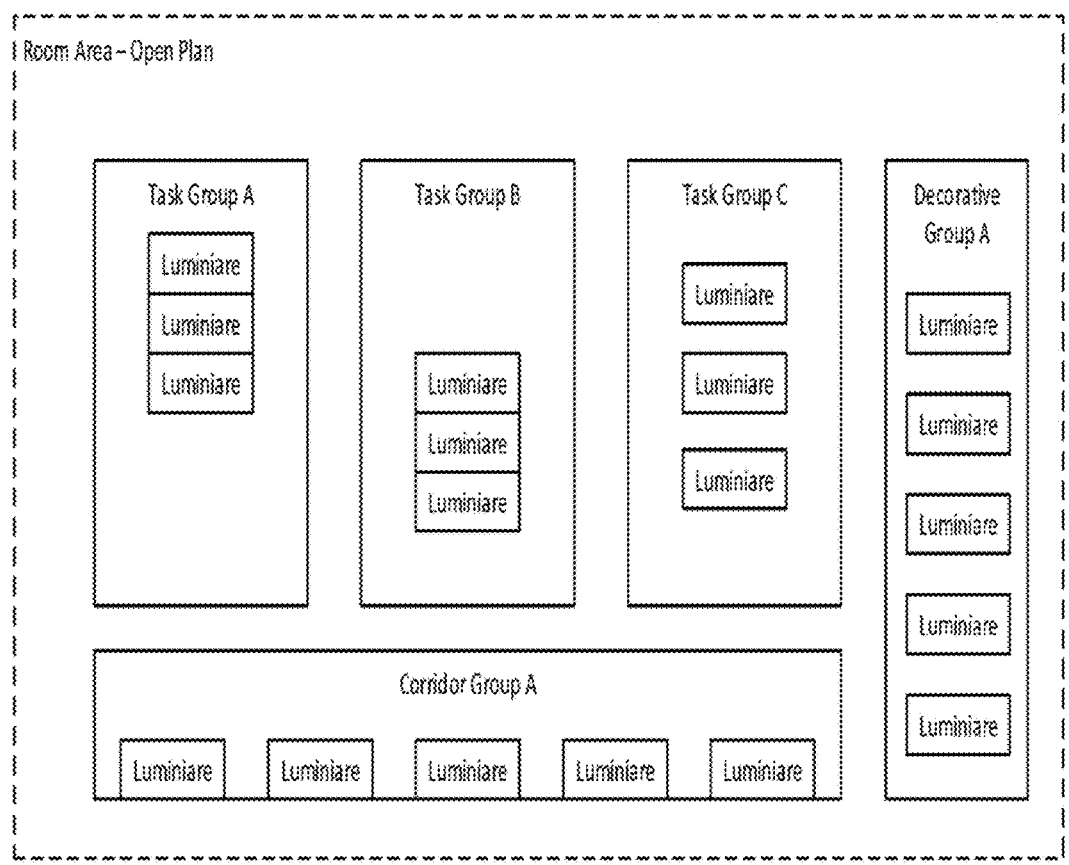
FIG. 6 illustrates a commissioned unit such as an open-plan room comprising multiple device groups in accordance with one embodiment.

In other embodiments, commissioning of units in step 510 may be fixed. In fixed commissioning, pre-commissioned units or groups are created for example, by logically dividing a zone such as an open-plan office into dedicated zones (e.g. task zones, corridors, decorative zones), and creating one or more commissioned units comprising devices that are localized to these dedicated zones. FIG. 6 depicts several commissioned units (e.g. Task Groups A, B, and C; Decorative Group A; and Corridor Group A) formed based on the logical division of an open plan room into dedicated zones (three task zones, a decorative zone, and a corridor zone), and on the location and spatial configuration of luminaires within each dedicated zone. The creation of commissioned units of step 510 may also involve the addition of devices (e.g. luminaires, controls and sensors) to previously commissioned units, and linking newly commissioned units to existing commissioned units. Linking is discussed below in the context of step 530.

Grouping multiple devices into a single commissioned unit allows for efficient management of environmental conditions. For example, multiple IP luminaires and their associated sensors may be responsible for illuminating a particular task zone such as a table top. Rather than separately issuing commands to each IP luminaire in the commissioned unit or separately monitoring sensor data for each of the different sensors, systems such as system 100A may issue one command for each commissioned unit when necessary to adjust an environmental condition such as illumination, which may be applied after any necessary processing to all the lighting units within the commissioned unit. Similarly, sensor data from multiple sensors within the commissioned unit may be reported in the aggregate to system 100A modules such as the environment manager module 110, rather that repeatedly reporting sensor data from each individual sensor.

In step 520, commissioned units comprising lighting or HVAC devices are bound to control and sensor devices or commissioned units comprising such devices. The commissioning tool described previously will, in many embodiments, allow an authorized user (e.g. a commissioning engineer) to select sensors (e.g. occupancy sensors, light sensors) for association with commissioned units. Binding commissioned units to particular sensors or types of sensors allows for the creation of commissioned units that are suitable for participating in occupancy-based or daylight-based environmental control. These control mechanisms are described in the context of FIGS. 8-17 below.

In many embodiments of the process depicted in FIG. 5, an authorized user (e.g. commissioning engineer) may bind multiple occupancy sensors to the same commissioned unit. In such an arrangement, the commissioned unit, when under occupancy-based control, may be directed to display occupied behavior if just one of the bound sensors senses occupancy, and may be directed to display unoccupied behavior only if all of its bound sensors fail to sense occupancy. The user may also bind multiple daylight sensors to the same commissioned unit. In such a configuration, the aforementioned commissioning tool may also enable the authorized user to configure how multiple light-related events arising from the multiple daylight sensors are aggregated and/or processed. The commissioning tool may, in various embodiments, allow an authorized user to bind manual and personal controllers (both fixed and mobile) to commissioned units. This allows for the creation of manually-controllable commissioned units, and allows for the assignment of a scope of control for each controller device. This in turn results in the efficient management of control requests received from the various controllers in a building, and an overall increase in the efficient management of environmental conditions within the building.

In step 530, commissioned units are linked. Linking commissioned units generally requires associating the commissioned units in a memory. Once linked, a commissioned unit may affect the behavior of the other commissioned units with which it is linked. For example, whether or not a first commissioned unit switches off its lights when the only remaining occupant of the area leaves, may depend upon whether or not another linked commissioned unit providing illumination in an adjacent area is switched off. In many embodiments, if a first commissioned unit comprising luminaires is linked to a second commissioned unit comprising luminaires, and the first unit detects occupancy, the light produced by the second unit may transition to a preconfigured interlinked light level in response to the detected occupancy. Linking commissioned units, therefore, allows the system to appropriately control environmental conditions in larger spaces (e.g. large open office spaces) by coordinating the response of multiple commissioned units scoped to various areas within these spaces when changes (e.g. changes in occupancy) are detected in just one area.

Under some circumstances, coordinating the behavior of multiple commissioned units may be necessary to provide a comfortable environment for occupants of a large open space within a building. For example, when few occupants are remaining in cell offices within an open-plan office space, it will be energy efficient to turn off lighting in unoccupied areas of the office space. At the same time, it may be beneficial to ensure that illumination in areas adjacent to the occupied cell offices as well as some common corridor areas is maintained in order to avoid a sense of isolation for the remaining occupants of the open-plan office space.

In step 530, the commissioning tool may also allow an authorized user to link commissioned units to one or more HVAC grids or areas. In many embodiments, a single HVAC area or grid may comprise multiple lighting groups. In such embodiments, sensors associated with the multiple lighting groups may be associated with an HVAC area identifier for the single HVAC area or grid. When such a configuration is operational, sensor information from commissioned units within the multiple lighting groups may be forwarded to HVAC area controllers associated with the single HVAC area or grid.

Step 540 is a configuration step, during which various configurable parameters of commissioned units are specified using, for example, the commissioning tool. Such parameters may control a commissioned unit's default behavior under various conditions. During the configuration step, templates may be assigned to or disassociated from commissioned units, a commissioned unit's power-up behavior may be specified, control options may be enabled and disabled, timing parameters (e.g. fade time, dwell time, hold time, grace fade time, smart time) may be specified, occupancy-related parameters (e.g. maximum light level when occupied, minimum light level when occupied) may be specified, general lighting parameters (e.g. background light level, task light level) may be specified, user control parameters (e.g. dim step, dim speed, retention time) may be specified, and priority levels associated with different control options (e.g. occupancy-based control, daylight-based control, manual control, personal control, and central control) may be set. During this step, the commissioning tool associated with, for example, the commissioning module 120 of system 100A, or the central dashboard associated with, for example, with the environment manager module 110 of system 100A, may selectively disallow a user (e.g. a facility manager) from specifying and/or adjusting certain parameters for commissioned devices or units that are likely to be outside of the user's level of competency. During this step, an authorized user may also be able to associate an application behavior template with any commissioned unit. An application behavior template is a collection of parameter or other configuration values suitable for a particular application.

To make the commissioning process more efficient, the commissioning tool and/or the central dashboard also permits the simultaneous configuring of multiple commissioned units. For example, a user may elect to have two or more commissioned units receive the same configuration settings as previously selected for another commissioned unit. The user may also use the commissioning tool to copy and paste configuration settings from one device or commissioned unit to another. In various embodiments, the commissioning tool or central dashboard may also be used to revert configured parameters of any device or commissioned unit to previous settings such as factory default settings. Moreover, the commissioning tool may be used to remove links to sensors and controls. The commissioning tool may also enable an authorized user to manually or automatically calibrate sensors (e.g. daylight sensors). While a sensor is calibrating, it may not be able to communicate with the rest of the system. A calibrated sensor may provide visual or other feedback once calibrated successfully.

Step 550 is a programming step, during which the user may create and assign a template to one or more commissioned units such that the commissioned units are able to behave in accordance with the template if required. For example, the user may use the commissioning tool to create a template of a particular lighting scene for a commissioned unit by specifying lighting parameters for various luminaires included within the commissioned unit. Such a lighting scene may thereafter be used as a default scene in a meeting zone associated with the commissioned unit, when the meeting zone transitions from an unoccupied to an occupied state. In some embodiments, the commissioning tool may allow the user to save current light settings of a commissioned unit as a new scene. A commissioned unit may have multiple associated scenes for application under different circumstances, such as under specific occupancy conditions, daylight conditions, and/or at specific times of the day.

Remote Re-Commissioning

In some embodiments, the central dashboard may allow an authorized user to remotely re-commission previously commissioned units. In order to perform the re-commissioning, the central dashboard may provide user interface means for searching for and locating the units to be re-commissioned on a displayed digital floor plan of the physical structure in which the device is housed. Users may be able to search for the commissioned units using the unit's type, location within the structure, identification number or other information. Commissioned units matching the user's search criteria may thereafter be displayed and selectable by the user. Once a commissioned unit or device is selected or otherwise identified for remote re-commissioning, the user may be allowed to view and edit various parameters associated with the unit or device. The central dashboard may also allow the user to disassociate the unit or device for one commissioned unit and re-associate the device or unit with a different device or unit.

Managing Environmental Conditions—Automatic Controls

According to many embodiments, environmental conditions within a structure such as a building are monitored and managed to provide occupants optimal conditions (e.g. lighting, temperature, airflow), while at the same time conserving energy. This section focuses on occupancy and daylight-based control of environmental conditions. While many of the embodiments described below rely on pre-programmed logic and system parameters, other embodiments function by monitoring conditions such as light levels and temperature in real time, receiving feedback and/or instructions from occupants or remote users of the spaces, and adjusting environmental conditions accordingly.

Occupancy-Based Control

Occupancy-based control of environmental conditions occurs automatically in reaction to changes in occupancy within a space. Occupancy-based control mechanisms may, however, in many embodiments apply in conjunction with manual, central, or personal control mechanisms. In the sections below, details regarding configurable parameters referred to in the descriptions of each figure below appear prior to the figure descriptions themselves.

Configurable Parameters: MaxWhenOccupied and MinWhenOccupied

Using the commissioning tool, an authorized user such as a commissioning engineer may configure parameters indicative of maximum and minimum light output by a commissioned unit associated with an occupied space. In some embodiments, the parameters indicative of the maximum light that should be output when an associated area is occupied (MaxWhenOccupied) and the minimum light that should be output when the associated area is occupied (MinWhenOccupied) may each be set to a percentage value between 0% and 100% of output ability. However, the parameter MaxWhenOccupied may not, in some embodiments using Coded Light technology, be set to a value above 90%. Likewise, in some embodiments using Coded Light technology, the parameter MinWhenOccupied may not be set to a value below 25%. These restrictions may be required in some embodiments to account for requirements of Coded Light technology and/or physical limitations of luminaires.

Configurable Parameters: Light Level 1 and Light Level 2

Light Level 1 and Light Level 2 are configurable parameters associated with occupancy-based control of environmental conditions. In many embodiments, Light Level 1 signifies the light level for providing a lower background-level of illumination, and Light Level 2 signifies the light level for providing a higher task-level of illumination. A default value for the Light Level 1 parameter may be 300 lux, while a default value for the Light Level 2 parameter may be 500 lux. An authorized user may be able to use a tool such as the commissioning tool, the central dashboard or other manual or personal controllers to set and/or alter these parameters. In various embodiments, these parameters may track values associated with MinWhenOccupied to MaxWhenOccupied.

Figures 8, 9A:
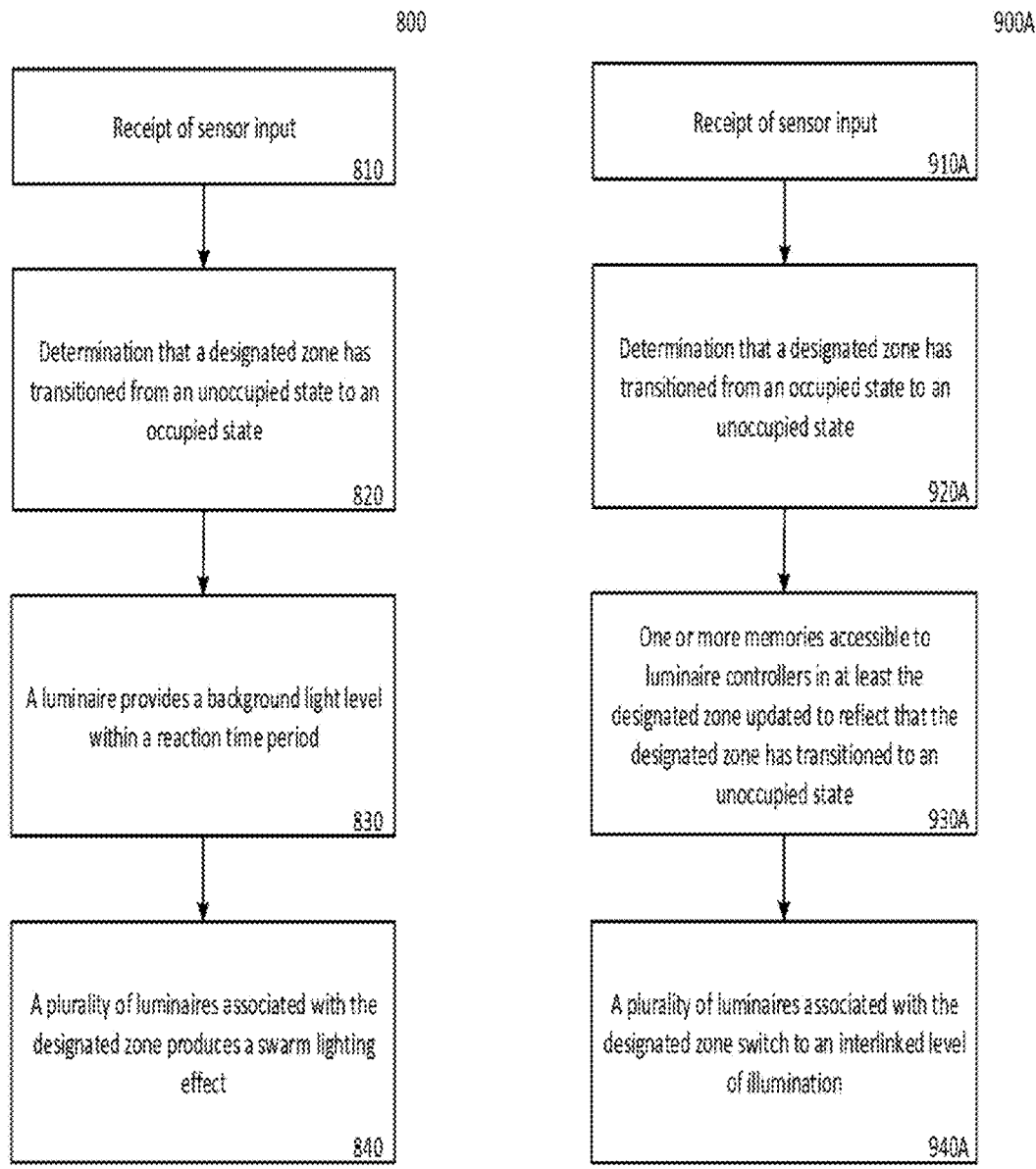
FIG. 8 illustrates an occupancy-based control method for responding to the detection of occupancy in a previously unoccupied space, performed by some embodiments of a system for managing environmental conditions.
FIG. 9A illustrates an occupancy-based control method for responding to the detection of a lack of occupancy in a previously occupied space, performed by some embodiments of a system for managing environmental conditions.

FIG. 8 illustrates an occupancy-based control method 800 for responding to the detection of occupancy in a previously unoccupied space, performed by some embodiments of a system for managing environmental conditions. It comprises steps 810-840. Method 800 may be performed, for example, by components of a system 100A or 100B depicted in FIGS. 1A and 1B respectively. In step 810, sensor input is received. The sensor input may be from one or multiple sensors and the sensor(s) may be any type of occupancy sensor such as a motion sensor. The sensor input may be received for processing by the sensor itself, or by one or more modules depicted in FIG. 1A or 1B (e.g. environment manager module 110, gateway module 120, or IP luminaire 150). In step 820, the sensor input is processed, and a determination is made that a designated zone has transitioned from an unoccupied state (e.g. without any occupants) to an occupied state (e.g. with at least one occupant). In step 830, in response to the determination made in step 820, at least one luminaire transitions from not providing illumination to providing a pre-configured background-level of illumination (e.g. Light Level 1) within a pre-configured reaction time period. In some embodiments, the luminaire that is more closely associated with a sensor sensing the change in occupancy status (e.g. the luminaire housing the sensor or otherwise physically proximate to the sensor) transitions first to the background-level of illumination. The at least one luminaire may be part of a single commissioned units or multiple commissioned units that are scoped to or otherwise associated with the designated zone.

In step 840, a plurality of luminaires associated with the designated zone produce a swarm lighting effect. A swarm lighting effect is produced when a plurality of luminaires each switches to a higher level of light, but the time at which each luminaire performs the transition occurs in accordance with its distance from a first luminaire performing the transition. Luminaires that are closer to the first luminaire perform the transition to a higher light level earlier than luminaires that are further away from the first luminaire. This creates the effect of light "spreading" throughout a space from a particular originating point. In some embodiments, the swarm effect, once started, may take place without further coordination from system modules such as environment manager module 110 or gateway module 130. For example, an IP luminaire such as IP luminaire 140 may not only cause its own light source (e.g. light source 140-2) to switch to producing a higher level of light, but may also communicate with another IP luminaire located proximally but further away from the first luminaire (e.g. IP luminaire 150) via, for example, its control module (e.g. control module 140-3) and link L7 such that IP luminaire 150 then switches its own light source (e.g. light source 150-2) to produce a higher level of light. In other embodiments, other system modules, such as environment manager module 110 or gateway module 130 may coordinate the swarm effect by, for example, selectively instructing luminaires or to turn on or produce a higher level of light.

Configurable Parameter: Interlinked Light Level

Interlinked Light Level is a configurable parameter associated with occupancy-based control of environmental conditions. In many embodiments, it signifies the level of light produced by a commissioned unit when occupancy is detected not by the commissioned unit itself but by one or more linked commissioned units. In many embodiments, the Interlinked Light Level parameter ranges from 0% to 100% of a luminaire's output, and may be configured at a 1% granularity. The commissioning tool may be used to configure the Interlinked Light Level for any commissioned unit, and the central dashboard or a manual or personal controller may be used to reset this parameter for one or more commissioned units.

FIG. 9A illustrates an occupancy-based control method 900 for responding to the detection of a lack of occupancy in a previously occupied space, performed by some embodiments of a system for managing environmental conditions. It comprises steps 910A-940A. Method 900A may be performed, for example, by components of a system 100A or 100B depicted in FIGS. 1A and 1B respectively. The method of FIG. 9A may be used to communicate occupancy information between linked commissioned units, which in turn may be used to achieve energy savings.

In step 910A, sensor input is received. The sensor input may be from one or multiple sensors and the sensor(s) may be any type of occupancy sensor such as a motion sensor. The sensor input may be received for processing by the sensor itself, or by one or more modules depicted in FIG. 1A or 1B (e.g. environment manager module 110 or gateway module 120). In step 920A, the sensor input is processed, and a determination is made that a designated zone has transitioned from an occupied state (e.g. with at least one occupant) to an unoccupied state (e.g. with no occupants). In step 930A, one or more memories accessible to luminaire controllers or commissioned units associated with luminaire controllers in at least the designated zone are updated to reflect that the designated zone has transitioned to an unoccupied state. In many embodiments, the one or more memories may also be accessible to other system modules such as environment manager module 110 and gateway module 130.

In step 940A, a plurality of luminaires or lighting units associated with the designated zone is transitioned to providing illumination at an Interlinked Light Level. The association with the designated zone may arise due to the plurality of luminaires or lighting units belonging to one or more commissioned units linked to a commissioned unit scoped to the designated zone. In many embodiments, the plurality of luminaires or lighting units is accessible to at least one IP luminaire or at least one commissioned unit in the designated zone. The plurality of luminaires or lighting units may be part of the same commissioned unit, or different commissioned units that are linked during the commissioning process. In some embodiments, the command or instruction to transition to an Interlinked Light Level may be propagated from one IP luminaire (e.g. IP luminaire 140 of system 100A) to another communicatively linked IP luminaire (e.g. IP luminaire 150 of system 100A) without coordination from more central system modules such as environment manager module 110 or gateway module 130. In some other embodiments, environment manager module 110 or gateway module 130 may instruct each commissioned unit linked to a commissioned unit in the designated zone to produce an Interlinked Light Level, and each IP luminaire that is part of the commissioned unit may thereafter cause its own luminaires to transition to the Interlinked Light Level. In some embodiments, a second commissioned unit linked to a first commissioned unit scoped to the designated zone may switch its luminaires or lighting units to the Interlined Light Level only if the second commissioned unit is not scoped to another zone that is occupied.

Figures 9B, 10:
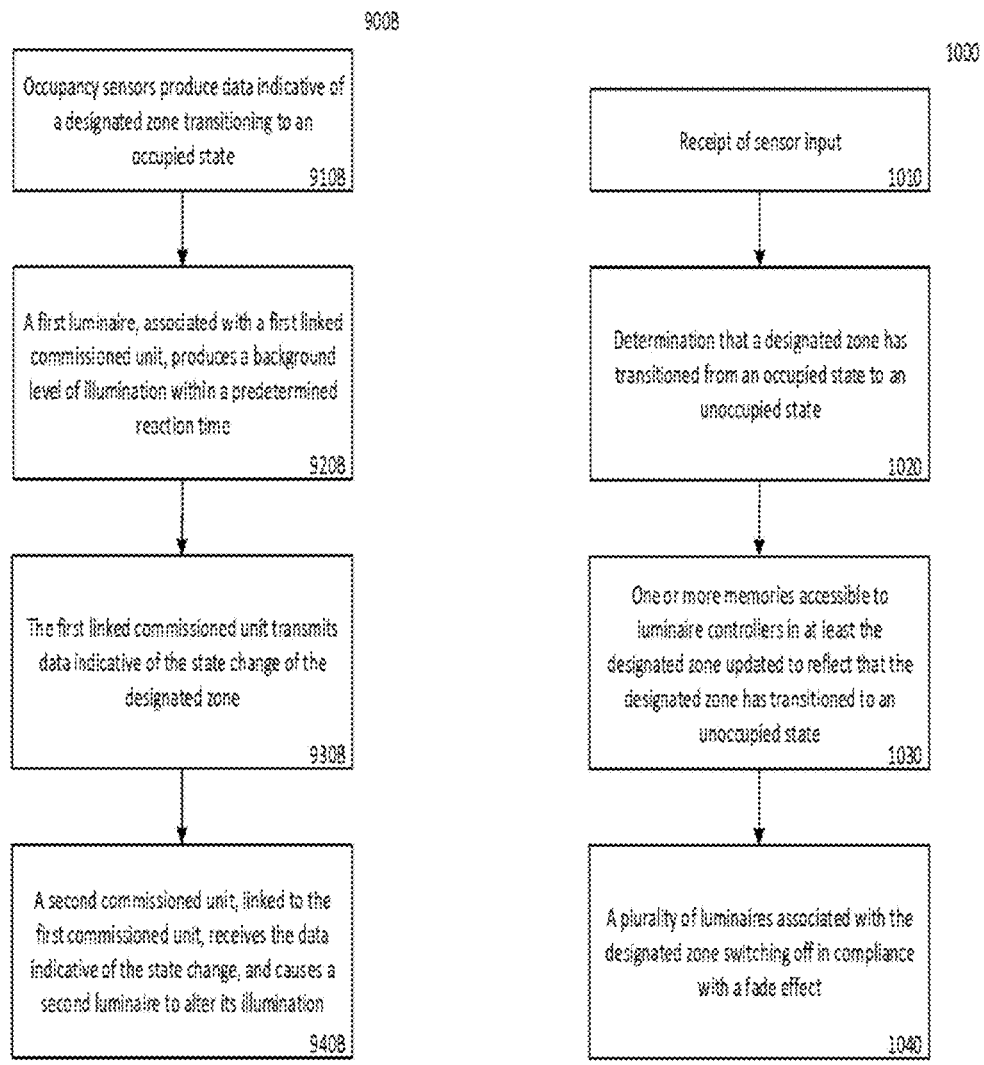
FIG. 9B illustrates an occupancy-based control method for responding to the detection of occupancy in a previously unoccupied space, performed by some embodiments of a system for managing environmental conditions.
FIG. 10 illustrates another occupancy-based control method for responding to the detection of a lack of occupancy in a previously occupied space, performed by some embodiments of a system for managing environmental conditions.

FIG. 9B illustrates an occupancy-based control method 900B illustrates an occupancy-based control method for responding to the detection of occupancy in a previously unoccupied space, performed by some embodiments of a system for managing environmental conditions. It comprises steps 910B-940B. Method 900B may be performed, for example, by components of a system 100A or 100B depicted in FIGS. 1A and 1B respectively.

In step 910B, occupancy sensors produce data indicative of a designated zone transitioning to an occupied state from an unoccupied state. In step 920B, at least a first luminaire, associated with a first linked commissioned unit, produces a background level of illumination within a predetermined reaction period following the production of the sensor data. The first linked commissioned unit may be linked to a plurality of commissioned units, and may be components of a system for managing environmental conditions described herein. In step 930B, the first linked commissioned unit transmits data indicative of the state change of the designated zone. In some embodiments, the data indicative of the state change may be transmitted by the first linked commissioned unit directly to another commissioned unit to which it is linked, or to a system module such as environment manager module 110 or gateway module 130. The first linked commissioned unit may also transmit the data by updating a memory accessible to other system modules or commissioned units with the data indicative of the state change. In step 940B, a second commissioned unit, linked to the first commissioned unit, receives the data indicative of the state change, and causes a second luminaire or lighting unit to alter its illumination. In some embodiments, the second commissioned unit itself retrieves the data indicative of the state change from, for example, a memory or system module that the first linked commissioned unit updated with the data indicative of the state change. The second luminaire or lighting unit may alter its illumination, by, for example, increasing or decreasing the light level or intensity of light it produces, changing the color or color temperature of the light it produces, or changing the direction of the light it produces. The desired alteration of its illumination may be stored on the second commissioned unit itself, or received from other system modules such as environment manager module 110 or gateway module 130.

Configurable Parameters: Grace Fading and Fade Time

The grace fading parameter indicates whether or not a fading effect taking place within a fade time will be performed by a commissioned unit when transitioning between one environmental condition (e.g. light level) to another. The parameter may be enabled or disabled for any commissioned unit that is capable of performing the fade effect. The commissioning tool or central dashboard may be used to configure the grace fading and fade time parameters for any commissioned unit, and the central dashboard or other manual or personal controller may be used to reset the parameter for commissioned units.

FIG. 10 illustrates another occupancy-based control method 1000 for responding to the detection of a lack of occupancy in a previously occupied space, performed by some embodiments of a system for managing environmental conditions. It comprises steps 1010-1040. Method 1000 may be performed by components of a system 100A or 100B depicted in FIGS. 1A and 1B respectively. The method of FIG. 10 may be used to communicate occupancy information between linked commissioned units so that energy savings may be achieved.

In step 1010, sensor input is received. The sensor input may be from one or multiple sensors and the sensor(s) may be any type of occupancy sensor such as a motion sensor. The sensor input may be received for processing by the sensor itself, or by one or more modules depicted in FIG. 1A or 1B (e.g. environment manager module 110, or gateway module 120). In step 1020, the sensor input is processed, and a determination is made that a designated zone has transitioned from an occupied state (e.g. with at least one occupant) to an unoccupied state (e.g. with no occupants). In step 1030, one or more memories accessible to IP luminaires or commissioned units in at least the designated zone are updated to reflect that the designated zone has transitioned to an unoccupied state. In many embodiments, the one or more memories may also be accessible to other system modules such as environment manager module 110 and gateway module 130.

In step 1040, a plurality of luminaires or commissioned units associated with the designated zone is switched off in compliance with a fade effect. The plurality of luminaires or commissioned units may be scoped to the designated zone directly or indirectly by being linked to one or more commissioned units that are scoped to the designated zone. The plurality of luminaires may be part of the same commissioned unit, or different commissioned units that are linked during the commissioning process.

The fade effect may involve gradually transitioning one or more luminaires or lighting units to producing lower levels of light until the luminaires or lighting units effectively produce no illumination. In some embodiments, a commissioned unit may only comply with the fade effect if a particular parameter (e.g. grace fading) is enabled for that unit. Other details with respect to the fade effect (e.g. the amount of time required to transition from providing the present level of light to a level of light associated with a switched off state) may be configured per commissioned unit. Accordingly, each commissioned unit participating in step 1040 to transition the plurality of luminaires or lighting units to a switched off state may perform its own version of the fade effect. In some embodiments, the command or instruction to transition to switching off may be received from a central system module such as environment manager module 110 or gateway module 130 by each commissioned unit scoped to the designated zone. The command may thereafter be processed and propagated from one IP luminaire (e.g. IP luminaire 140 of system 100A) to another communicatively linked IP luminaire (e.g. IP luminaire 150 of system 100A) of each commissioned unit without further coordination from system modules such as environment manager module 110 or gateway module 130.

Configurable Parameter: Hold Period

Hold period is a configurable parameter associated with occupancy-based control of environmental conditions. In many embodiments, hold period is the period of time needed for the system to ensure that a determined condition is correct or still applicable. It helps avoid situations where temporary changes in occupancy lead to frequent and unnecessary adjustments to environmental conditions. For example, after sensors initially indicate that a zone has become vacant, and if the sensors still indicate vacancy after the hold period has elapsed, this implies with a greater likelihood that the monitored zone is truly vacant and that the vacancy is not the result of occupants temporarily stepping outside the monitored zone. In many embodiments, the hold period may range from 1 to 35 minutes, with a default value of 15 minutes. Manual controllers may allow a user to alter the hold period with a granularity of 1 minute. The commissioning tool may be used to configure the hold period for any commissioned unit, and the central dashboard or other manual or personal controller may be used to reset the hold period for one or more commissioned units.

Configurable Parameter: Grace Period

Grace period is a configurable parameter associated with occupancy-based control of environmental conditions. In many embodiments, it signifies the time needed for the system to ensure that a determined detected environmental condition still persists after the passage of a particular period of time. In some embodiments, the grace period is an additional time period initiated after the hold period has expired, to provide an additional duration of time during which sensor output is monitored to determine if a detected change in occupancy is persistent for an even longer period of time. In many embodiments, the grace period may range from 0 to 25 seconds, with a default value of 5 seconds. Manual controllers may allow a user to alter the grace period with a granularity of 1 second. The commissioning tool may be used to configure the grace period for any commissioned unit, and the central dashboard or other manual or personal controllers may be used to reset the grace period for one or more commissioned units.

Configurable Parameter: Prolong Period

Prolong period is a configurable parameter associated with occupancy-based control of environmental conditions. In many embodiments, it signifies the time needed for the system to ensure that a determined detected environmental condition still persists after the passage of a particular period of time. In some embodiments, the prolong period is an additional time period initiated after a first grace period has expired, to provide an additional duration of time during which sensor output is monitored to determine if a detected change in occupancy is persistent for an even longer period of time. In many embodiments it is used as an added precautionary measure to ensure an area's unoccupied status just prior to turning luminaires or lighting units in the area off. Manual controllers may allow a user to manually alter the prolong period with a particular granularity. The commissioning tool may be used to configure the prolong period for any commissioned unit, and the central dashboard or other manual or personal controller may be used to reset the prolong period for one or more commissioned units.

Figure 11:
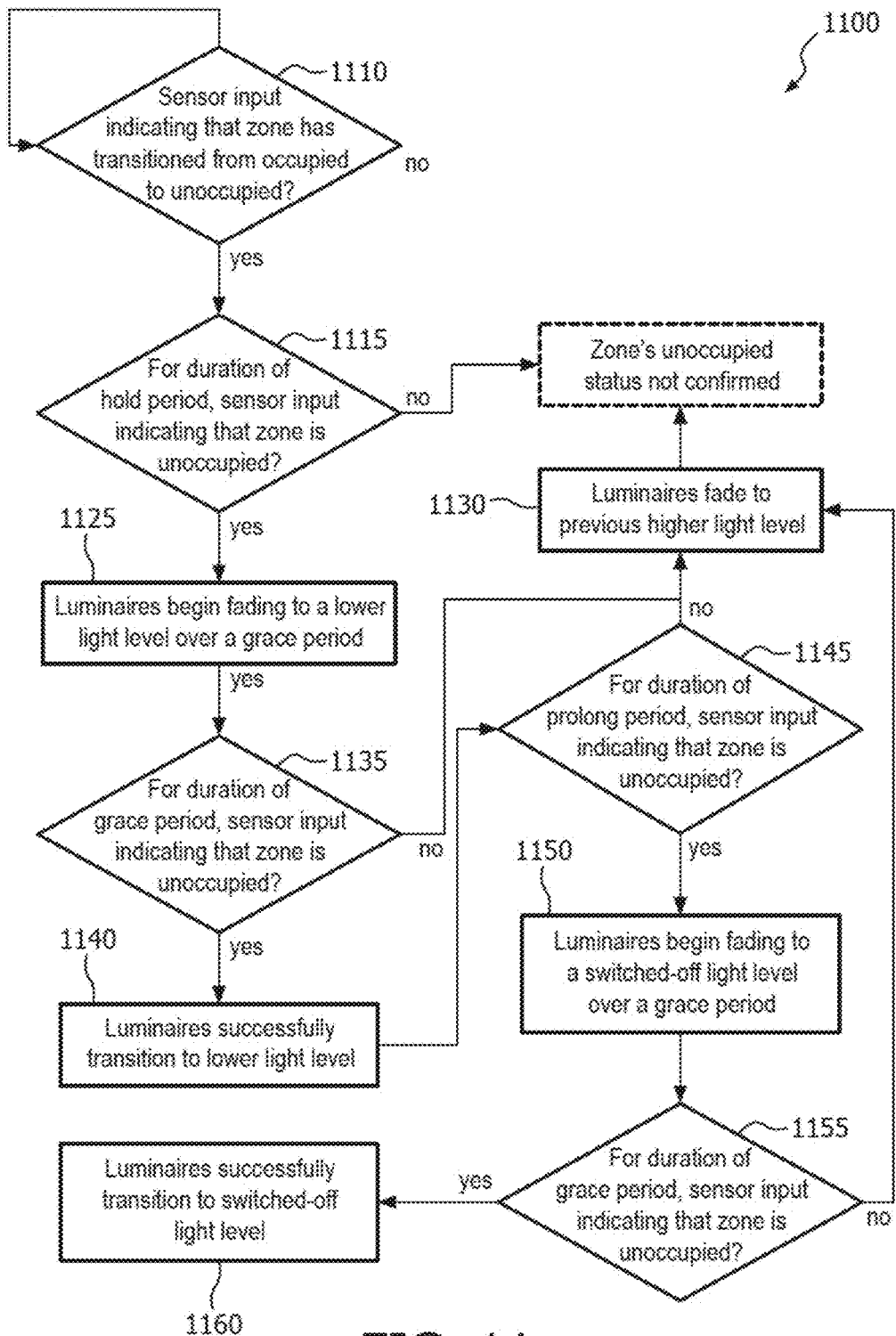
FIG. 11 illustrates an occupancy-based control method for responding to the detection of a lack of occupancy in a previously occupied space, performed by some embodiments of a system for managing environmental conditions, the method incorporating the use of a hold period, a grace period, and a prolong period for confirming occupancy status.

FIG. 11 illustrates an occupancy-based control method 1100 for responding to the detection of a lack of occupancy in a previously occupied space, performed by some embodiments of a system for managing environmental conditions. The method incorporates the use of a hold period, a grace period, and a prolong period for confirming occupancy status. It comprises steps 1110-1160. Method 1100 may be performed by components of a system 100A or 100B depicted in FIGS. 1A and 1B respectively. In step 1110, sensor input is processed to determine if a designated zone has transitioned from an occupied state (e.g. with at least one occupant) to an unoccupied state (e.g. with no occupants). The sensor input may be from one or multiple sensors and the sensor(s) may be any type of occupancy sensor such as a motion sensor. The sensor input may be processed by the sensor itself, or by one or more system modules depicted in FIG. 1A or 1B (e.g. environment manager module 110 or gateway module 120). If the result of the determination is negative (e.g. no transition from occupied to unoccupied state), then no action is taken. If the result of the determination is positive (e.g. designated zone has transitioned from an occupied to an occupied state), then a hold period is initiated, during which sensor input associated with the designated zone is monitored, but no change in environmental conditions owing to the determination in step 1110 is made. At the conclusion of the hold period, a determination is made in step 1115 as to whether for the entire hold period, the sensor input indicated that the designated zone remained unoccupied. If the determination in step 1115 is negative (e.g. the designated zone was occupied at some point during the hold period), then the designated zone's occupied status is not confirmed. In many embodiments, during any point in the hold period, sensor input indicating occupancy in the designated zone would result in the designated zone's occupied status failing to be confirmed (i.e. in these embodiments, there would be no need for the determination of step 1115 at the conclusion of the hold period). Under these circumstances, no change in environmental conditions owing to the determinations in steps 1110 or 1115 is made.

If the determination in step 1115 is positive (e.g. designated zone was unoccupied throughout the hold period), then control transfers to step 1125. In step 1125, a plurality of luminaires, lighting units, or light sources associated with the designated zone each begin a transition to a lower light level in compliance with a fade effect, and a grace period is initiated, during which sensor input associated with the designated zone is monitored. In many embodiments, the plurality of light sources is each accessible to at least one IP luminaire in the designated zone. The plurality of luminaires, lighting units, or light sources may also be part of the same commissioned unit, or different but linked commissioned units. At the conclusion of the grace period, a determination is made in step 1135 as to whether for the entire grace period, the sensor input indicated that the designated zone remained unoccupied. If the result of the determination is negative (e.g. designated zone became occupied during the grace period), then control transfers to step 1130, and the plurality of luminaires, lighting units, or light sources that began their transitions to a lower light level in step 1125 begin transitioning back to their previous (higher) light levels, in compliance with a fade effect. In many embodiments, during any point in the grace period, sensor input indicating occupancy in the designated zone would result in the designated zone's occupied status failing to be confirmed (i.e. in these embodiments, there would be no need for the determination of step 1135 at the conclusion of the grace period). These circumstances indicate that the designated zone's unoccupied status is not confirmed.

If the result of the determination in step 1135 is positive (e.g. designated zone remained unoccupied for the duration of the grace period), then in step 1140, the plurality of luminaires are allowed to complete their transition to the lower light level if the transition has not yet completed. Once the plurality of luminaires, lighting units, or light sources have transitioned to the lower light level, a prolong period is initiated.

At the conclusion of the prolong period, a determination is made in step 1145 as to whether for the entire prolong period, the sensor input indicated that the designated zone remained unoccupied. If the result of the determination is negative (e.g. designated zone became occupied during the prolong period), then control transfers to step 1130, and the plurality of luminaires, lighting units, or light sources that began their transitions to the lower light level in step 1125 begin transitioning back to their previous (higher) light levels, in compliance with a fade effect. In many embodiments, during any point in the prolong period, sensor input indicating occupancy in the designated zone would result in the designated zone's occupied status failing to be confirmed (i.e. in these embodiments, there would be no need for the determination of step 1145 at the conclusion of the prolong period). If the result of the determination in step 1145 is positive (e.g. designated zone remained unoccupied for the duration of the prolong period), then in step 1150, the plurality of luminaires, lighting units, or light sources begin their transition to a light level associated with a switched off state in compliance with a fade effect, and a second grace period is initiated. In many embodiments, the amount of time associated with the fade effect (e.g. the time it takes for a luminaire to transition to a different light level in accordance with the controlling fade effect) may be automatically reset so that the luminaires, lighting units, or light sources of a commissioned unit do not transition to a light level associated with a switched off state prior to the completion of the second grace period initiated in step 1150. Alternatively, if luminaires, lighting units, or light sources of a commissioned unit are close to completing the fade effect, and the grace period has not yet elapsed, the luminaires, lighting units, or light sources may wait to complete the transition until the grace period initiated in step 1150 has elapsed.

At the conclusion of the second grace period initiated in step 1150, a determination is made step 1155 as to whether for the entire second grace period, the sensor input indicated that the designated zone remained unoccupied. If the result of the determination is negative (e.g. designated zone became occupied during the grace period), then control transfers to step 1130, and the plurality of luminaires, lighting units, or light sources that began their transitions to a light level consistent with a switched off state in step 1150 begin transitioning back to their original (higher) light levels, in compliance with a fade effect. In many embodiments, during any point in the second grace period, sensor input indicating occupancy in the designated zone would result in the designated zone's occupied status failing to be confirmed (i.e. in these embodiments, there would be no need for the determination of step 1155 at the conclusion of the second grace period). If the result of the determination in step 1155 is positive (e.g. designated zone remained unoccupied for the duration of the prolong period), then in step 1160, the plurality of luminaires, lighting units, or light sources proceed to complete their transition to a light level consistent with a switched off state.

Configurable Parameter: Dwell Period

Dwell period is a configurable parameter associated with occupancy-based control of environmental conditions. In many embodiments, it signifies the time needed for the system to ensure that a user is situated at a space, rather than simply passing through it. When an area in question is occupied for the duration of the dwell period, this indicates that commissioned unit(s) in the area in question may assume the likelihood of more prolonged occupancy within the space and may transition to providing a higher level of lighting. In many embodiments, the dwell period may range from 0 to 30 seconds, with a default value of 10 seconds. Manual controllers may allow a user to alter the dwell period with a granularity of 1 second. The commissioning tool may be used to configure the dwell period for any commissioned unit, and the central dashboard or other manual or personal controllers may be used to reset the dwell period for one or more commissioned units.

In some embodiments, occupancy events are ignored for the duration of the dwell period, following the detection of a first occupancy event. In such embodiments, occupancy events may be monitored only are the dwell period expires. In such embodiments, only if occupancy is detected between the moment the dwell period expires and a hold period expires after the dwell period, will the area in question transition to the occupied state. Otherwise, the area will go back to being in the unoccupied state when the hold period expires.

Configurable Parameter: Smart Time

Smart time is a configurable parameter associated with occupancy-based control of environmental conditions. In many embodiments, if movement is detected during a grace period after a hold period, following a detection of vacancy, the system assumes that the hold time was set to be inadequately short (i.e. vacancy was concluded too soon after the last movement detection), and the hold time is extended once by the duration indicated by the smart time parameter. In many embodiments, if motion is detected after an extended hold time, the hold time is not further extended. In some embodiments, the smart time period may range from 0 to 15 minutes, with a default value of 10 minutes. The commissioning tool may be used to configure the smart time period for any commissioned unit, and the central dashboard or other manual or personal controller may be used to reset this parameter for one or more commissioned units. In many embodiments, smart time cannot accumulate.

Figure 12:
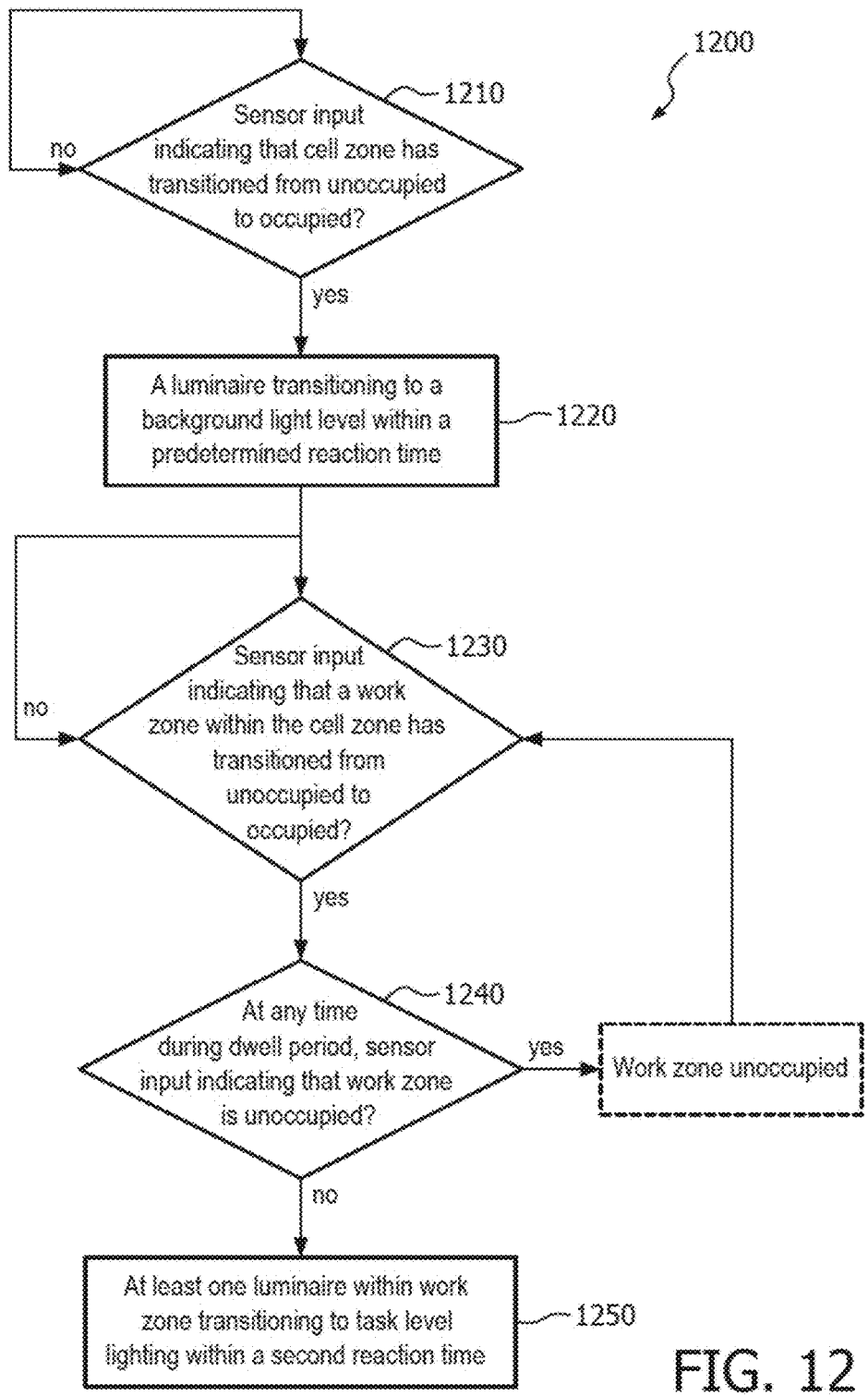
FIG. 12 illustrates an occupancy-based control method for responding to the detection of occupancy in a previously unoccupied cell zone, performed by some embodiments of a system for managing environmental conditions.

FIG. 12 illustrates an occupancy-based control method 1200 for responding to the detection of occupancy in a previously unoccupied cell zone, performed by some embodiments of a system for managing environmental conditions. It comprises steps 1210-1250. Method 1200 may be performed by components of a system 100A or 100B depicted in FIG. 1A or 1B, respectively. In step 1210, sensor input is processed to determine if a cell zone has transitioned from an unoccupied state (e.g. with no occupants) to an occupied state (e.g. with at least one occupant). The sensor input may be from one or multiple sensors and the sensor(s) may be any type of occupancy sensor such as a motion sensor. The sensor input may be processed by the sensor itself, or by one or more system modules depicted, for example, in FIG. 1A or 1B (e.g. environment manager module 110 or gateway module 120). If the determination is negative (e.g. no transition from unoccupied to occupied state), then control remains at step 1210 until a later processing of the sensor input(s) indicates such a transition. If the determination is positive (e.g. sensor input indicates transition of the cell zone from an unoccupied to an occupied status), then in step 1220, in response to the determination made in step 1210, at least one luminaire (or lighting unit or light source) transitions from not providing illumination to providing a pre-configured background level of light (e.g. Light Level 1) within a pre-configured reaction time period. In some embodiments the luminaire that is more closely associated with a sensor sensing the change in occupancy status (e.g. the luminaire housing the sensor or otherwise physically most proximate to the sensor) transitions first to the background level of light. The at least one luminaire may be part of a single commissioned unit or multiple commissioned units that are scoped to or otherwise associated with the cell zone.

In step 1230, sensor input from within the cell zone is processed to determine if a work zone within the cell zone has transitioned from an unoccupied to an occupied state. If the determination is negative (e.g. no transition of the work zone from an unoccupied to an occupied state), then control remains at step 1230 until a later processing of sensor input indicates such a transition. If the determination in step 1230 is a positive one (e.g. sensor input indicates transition of the work zone from an unoccupied to an occupied status), then a dwell period is initiated, occupancy in the work zone is monitored, and control transitions to step 1240. Step 1240 involves monitoring occupancy in the work zone, and determining whether at any time during the dwell period, sensor input indicates that the work zone is unoccupied. If the work zone is found to be unoccupied at any time during the dwell period, then no environmental changes are made in the work zone, the dwell period is ended, and control transfers back to the step 1230. If throughout the dwell period, the work zone never became unoccupied, then control transfers to step 1250, and at least one luminaire (or lighting unit or light source) within the work zone transitions to a task-level of light (e.g. Light Level 2) within a pre-configured reaction time.

Figure 13:
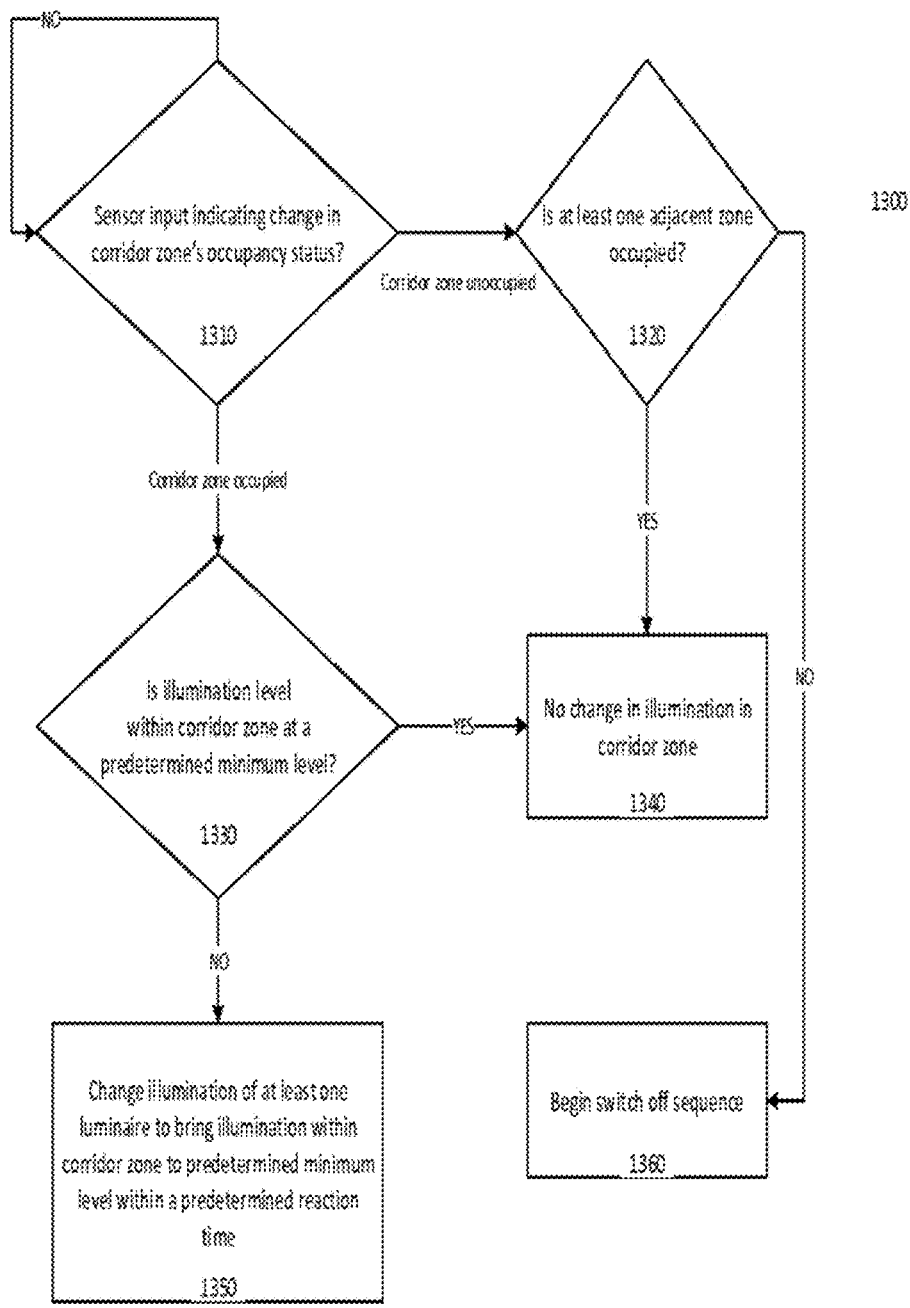
FIG. 13 illustrates an occupancy-based control method for responding to the detection of a change in occupancy in a corridor zone, performed by some embodiments of a system for managing environmental conditions.

FIG. 13 illustrates an occupancy-based control method 1300 for responding to the detection of a change in occupancy in a corridor zone, performed by some embodiments of a system for managing environmental conditions. It comprises steps 1310-1360. Method 1300 may be performed by components of a system 100A or 100B depicted in FIG. 1A or 1B, respectively. In step 1310, sensor input is processed to determine if there is a change in a corridor zone's occupancy status. The sensor input may be from one or multiple sensors and the sensor(s) may be any type of occupancy sensor such as a motion sensor. If there is no change in occupancy status, then control remains in step 1310, and sensor input may again be processed at a later time. If the determination in step 1310 indicates that there is a change in the corridor zone's occupancy status resulting in the corridor zone being unoccupied, then control transfers to step 1320. If the determination in step 1310 indicates that there is a change in the corridor zone's occupancy status resulting in the corridor zone being occupied, then control transfers to step 1330.

In step 1320, a determination is made as to whether at least one zone adjacent to the corridor zone is occupied. This determination may be made by one or more commissioned units in or otherwise associated with the corridor zone. For example, in some embodiments, a commissioned unit in the corridor zone may identify commissioned units in adjacent zones using its own location information and the location information of other commissioned units. Once at least one commissioned unit in each adjacent zone is identified, their occupancy statuses may be retrieved in some embodiments by querying or otherwise retrieving the information from the commissioned units directly. In other embodiments, a commissioned unit in the corridor zone may access the occupancy statuses of the adjacent commissioned units from one or more remote memories associated with other system modules such as the environment manager module 110 or gateway module 130 of system 100A. The location information of commissioned units may be stored locally on one or more memories of the commissioned unit in the corridor zone (e.g. cached) or stored remotely on one or more memories remotely accessible to the commissioned unit in the corridor zone (e.g. at one or more memories associated with environment module 110 or gateway module 130 of system 100A). If the result of the determination in step 1320 is positive (e.g. at least one zone adjacent to the corridor zone is occupied), then in step 1340, no change is made to the illumination in the corridor zone. If the determination in step 1320 is negative (e.g. no zone adjacent to the corridor zone is occupied), then in step 1360, a switch off sequence is initiated in order to transition luminaires (or lighting units or light sources) in the corridor zone to producing no illumination.

In step 1330 a determination is made as to whether or not the level of illumination within the corridor zone is at a predetermined minimum level. In some embodiments, this determination is made with respect to the entire corridor zone, and in other embodiments, this determination is made with respect to an area proximate to the sensor(s) producing the sensor input indicating, in step 1310, that a change occurred in the corridor zone's occupancy status. In some embodiments, this determination may be made by hardware, firmware or computer code associated with one or more commissioned units in the corridor zone, by hardware, firmware or computer code associated with one or more modules of system 100A, or any combination thereof. If the result of the determination in step 1330 is positive (i.e. illumination level of corridor zone is at or above the predetermined minimum level), then in step 1340, no change is made to the illumination in the corridor zone. If the result of the determination in step 1330 is negative (i.e. illumination level of corridor zone is below the predetermined minimum level), then in step 1350, one or more commissioned units in the corridor zone causes the illumination level provided by one or more associated luminaires (or lighting units or light sources) to be increased such that the level of illumination within the corridor zone is increased to the predetermined minimum level within a predetermined reaction time.

Figure 14:
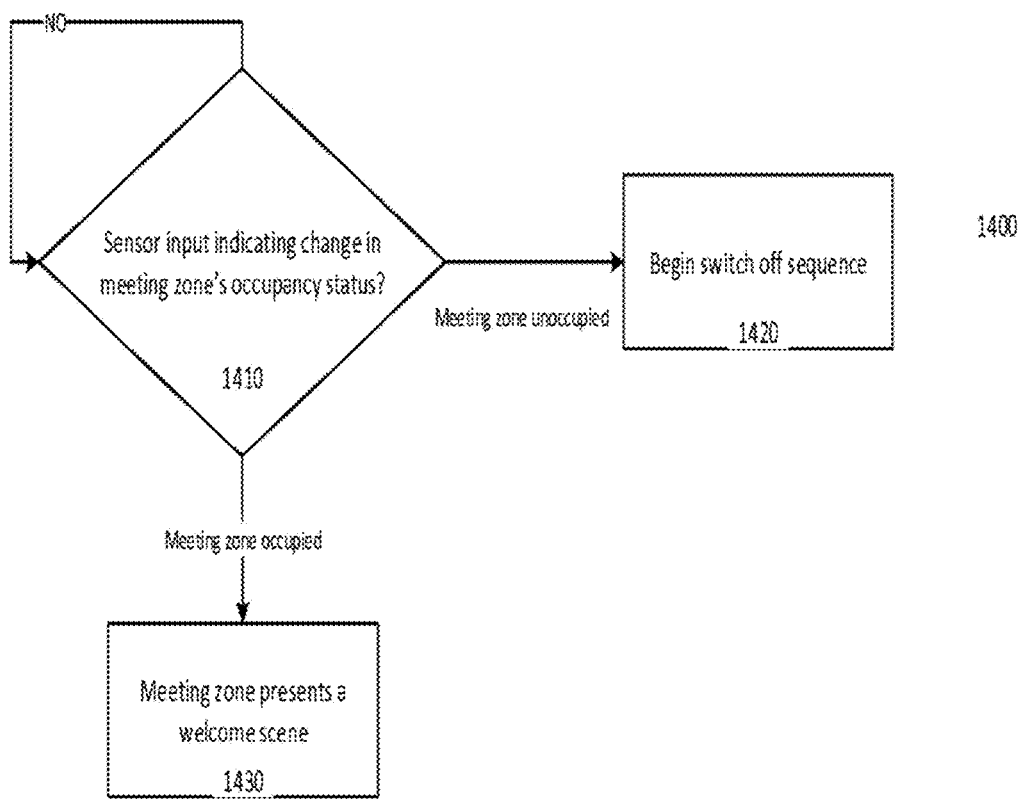
FIG. 14 illustrates an occupancy-based control method for responding to the detection of a change in occupancy in a meeting zone, performed by some embodiments of a system for managing environmental conditions.

FIG. 14 illustrates an occupancy-based control method 1400 for responding to the detection of a change in occupancy in a meeting zone, performed by some embodiments of a system for managing environmental conditions. It comprises steps 1410-1430. Method 1400 may be performed by any combination of components of a system 100A or 100B depicted in FIGS. 1A and 1B, respectively. In step 1410, sensor input is processed to determine if there is a change in a meeting zone's occupancy status. The sensor input may be from one or multiple sensors and the sensor(s) may be any type of occupancy sensor such as a motion sensor. If there is no change in occupancy status, then control remains in step 1410, and sensor input may again be processed at a later time. If the determination in step 1410 indicates that there is a change in the meeting zone's occupancy status resulting in the meeting zone becoming unoccupied, then control transfers to step 1420. If the determination in step 1410 indicates that there is a change in the meeting zone's occupancy status resulting in the meeting zone becoming occupied, then control transfers to step 1430. In step 1420, a switch off sequence is initiated in order to transition the meeting zone to producing no illumination. In step 1430, one or more commissioned units present a welcome scene. The welcome scene may require, for example, one or more task lights to produce a higher light level, while ambient lights are dimmed. In addition, decorative lighting may produce a color complimenting the room's color scheme.

Configurable Parameter: False Positive Detection

False positive detection is a configurable parameter associated with occupancy-based control of environmental conditions. In many embodiments, if occupancy is detected, the system and/or individual luminaires and/or lighting units may analyze various signals and pieces of data to determine a likelihood that the detected occupancy is legitimate (e.g., someone really has entered the room) or a false positive. In many embodiments, these signals and pieces of data may include sensor input from one or more occupancy sensors (e.g., motion detectors), occupancy states of luminaires or lighting units that are proximate to the sensor the detected the occupancy, and/or occupancy history of one or more lighting units or luminaires (e.g., associated with or proximate to the detecting sensor). If a detected occupancy is likely legitimate, the lighting unit and/or luminaire make take appropriate action, such as energizing one or more LEDs. If the detected occupancy is likely a false positive, the lighting unit and/or luminaire may disregard it.

Various aspects of the false positive detection parameter may be configured using various aspects of the system, such as the commissioning tool. For example, a user may adjust which of the aforementioned signals and pieces of data are considered, how each signal and/or piece of data is weighted in calculating the likelihood that a detected occupancy is legitimate or a false positive, and/or what thresholds the calculated likelihood must satisfy in order for the occupancy detection to be considered legitimate or a false positive.

In some embodiments, users may be able to provide feedback on whether a particular legitimate/false positive outcome is accurate. This feedback may be used to alter various aspects of the false positive detection parameter, e.g., using machine learning techniques. For example, suppose a lighting unit determines (based on one or more of the aforementioned signals and data points) that a legitimate occupancy detection has occurred, and energizes one or more LEDs in response. An administrator may determine, e.g., by reviewing building access logs, CCTV video, etc., that the occupancy detection was in fact a false positive, and may provide input indicating as much. A machine learning classifier may take the administrator's input into account the next time it calculates a likelihood that an occupancy detection from the same sensor (or another sensor) is legitimate. Such feedback provided repeatedly over time may be used to "train" the machine learning classifier.

Figure 28:
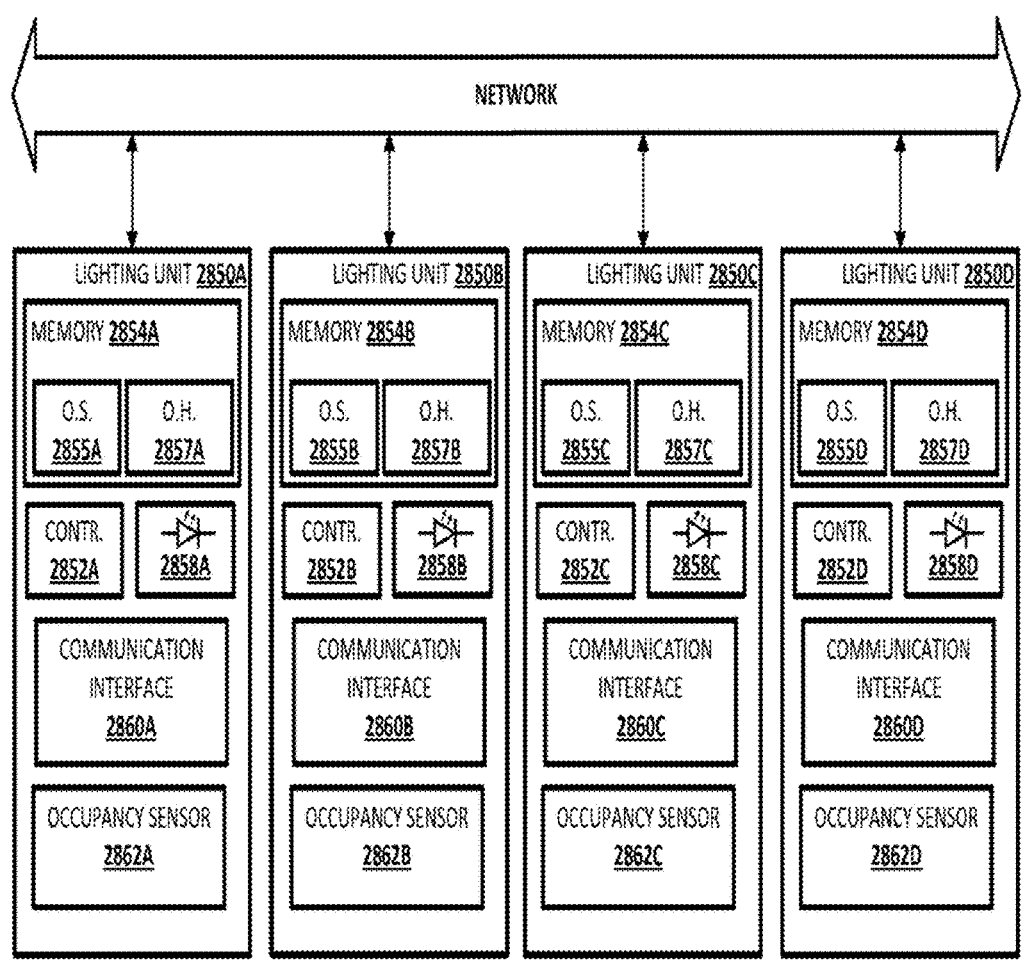
FIG. 28 illustrates how one or more lighting units of a lighting system may determine whether an occupancy detection is legitimate, in accordance with various embodiments.

FIG. 28 depicts an example environment in which selected aspects of the present disclosure pertaining to false positive detection may be implemented, in accordance with various embodiments. FIG. 28 depicts a plurality of lighting units 2850A-D similar to those depicted in FIG. 1, all operably connected to each other via a network (e.g., IPv6, ad hoc, Wi-Fi, etc.). Each lighting unit 2850 may be configured with selected aspects of the present disclosure to facilitate identification of illegitimate occupancy detections. In this example, each lighting unit 2850 includes (referenced with a corresponding letter "A-D") controller 2852 (also referred to as a "control module"), memory 2854 (which may be RAM, ROM, flash, etc.) operably coupled with controller 2852, one or more light sources 2858 (in this example, light sources are LEDs) operably coupled with controller 2852, a communication interface 2860 operably coupled with controller 2852, and an occupancy sensor 2862 operably coupled with controller 2852. In some embodiments, all light sources of a lighting unit 2850 may be the same type of light source. In other embodiments, more than one type of light source may be employed on a single lighting unit 2850. In various embodiments, communication interface 2860 may facilitate communication between a lighting unit 2850 and other lighting units or remote computing devices using various technologies, including but not limited to ad hoc technologies such as ZigBee, coded light, Ethernet, RS485, wireless (e.g., Wi-Fi, BlueTooth), and so forth. While occupancy sensors 2862 are shown as integral with lighting units 2850, this is not meant to be limiting. Standalone occupancy sensors (not depicted) may be employed in addition to or instead of the depicted integral occupancy sensors 2860.

Memory 2854 of each lighting unit 2850 may store at least two pieces of information: an occupancy state ("O.S." in FIG. 28) 2855 and an occupancy history ("O.H." in FIG. 28) 2857 for that respective lighting unit. Control module 2852 of each lighting unit 2850 may be configured to receive, from one or more occupancy sensors 2862, a signal indicative of detection, by one or more occupancy sensors 2862, of occupancy near the respective lighting unit 2850. Control module 2852 of each lighting unit 2850 may be further configured to determine one or more occupancy states 2855 of one or more remote lighting units 2850 within a given proximity of the respective lighting unit 2850. For example, controller 2852A of first lighting unit 2850A may be configured to determine occupancy states 2855B-D of lighting units 2850B-D, assuming lighting units 2850B-D are sufficiently proximate to first lighting unit 2850A. Controller 2852A may determine occupancy states 2855B-D in various ways. In some embodiments, controller 2852A may broadcast a request for occupancy states across the IPv6 network (or whatever type of network is employed), and may receive occupancy states in response. In other embodiments, controller 2852A may determine occupancy states of other lighting units 2850 based on illumination states of those lighting units. For instance, if one or more light sources 2858 of a lighting unit 2850 are energized, it may be presumed that the lighting unit 2850 has an occupancy state set to "occupied." Additionally or alternatively, a lighting unit may emit coded light that carries its occupancy state.

Controller 2852 of each lighting unit 2850 may be further configured to determine an occupancy history 2857 associated with that lighting unit 2850. In various embodiments, occupancy history 2857 for a given lighting unit 2850 may include records of legitimate detections of occupancy by one or more corresponding occupancy sensors 2862. In some embodiments, occupancy history 2857 for a given lighting unit 2850 may additionally or alternatively include records of illegitimate detections of occupancy by one or more corresponding occupancy sensors 2862. In the embodiment depicted in FIG. 28, controller 2852 may obtain occupancy history records from local memory 2854. However, this is not meant to be limiting. In other embodiments, controller 2852 may be configured to receive data indicative of the occupancy history of a respective lighting unit 2850 via communication interface 2860, e.g., from a central server that stores such records.

In various embodiments, controller 2852 of each lighting unit 2850 may be further configured to calculate, based on the one or more occupancy states and/or the detected occupancy history, a likelihood that the detection of occupancy by one or more occupancy sensors 2862 is legitimate. For example, if no nearby lighting units 2850 detect occupancy, that may cause controller 2852 to calculate a relatively low likelihood that the occupancy detection by corresponding occupancy detection sensor 2862 is legitimate. Additionally or alternatively, suppose an occupancy is detected by occupancy sensor 2862 in the middle of the night, but occupancy history 2857 reveals that very few overnight occupancy detections are legitimate. Under such circumstances, controller 2852 may calculate a relatively low likelihood that the occupancy detection by corresponding occupancy detection sensor 2862 is legitimate. In some embodiments, the likelihood that an occupancy detection is legitimate may be calculated based on both occupancy states of neighboring lighting units 2850 and occupancy history of the lighting unit 2850 that detected the occupancy. Each data point may be weighted in various ways, e.g., as manually adjusted by a user or automatically adjusted using machine learning techniques.

Based on the calculated likelihood that a detected occupancy is legitimate, controller 2852 of each lighting unit 2850 may be configured to set an occupancy state 2855 of the lighting unit 2850. In some embodiments, the occupancy state 2855 may be set to "occupied" (which may, for instance, cause controller 2852 to energize light sources 2858) when the calculated likelihood satisfies a particular threshold, which may be user-set or automatically determined (e.g., using machine learning). If the calculated likelihood fails to satisfy the threshold, on the other hand, then the occupancy detection may be ignored.

Suppose occupancy sensor 2862B of second lighting unit 2850B detects an occupant nearby. Controller 2852B may determine occupancy states 2855A and C-D of lighting units 2850A and C-D by broadcasting a request through communication interface 2860B for occupancy states of nearby (e.g., neighboring) lighting units. Controller 2852B may also examine records of occupancy history 2857B, e.g., to determine whether the detected occupancy comports with a general pattern of legitimate occupancy detections. Suppose occupancy states 2855A and C-D of lighting units 2850A and C-D are "occupied," and that occupancy history 2857B reveals that occupancy detection during the current time of day is common. Controller 2852B may calculate a relatively high likelihood that the occupancy detection is legitimate, and may, for instance, energize one or more lighting units 2858B. On the other hand, suppose occupancy states 2855A and C-D of lighting units 2850A and C-D are "unoccupied," and that occupancy history 2857B reveals that occupancy detection during the current time of day is rare. Controller 2852B may calculate a relatively low likelihood that the occupancy detection is legitimate, and may, for instance, ignore or disregard the occupancy detection.

Figure 29:
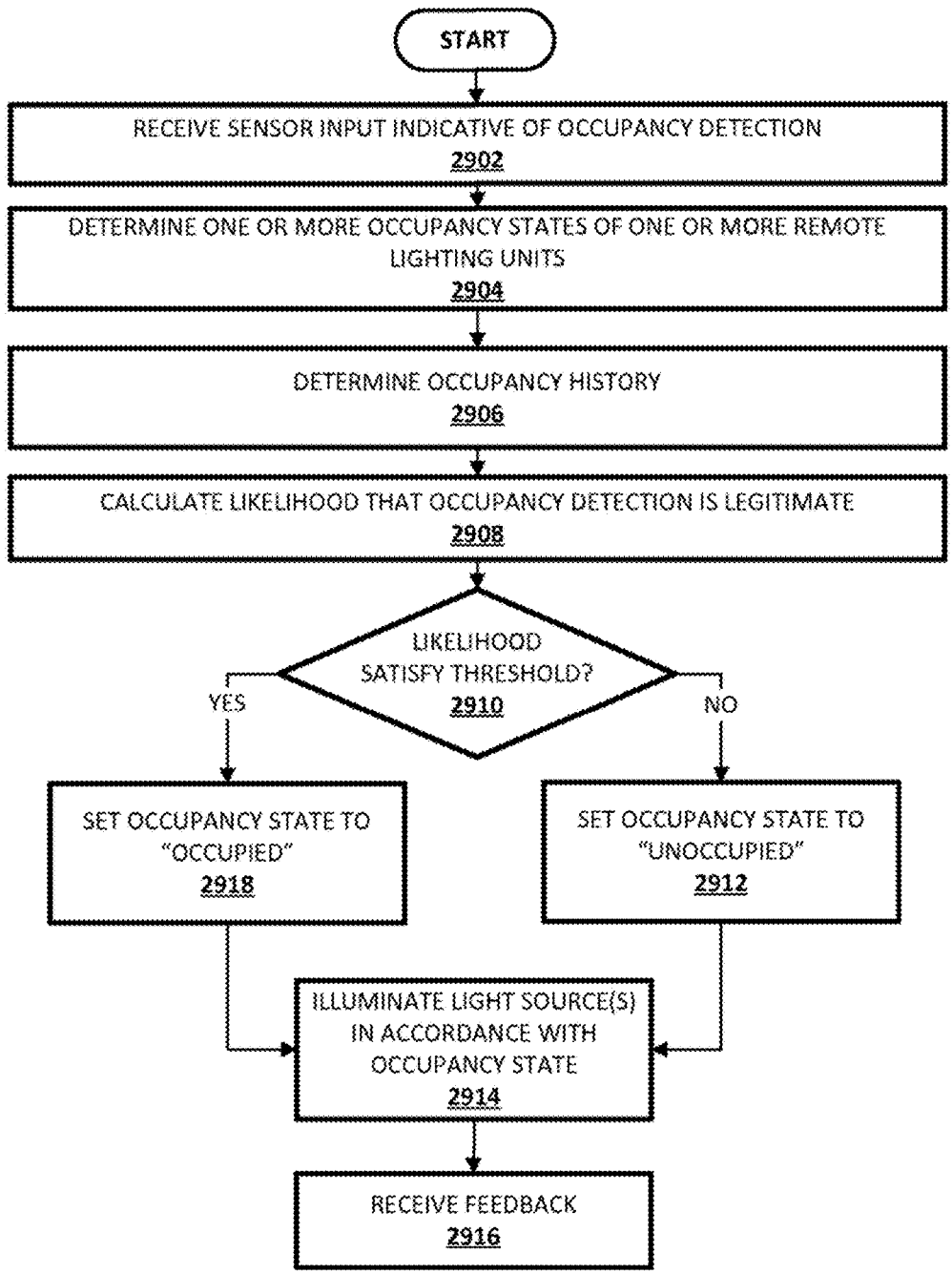
FIG. 29 depicts an example method for determining whether an occupancy detection is legitimate, in accordance with various embodiments.

FIG. 29 depicts an example method 2900 that may be performed at least in part using and/or by a lighting unit (e.g., 2850) configured with selected aspects of the present disclosure. While various operations are depicted in a particular order, this is not meant to be limiting. One or more operations may be reordered, added, and/or omitted. At block 2902, a lighting unit controller (e.g, 2852) may receive, e.g., from one or more occupancy sensors (e.g., 2862) co-located in a lighting unit (e.g., 2850) with the controller, sensor input indicative of occupancy detection.

At block 2904, the lighting unit controller may determine one or more occupancy states of one or more remote lighting units. For example, the lighting unit controller may broadcast a request over one or more networks to other lighting units to provide their occupancy states, to which one or more remote lighting units may respond. Additionally or alternatively, the lighting unit may sense one or more coded light signals carried in light emitted by one or more remote lighting units that indicate the remote lighting unit's occupancy state. Additionally or alternatively, the lighting unit may infer a remote lighting unit's occupancy state by a state of illumination provided by the remote lighting unit (e.g., brightness above a particular threshold means "occupied," brightness below a threshold means "unoccupied", a particular color or hue indicates "occupied," etc.).

At block 2906, the lighting unit controller may determine an occupancy history of its lighting unit. In some embodiments, the lighting unit contoller may consult occupancy history records stored locally in memory (e.g., 2854) of the lighting unit. In some embodiments, the lighting unit controller may obtain occupancy history records from a remote computing device, such as a central server or another of the various components depicted in FIGS. 1-28.

At block 2908, the lighting unit controller may calculate a likelihood that the occupancy detection received at block 2902 was legitimate or a false positive. For example, the lighting unit controller may calculate a first score based on the occupancy states of neighboring lighting units received at block 2904, a second score based on the occupancy history determined at block 2906, and may calculate a likelihood based on some weighted combination of the first and second scores. In some embodiments, the lighting unit controller may take an average of the first and second scores as the likelihood that a detected occupancy is legitimate.

At block 2910, the lighting unit controller may determine whether the likelihood calculated at block 2908 satisfies one or more thresholds. As noted above, these thresholds may be user-selected, automatically calculated (e.g., using a machine learning classifier), and so forth. If the answer at block 2910 is no, then method 2900 may proceed to block 2912. At block 2912, the lighting unit controller may set an occupancy state of the lighting unit to "unoccupied" (or leave it in an "unoccupied" state). In some embodiments, at block 2914, the lighting unit controller may illuminate one or more light sources in accordance with the occupancy state. For example, if at block 2912, the occupancy state was set to "unoccupied," the lighting unit controller may turn off one or more light sources and/or reduce brightness of light they emit.

At block 2916, the lighting unit controller or a controller of another computer device (e.g., a central server) may receive user feedback indicative of whether the determination at block 2910 was satisfactory. For example, user may indicate that given the calculated likelihood, the threshold considered at block 2910 should have been satisfied. This feedback may be provided to an administrator, so that the administrator may adjust thresholds or other aspects as necessary. Additionally or alternatively, the feedback may be used to further train a machine learning classifier.

Back at block 2910, if the answer is yes, then method 2900 may proceed to block 2918. At block 2918, the lighting unit controller may set an occupancy state of the its lighting unit to "occupied." Method 2900 may then proceed through blocks 2914 and 2916 in a similar manner as described above, except that the state will be "occupied" instead of "unoccupied." For example, the lighting unit controller may energize one or more light sources to emit light having a relatively high level of brightness, such as task lighting.

In some embodiments, a lighting unit may selectively consider and/or weight an occupancy state and/or occupancy history received from a neighboring lighting unit depending on various factors, such as topology and/or distance. For example, a lighting unit may assign a relatively low weight to an occupancy state received from a neighboring lighting unit if the two lighting units are not within line of sight (meaning, it is possible that an occupancy sensor of one lighting unit detected occupancy that would not be visible to the other. Additionally or alternatively, a lighting unit may weight occupancy states received from remote lighting units in proportion to distances between the lighting unit and the remote lighting units. Additionally or alternatively, a lighting unit may weight signals received from a remote lighting unit with a history of frequent false positives less heavily than, say, a more reliable remote lighting unit.

Additionally or alternately, in some embodiments, lighting unit controllers (e.g., 2852) and/or some other logic in communication therewith may employ various technology (e.g., facial recognition, RFID tags, other biometrics, etc.) to identify occupants in a room. The occupants' identities may then be used to judge whether occupancy detection should truly be used to illuminate other lighting units. Suppose a first lighting unit in a common area (e.g., a shared hallway, near elevators, etc.) detects presence of, and also facially recognizes, a particular employee walking by, and that a second lighting unit nearby (e.g., further into a particular department) merely detects the employee's presence. Suppose further that this employee works in another area, and that the employee routinely passes by the common area without stopping. The second lighting unit may request the occupancy state from the first lighting unit, and the first lighting unit may provide the employee's identity. The second lighting unit, or a remote computing device acting on behalf of the second lighting unit, may then determine, based on the employee's identity, that the employee is likely just passing by, not entering the area. Accordingly, the second lighting unit may assign little to no weight to the occupancy state received from the first lighting unit, and may consequently deem its occupancy detection to be a "false positive."

Daylight-Based Control
Configurable Parameters: MaxRegulationLightLevel, MinRegulationLightLevel Using the commissioning tool, an authorized user such as a commissioning engineer may configure parameters indicative of maximum and minimum light levels that may be achieved in an area under daylight-based control. In some embodiments, the parameters MaxRegulationLightLevel and MinRegulationLightLevel may each be set be equal to the occupancy-based control parameters MaxWhenOccupied and MinWhenOccupied, respectively.

Configurable Parameter: Daylight Harvesting

Daylight harvesting is a configurable parameter associated with daylight-based control of environmental conditions. In many embodiments, if enabled for one or more commissioned units, it allows daylight-based regulation of light levels in an area scoped to those commissioned units. In many embodiments, daylight harvesting, when enabled, works to maintain light levels in a space within a particular range (e.g. MinimumRegulationLightLevel to MaximumRegulationLightLevel).

Adjusting Illumination Set-Point—Calibrated Maximum Parameter

When a user manually configures or adjusts the illumination set-point of a commissioned unit, a parameter of the configured unit (e.g. CalibratedMaximum) is set to the new set-point value. The commissioned unit may still be regulated based on daylight-based controls, but the new set-point value will be used to regulate environmental conditions associated with the commissioned unit.

Figure 15:
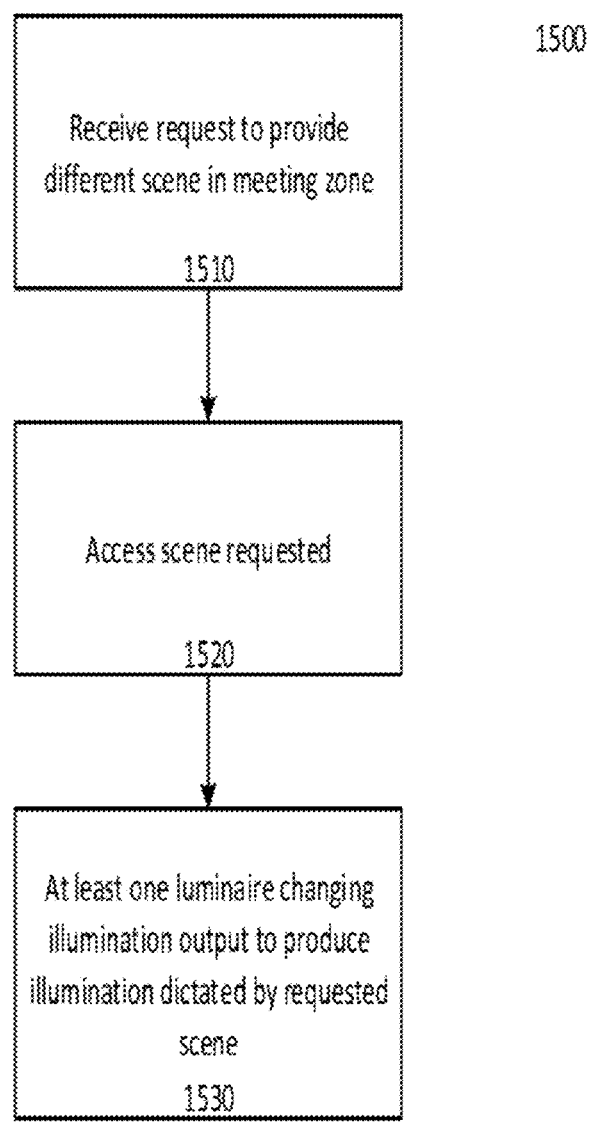
FIG. 15 illustrates a method for responding to a request for a different environmental scene in a meeting zone, performed by some embodiments of a system for managing environmental conditions.

FIG. 15 illustrates a method 1500 for responding to a request for a different environmental scene in a meeting zone, performed by some embodiments of a system for managing environmental conditions. It comprises steps 1510-1530. Method 1500 may be performed by any combination of components of a system 100A or 100B depicted in FIGS. 1A and 1B, respectively. In step 1510, a request to provide a different scene in a meeting room is received. In some embodiments, the request may be created as a result of a user selecting and requesting a scene from a graphical user interface displayed on an environmental control device 160 of system 100A, such as a smart phone. The request may thereafter be transmitted an environment manager module, such as module 110 via link L2, as depicted in FIG. 1A. In some other embodiments, the request may be generated automatically by one or more sensors sensing occupancy in the previously unoccupied meeting zone and requesting a default welcome scene.

In step 1520, the requested scene is accessed. A scene may be a collection of predetermined environmental parameters that transforms the environmental conditions in a particular zone is a prescribed way. The environmental conditions affected may be, for example, lighting conditions, temperature, humidity and air flow. Each environmental condition prescribed in a scene may be tied to particular one or more commissioned units or to particular types of commissioned units. Moreover, scenes may comprise very specific environmental conditions (e.g. requiring a particular commissioned unit or type of commissioned unit to produce light of a particular color at a particular intensity), or they may be specified more generally, allowing commissioned units involved in producing the scene some discretion to choose specific values (e.g. specifying a range of colors or a range of light levels in a particular region in the meeting room and allowing an implementing commissioning unit to choose values within the prescribed range). A collection of preconfigured environmental scenes may be stored on one or more memories accessible to, for example, the environment manager module 110 or gateway module 130 of system 100A, or any commissioned unit associated with the meeting zone referenced in step 1510. For example, an area controller such as area controller 420 may be such a commissioned unit capable of accessing a requested scene. In many embodiments, such a commissioned unit may be communicatively coupled to one or more IP luminaires that control lighting conditions in various portions of the meeting room.

In some embodiments, in step 1520, the environment control module 110 or gateway module 130 of the system may access one or more memories to retrieve details associated with the requested scene (e.g. the collection of specified environmental conditions to be recreated in particular areas of a space). Different predetermined scenes, each associated with a unique identifier, may be stored in a database, and accessing a requested scene in step 1520 may involve matching the unique identifier of the scene requested in step 1520 with the unique identifier of a scene stored in the in the aforementioned one or more memories.

In step 1530, the requested scene is applied. In some embodiments, respective details of the requested scene are transmitted from a system module (e.g. environment manager module 110 or gateway module 130 of system 100A) to respective commissioned units (e.g. IP controller 140 and 150 of system 100A) for application. For example, a scene may require that all walls in a room be washed in red light of particular dimness, and all task lights in the room be dimmed up to a particular level. In some embodiments, these details may be codified in an environment control command and transmitted by the environment manager module 110 to an area controller (e.g. area controller 320) controlling the room in question. The area controller may thereafter transmit the commands for changing the wall wash color to one or more IP luminaires that provide decorative wall washes in the room, and the commands for changing the task lighting to one or more IP luminaires controlling task lighting in the room. The area controller may, in some embodiments, also process the commands received from the other modules such as the environment manager module 110, prior to communicating them to the appropriate IP luminaires (or other commissioned units) so that the commands are compatible with a format or communication protocol understood by the particular IP luminaires (or commissioned units).

Figure 16:
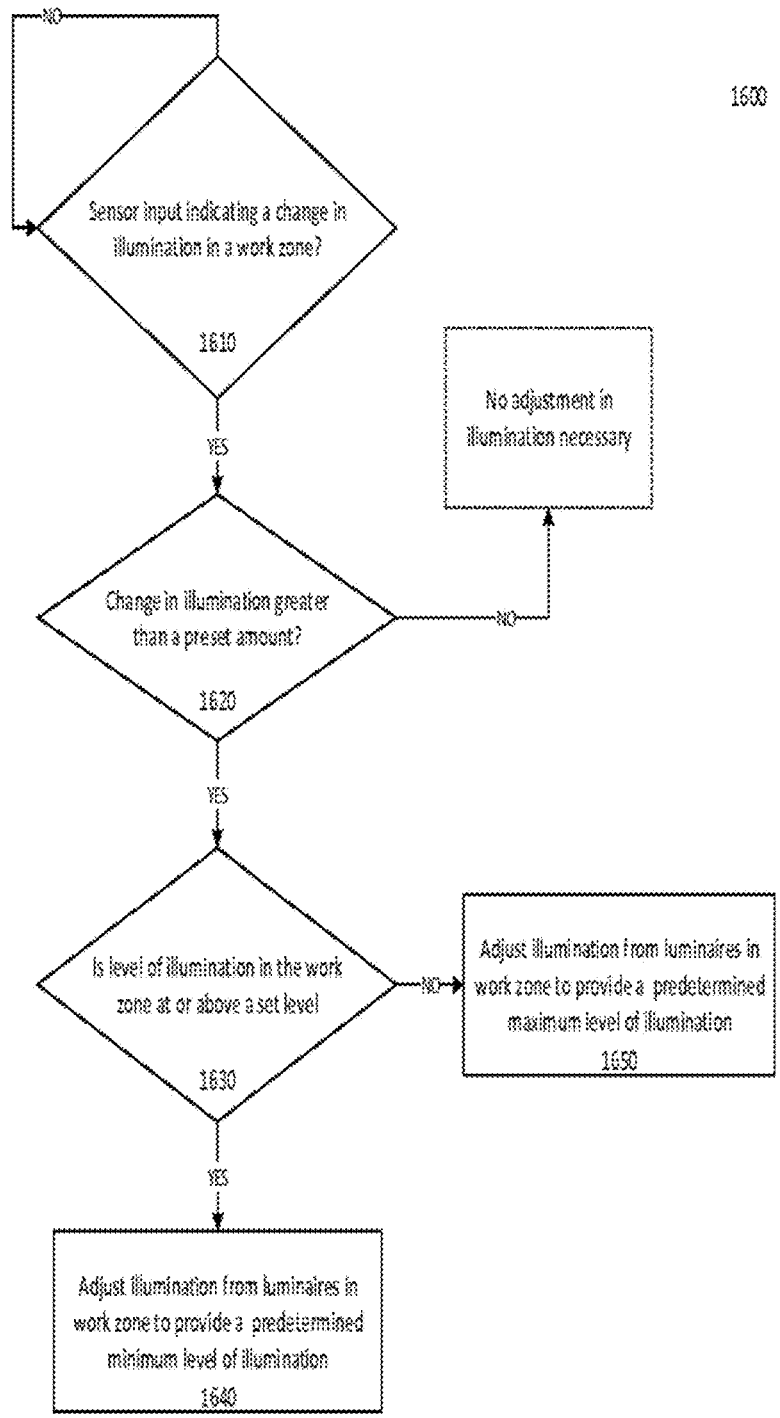
FIG. 16 illustrates a daylight-based control method for responding to a detected change in illumination in a work zone, performed by some embodiments of a system for managing environmental conditions.

FIG. 16 illustrates a daylight-based control method 1600 for responding to a detected change in illumination in a work zone, performed by some embodiments of a system for managing environmental conditions. It comprises steps 1610-1650. Many steps of method 1600 may be performed, for example, by components of system 100A or 100B depicted in FIGS. 1A and 1B, respectively. In step 1610, sensor input is processed to determine if there is a change in illumination (e.g. natural or artificial light) in a work zone. The sensor input may be from one or multiple sensors and the sensor(s) may be any type of light sensor such as a daylight sensor. The one or multiple sensors may detect a decrease or an increase in light from a natural source (e.g. sunlight) or an artificial source (e.g. luminaire). The sensor input may be communicated to and processed by one or more processors executing an environment control module such as module 110 of system 100A, a gateway module such as module 130 of system 100A, or an area controller such as controller 320 of system 300A. If there is no change in illumination, then control remains in step 1610, and input from the sensor(s) in step 1610 may again be processed at a later time. If the determination in step 1610 indicates that there is a change in illumination in the work zone, then control transfers to step 1620.

In step 1620, a determination is made as to whether the change in illumination is greater than a pre-configured amount. In some embodiments, this determination may be made by a commissioned unit (e.g. area controller, IP luminaire) that is located proximate to the sensor(s) producing the sensor input and/or a commissioned unit that is bound to the work zone during the commissioning process. In other embodiments, this determination is made more centrally by one or more processors associated with an environment manager module such as module 110 of system 100A, or a gateway module such as module 130 of system 100A. If the result of the determination in step 1620 is a negative one (e.g. change in illumination is not greater than a pre-configured amount), then no adjustment in illumination in the work zone is made. However, in some embodiments, each change in illumination that is not acted upon following step 1620 is aggregated and temporarily saved in a memory accessible to the module or modules performing the determinations in steps 1610 and 1620. In such embodiments, step 1620 may involve using the running aggregate of changes in illumination over multiple previous determinations in step 1620 that led to negative determinations in step 1620, in order to make the present determination in step 1620.

If the result of the determination in step 1620 is a positive one (e.g. change in illumination is greater than a pre-configured amount), then control transfers to step 1630, and a determination is made as to whether the level of illumination in the work zone is at or above a pre-configured level. In some embodiments, the determination of step 1630 may be made by a commissioned unit (e.g. area controller, IP luminaire) that is located proximate to the sensor(s) producing the sensor input and/or a commissioned unit that is bound to the work zone during the commissioning process. In other embodiments, this determination is made more centrally by one or more processors associated with an environment control module such as module 110 of system 100A, or a gateway module such as module 130 of system 100A. If the determination in step 1630 is a positive one (e.g. level of illumination in the work zone is at or above the pre-configured level), then the illumination from at least one luminaire (or lighting unit or light source) in the work zone is adjusted to provide a pre-configured minimum level of illumination in step 1640. If, on the other hand, the determination in step 1630 is a negative one (e.g. level of illumination in the work zone is below the pre-configured level), then the illumination from at least one luminaire in the work zone is adjusted to provide a pre-configured maximum level of illumination. When adjusting illumination in steps 1640 and 1650 many embodiments may employ fading in accordance with a configured fade time and/or fade speed if the fade feature is enabled for the one or more commissioned units whose at least one luminaire in the work zone is adjusted in steps 1640 or 1650.

Figure 17:
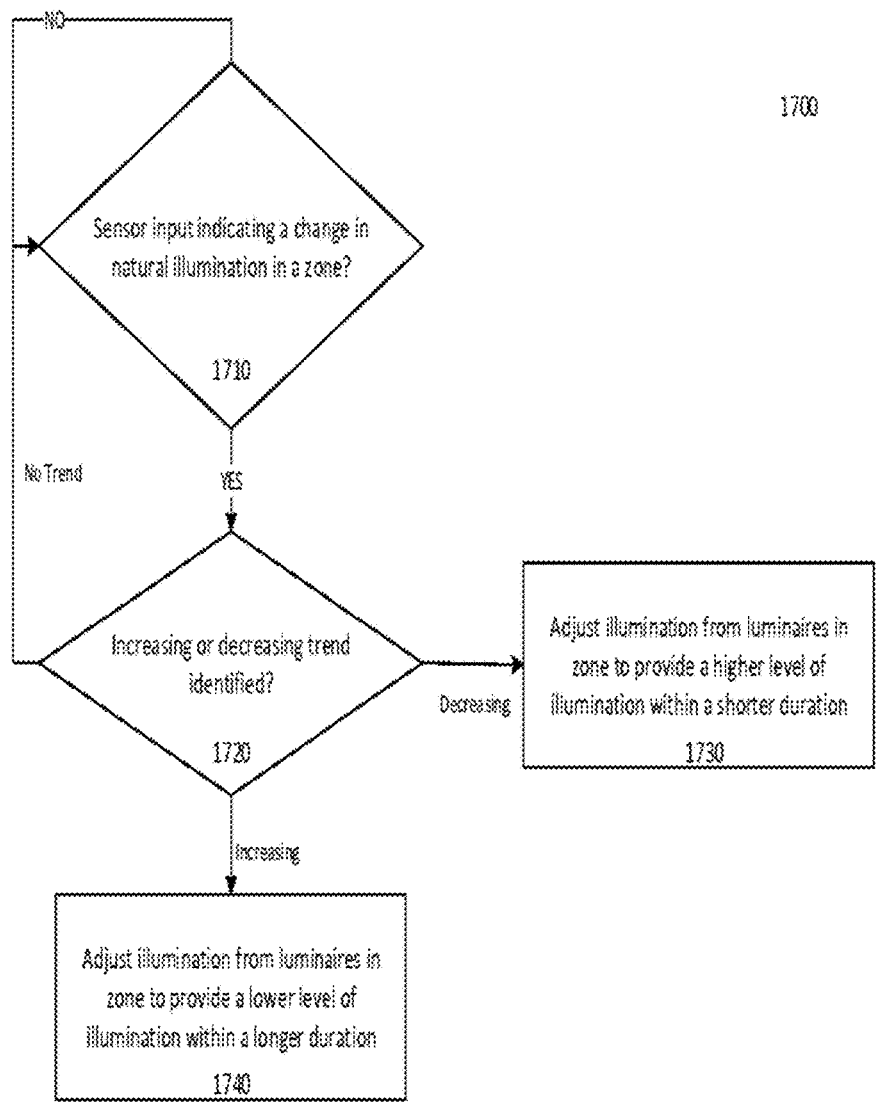
FIG. 17 illustrates a daylight-based control method for responding to a detected change in natural illumination in a space, performed by some embodiments of a system for managing environmental conditions.

FIG. 17 illustrates a daylight-based control method 1700 for responding to a detected change in natural illumination in a space, performed by some embodiments of a system for managing environmental conditions. It comprises steps 1710-1740. Many steps of method 1700 may be performed, for example, by components of system 100A or 100B depicted in FIGS. 1A and 1B, respectively. In step 1710, sensor input is processed to determine if there is a change in natural illumination in a designated zone. The sensor input may be from one or multiple sensors and the sensor(s) may be any type of light sensor such as a daylight sensor. The sensor input may be communicated to and processed by one or more processors executing an environment manager module such as module 110 of system 100A, a gateway module such as module 130 of system 100A, or an area controller such as controller 320 of system 300A. If there is no change in natural illumination, control remains in step 1710, and input from the sensor(s) in step 1710 may again be processed at a later time. If the determination in step 1710 indicates that there is a change in natural illumination in the designated zone, then control transfers to step 1720.

In step 1720, a determination is made with respect to whether the change in natural illumination is part of an increasing or decreasing trend. An increasing trend may be identified after multiple consecutive increases in natural illumination are detected in step 1710 for the zone in question. Likewise, a decreasing trend may be identified after multiple consecutive decreases in natural illumination are detected in step 1710 for the zone in question. The number of consecutive increases or decreases needed in order for a series of changes in natural illumination to qualify as a trend may be a configurable parameter in many embodiments, which may be set and/or reset using, for example, the central dashboard of the environment manager module 110 of system 100A.

In many embodiments, the determination of step 1720 may be made by a commissioned unit (e.g. area controller, IP luminaire) that is located proximate to the sensor(s) producing the sensor input and/or a commissioned unit that is bound to the zone in question during the commissioning process. In other embodiments, this determination is made more centrally by one or more processors associated with an environment manager module such as module 110 of system 100A, or a gateway module such as module 130 of system 100A. If no trend is identified, then control reverts to step 1710, and input from the sensor(s) may again be processed subsequently. If an increasing trend is found, then the illumination from at least one luminaire (or lighting unit or light source) in the designated zone is adjusted to provide a lower level of illumination within a first duration (step 1740). If, on the other hand, a decreasing trend is found, then the illumination from at least one luminaire (or lighting unit or light source) in the designated zone is adjusted in step 1730 to provide a higher level of illumination than currently provided by the luminaire within a second duration that is shorter than the first duration of step 1740. When adjusting illumination in steps 1730 and 1740, many embodiments may employ fading in accordance with a configured fade time and/or fade speed if the fade feature is enabled for the one or more commissioned units associated with the at least one luminaire referred to in steps 1730 and 1740.

Managing Environmental Conditions—User Triggered Controls

While many of the embodiments described in the previous sections on occupancy and daylight-based controls focus on methods for monitoring and/or identifying patterns with respect to changes in occupancy and lighting conditions, and optimally adjusting environmental conditions to respond to these changes, this section focuses on the controls available to users for causing changes in environmental conditions. In many embodiments, the user may be able to override the automatic behavior described in the above sections on occupancy and/or daylight-based light management.

Enabling, Disabling, and Prioritizing Control

In any given zone, all available control types (e.g. automatically triggered and user triggered) may be enabled or disabled. Commissioned units may be configured such that one or more control types are enabled or disabled. Additionally, for each zone and/or commissioned unit, a priority may be associated with each type of control. When a control type is enabled in an area or for a commissioned unit, the enabled type of control (e.g. manual personal control, central control, occupancy-based control) may be used to issue control requests for the enabled area or for the commissioned unit. Different control types may be enabled and operational in the same area or for the same commissioned unit. Priorities are used to resolve any conflicts or ambiguities given all received control inputs, and to determine the environmental conditions of any space at any given time.

Mobile Controllers

In many embodiments, mobile controllers (e.g. smartphones, tablet computers, and other hand-held computing devices) may be used by users to request changes in environmental conditions. Mobile controllers may be configured to provide visual, auditory and/or tactical feedback to its users when connecting to the environmental management system, and/or a visual, auditory and/or tactical feedback to its users within a period of time (e.g. 0.3 seconds) from the time users request a change in environmental conditions. Mobile controllers may be used for personal, manual and central control of commissioned units based on their location within a physical structure. For example, a smartphone may behave as a personal controller allowing control of environmental conditions only in its user's personal or work zone when it is operated in an open zone such as an open office space. However, when the smartphone is in a meeting zone such as a conference room, it may behave as a manual controller allowing its user to control environmental conditions in the entire meeting zone.

Power Up Behavior

Figure 19:
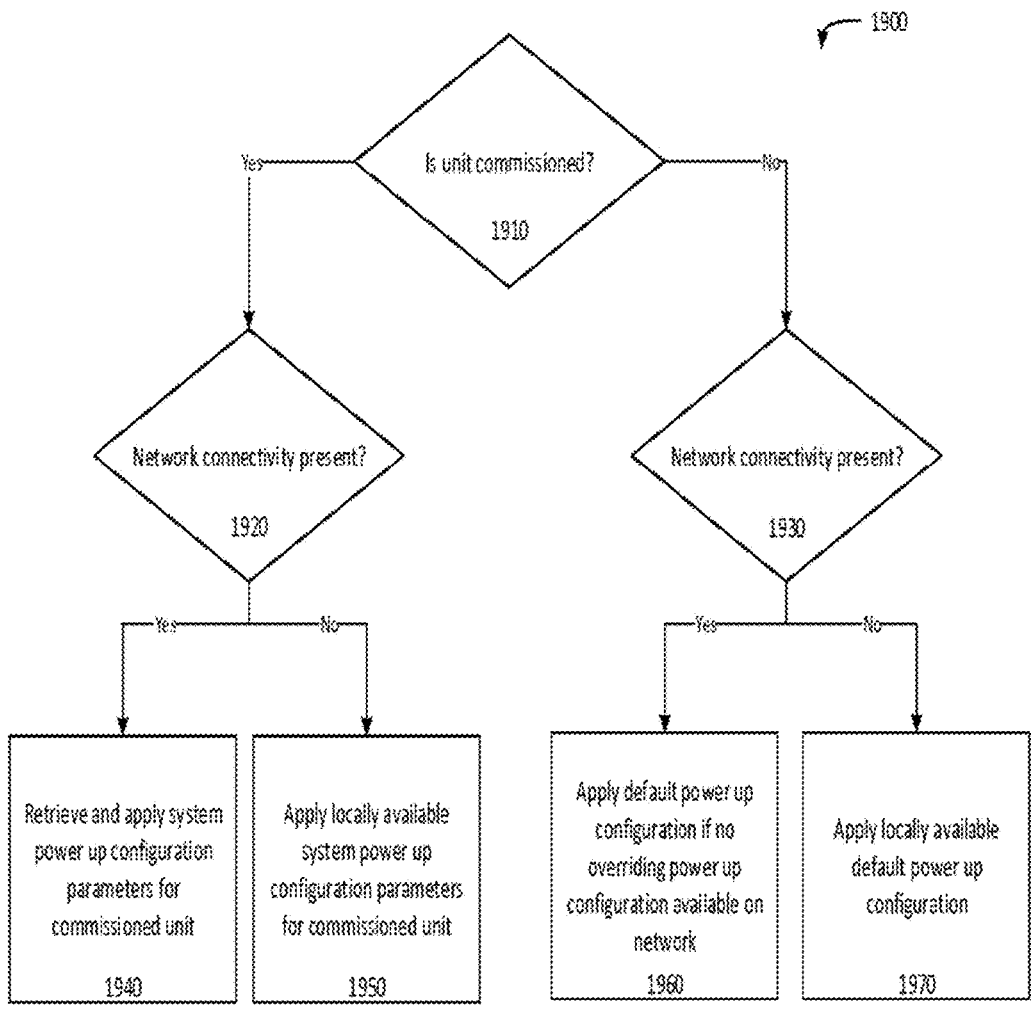
FIG. 19 illustrates a method for determining the power-up behavior of a commissioned or uncommissioned unit, performed by some embodiments of a system for managing environmental conditions.

FIG. 19 illustrates a method 1900 for determining the power-up behavior of a commissioned or uncommissioned unit, performed by some embodiments of a system for managing environmental conditions. The method may, for example, be performed by a group of luminaires, an IP luminaire such as IP luminaire 150 of FIG. 1A, a sensor or group of sensors, a camera or groups of cameras, or any controllable device. The method may also be performed by computer code executing on one or more processors located remotely from one or more devices whose power up behavior is to be determined.

Method 1900 comprises steps 1910 through 1970. Step 1910 involves determining whether or not a device or unit in question is commissioned. The process of commissioning was previously described, for example, in the context of FIG. 5. In some embodiments, during the commissioning process, one or more memories may have been updated to reflect the commissioning status of the device or unit in question. Determining whether the device or unit in question is commissioned may therefore involve accessing the one or more memories. In some embodiments, a device or unit itself may store information regarding its commissioning status. In such embodiments, determining whether or not a device or unit is commissioned may involve the device itself or computer code executing outside of the device, accessing the device's stored commissioning status or information reflective of its commissioning status.

If it is determined that the device is commissioned, then control transfers to step 1920. Otherwise, control transfers to step 1930. Both steps involve determining whether or not the device or unit in question has network connectivity. In some embodiments, this can be carried out by a device or unit performing a test to determine if connectivity exists. In other embodiments, this may be determined, for example, by computer code associated with a system module such as environment manager module 110 or gateway module 130 of system 100A, performing the necessary test(s).

If it is determined in step 1920 that the commissioned unit has network connectivity, then control transfers to step 1940. Step 1940 involves retrieving and applying system power-up configuration parameters for the commissioned unit. The parameters may be stored centrally on a server or other device accessible to the device or system module performing step 1940, or at the commissioned unit itself. If power-up configuration parameters are stored in multiple places, step 1940 may also involve determining which set of parameters take precedence. In some embodiments, if the commissioned unit is a luminaire, a default behavior at power-up may be produced. For example, within 0.3 seconds, the luminaire (or lighting unit or light source) in question may produce a light level equal to the light level the luminaire (or lighting unit or light source) is configured to produce shortly before power-down.

If it is determined in step 1920 that the commissioned unit does not have network connectivity, then control transfers to step 1950. In step 1950, locally available system power-up configuration parameters are applied for the commissioned unit. For example, there may be a set of power-up configurations stored at the commissioned unit itself, which are accessible to the commissioned unit without the need for network connectivity.

If it is determined in step 1930 that the non-commissioned unit has network connectivity, then control transfers to step 1960. In step 1960, default power-up configuration parameters are applied if no overriding power-up configuration is available via the network. Default power-up configuration parameters may reside on the network outside of the non-commissioned unit, or on the unit itself. For example, if the non-commissioned unit is a luminaire (or lighting unit or light source), the default power-up configuration may require a light level at 100% of the luminaire's capability to be produced within 0.3 seconds of power-up.

If it is determined in step 1930 that the non-commissioned unit does not have network connectivity, then control transfers to step 1970. In step 1970, default power-up configuration parameters stored locally on the non-commissioned unit or otherwise available to the non-commissioned unit without network connectivity may be applied to the non-commissioned unit.

According to some embodiments involving non-commissioned luminaires that are installed and powered but not connected to an IP network, the following behavior may be realized. Each luminaire (or lighting unit or light source) may go to producing light at 100% of its capability within 0.3 seconds from the moment of powering on, and each such luminaire may ignore any control commands from control devices that instruct otherwise. In some embodiments, if the non-commissioned luminaires are installed, powered, and connected to an a communication/control line of an IP network, all luminaires of the IP sub-network may go to producing light at 100% of their capabilities within 0.3 seconds from the moment of powering of the sub-system. These luminaires may ignore sensor information (e.g. occupancy and daylight sensor information), but react to manual control (e.g. from area IR controllers) as well as to central control commands (e.g. from the environment manager module 110, commissioning module 120, or gateway module 130 of FIG. 1A).

According to some embodiments involving commissioned luminaires (or lighting units or light sources), the following behavior may be produced at power-up. To demonstrate functionality, such units may go to producing a configured maximum light level within some time interval (e.g. 2 seconds) after the system has been powered on. In such embodiments, if there is no presence detected in the area of the commissioned luminaires subsequent to the powering on, the commissioned luminaires will switch off within another time interval (e.g. 1 second) following a determination that no presence was detected. In some other embodiments involving commissioned luminaires, such luminaires may not produce any light after being powered up until occupancy in the area of the luminaires is detected for some configured period of time.

Reaction Times

Different reaction times are related to users' expectations when requesting an environmental change, such as a change in lighting conditions. If a fade parameter associated with a commissioned unit or the user herself (e.g. a user preference parameter indicating whether or not the user prefers a fade effect) is disabled, then the requested change in the environmental condition (e.g. light level adjustment) should be immediate. If fade is enabled, then the requested change in environmental conditions may start within a time interval (e.g. 0.3 seconds) from the moment of the change request.

Another configure related to reaction times is fade time, or the time interval during which a first environmental condition (e.g. a present light level) fades to a second environmental condition (e.g. a new requested light level). In many embodiments, Fade time is a value set between 0.5 and 90 seconds. Manual controllers that allow a user to control fade time may allow the user to increase or decrease the fade time with a particular granularity (e.g. increases or decreases of fade time allowed in 1 second granularity). The fade and fade time features are comfort features designed to result in changes in environmental conditions that are smooth, less jarring and therefore less noticeable and less distracting.

Control Overrides

Figure 20:
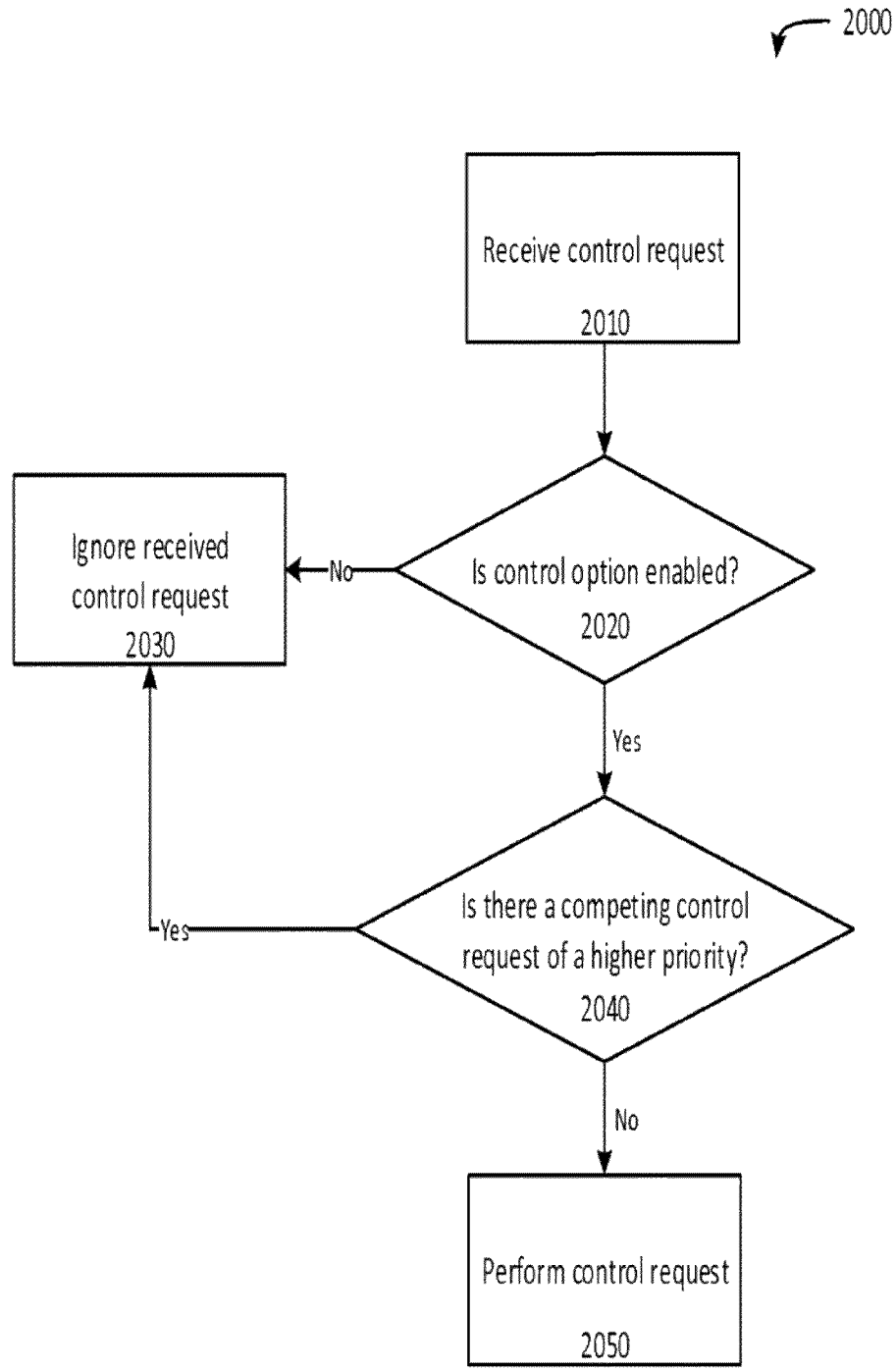
FIG. 20 illustrates a method for handling a control request, performed by some embodiments of a system for managing environmental conditions.

FIG. 20 illustrates a method 2000 for handling a control request, performed by some embodiments of a system for managing environmental conditions. Method 2000 comprises steps 2010 through 2050. One or more steps may be omitted in performing the method, and other steps not depicted may also be added. In some embodiments, the method may be performed by a commissioned unit itself, computer code executing on one or more processors communicatively connected to commissioned unit (e.g. at processors associated with environment manager module 110 or gateway module 130 of system 100A) or any combination of thereof. In step 2010, a control request is received. The control request may be a request to change an environmental condition (e.g. light level, temperature or humidity), and may arise due to a variety of circumstances. For example, a user may request a change using an environment control device such as device 160 of system 100A, a wall mounted user interface device, or a user interface (e.g. central dashboard) provided, for example, by the environment manager module 110 or gateway module 130 of system 100A. A control request may also be generated as a result of changes in occupancy or daylight in an area. For illustrative purposes only, let us assume that a user has used a wall-mounted manual controller in a room to request a higher level of light, and that the manual controller is linked to a particular commissioned unit in the room.

Step 2020 involves determining whether the requested control option is enabled. In many embodiments, all available control options (e.g. occupancy-based control, daylight-based control, manual, personal, and central control) may be disabled, enabled and/or prioritized per commissioned unit. In the example being used for illustrative purposes, step 2020 involves determining whether the manual control is enabled for the commissioned unit linked to the manual controller being used to request a change in lighting conditions. If step 2020 results in a negative determination (i.e. the control option is not enabled for the associated commissioned unit), then control transfers to step 2030, and the received control request is ignored. If step 2020 results in a positive determination (i.e. the control option is enabled for the associated commissioned unit), then control transfers to step 2040.

Step 2040 involves determining whether or not there is a competing control request of higher priority that should override the received control request. If step 2040 results in a negative determination (i.e. no competing control request of a higher priority is found), then control transfers to step 2050, and the requested control is performed. Otherwise, if step 2040 results in a positive determination (i.e. a competing control request of a higher priority is found), then control transfers to step 2030 and the received control request is ignored. For example, an automatic request arising out of daylight-based monitoring of space surrounding the commissioned unit may indicate a request to adjust the luminaires (or lighting units or light sources) associated with the commissioned unit to provide a lower light level than that requested by the user's request arising out of his/her use of a manual wall-mounted control. In such a case, if the commissioned unit has a higher priory for manual control as compared to daylight-based control, then the luminaires associated with the commissioned unit will adjust the illumination they provide to produce the manually-requested level of illumination.

Manual Control

Manual control refers to the means available to a user for manually altering environmental conditions. During the commissioning process depicted in FIG. 5, units may be commissioned to be manually controlled. The commissioning and configuration may include linking of user interfaces for manual control to commissioned units, linking of user interface elements (e.g. buttons, sliding bars) to presets (e.g. scenes, light levels). During commissioning, manual control may be enabled or disabled for a unit being commissioned, and/or manual control may be assigned a priority level as compared to other types of controls. Commissioned units that have manual control enabled may also have other forms of control enabled (e.g. daylight-based and occupancy-based controls).

Manual control enables a user to manually turn on or off commissioned units. For example, an end user may enter an indoor space such as a room and using a wall-mounted display or switch or a user interface on a hand-held device, turn on luminaires associated with one or more luminaires in the room. Such a manual request may result in the luminaires producing a pre-configured level of light (e.g. going to a switch on level of light). If prevailing environmental conditions, such as the level of lighting in a space, are not what a user desires, he or she may manually adjust the lighting using a manual control, by indicating that the lighting in the space be dimmed up or down. Such a manual request may result in luminaires in the space adjusting their light output by a pre-configured percentage. Many embodiments may require that fixed manual controllers be placed in a visible location within the space it controls, and that the manual controller shall not be able to control environmental conditions in a space where the user requesting the manual changes would not be able to physically sense (e.g. see, feel or hear) the changes requested using the controller.

In some embodiments, manual changes that are requested from a mobile controller (e.g. a smartphone) are required to be activated within a longer duration of time (e.g. a scene change in a meeting room that is requested from an iPhone need only be activated within 3 seconds of the request), as compared to manual changes requested from a fixed mobile controller (e.g. a wall-mounted controller). For example, a scene change in a meeting room requested from a wall-mounted control device may need to be activated within 0.3 seconds of the request in order to create a sense of instantaneous response to the request. This difference may be instituted in a system such as system 100A or 100B in order to satisfy users' expectations that environmental changes initiated in a space using manual wall-mounted controls be instantaneous.

In many embodiments, commissioned units may store multiple presets that may be manually requested. In other embodiments, these presets may additionally or alternatively be stored at one or more remotely located memories. For example, one preset may be a lighting scene, which causes multiple commissioned units to each produce a preset level of light. Such a preset may result in a lighting "effect" in a space, such as dim lights in various parts of the room and bright lights in others. In some embodiments a preset light level may be configured by specifying absolute light levels or relative light levels (e.g. 5% dimmer than the switch on light level), or by an algorithm that takes into consideration a variable parameter such as the amount of natural light available.

Back to Default

In various embodiments, a user may be able to undo a manually selected environmental condition, and cause the conditions to revert back to a previous or default setting. For example, a user may use a manual controller to de-select or cancel a previously requested light level or lighting scene. This feature enables the user to "switch off" a personal lighting or other environmental condition at any time. One or more commissioned units participating in providing the requested light level or scene may then return to a previous configuration or a default state.

Configuration Parameter—Manual Retention Time

In many embodiments, the configuration of a manual retention time parameter allows for the resetting of environmental conditions to be in compliance with manually-requested conditions, even after commissioned units previously applying the conditions have stopped complying with the manually-requested conditions. The need for this parameter may occur in various circumstances. For example, in some situations, a user may enter a previously unoccupied room, where lighting conditions were being automatically adjusted based on the presence of natural light. The user may thereafter utilize a manual controller to request that commissioned units in the space produce a particular level of light in the space, regardless of the amount of natural light present, thereby effectively overriding the automatic daylight-based control of the space. Under such circumstances, when the user leaves the room, automatic daylight-based control of the room may resume or the lighting in the room may transition to a switched off state after an appropriate amount of time has elapsed. In embodiments where a manual retention time is being applied, the commissioned units in the room may return to providing the light levels manually requested by the user if the user is detected to have re-entered the same space within the manual retention time period. In many embodiments, the manual retention time period begins elapsing immediately following the time when the commissioned units in question transition to providing environmental conditions that differ from the user's manually-requested conditions. In many embodiments, the manual retention time may be automatically set at 15 minutes.

Configuration Parameter—Dimming Step

Dimming step is a configurable parameter that is associated with user-based light control. Each commissioned unit may have an associated dimming step parameter and manual and personal controllers may also have associated dimming step parameters. In many embodiments, this parameter is expressed as a percentage and may range from 5% to 30%.

A user may choose to set the dimming step at 10% for a commissioned unit. In such a case, when the commissioned unit is dimmed once (e.g. by one step), the light output of the commissioned unit is reduced by 10% of its previous output. In some embodiments, the dimming step is set to 5% by default. Many embodiments may also permit the user to alter the dimming step but by only a particular level of granularity (e.g. 5%). This parameter may be used as a mechanism to control the speed with which a user may manually dim lighting in a space.

Personal Control

Person control refers to the means available to a user for controlling the environmental conditions in their personal space or work zone. Devices providing personal control may be linked to one or more commissioned units during the commissioning process of FIG. 5. Personal control devices may be stationary (e.g. wall-mounted devices) or be mobile (e.g. smart phones or other hand-held devices). In many embodiments, a personal control device that is stationary may only be linked to commissioned units that are located within a limited radius of the personal control device. Mobile personal control devices may be linked to multiple commissioned units that are more geographically dispersed throughout a space. In some embodiments, when a user uses a personal control device to control environmental conditions such as lighting in their work zone, the personal control request may affect the behavior of only the commissioned units that are both linked to the personal control device and present in a work zone associated with the user's present location. A personal control request to alter environmental conditions in a user's work zone may arise automatically (e.g. from occupancy-based control methods) or manually (e.g. from a user using a manual or personal control device to request a change in environmental conditions). Daylight-based and occupancy-based control of environmental conditions may affect and/or be affected by the personal control of commissioned units that are also configured to able to respond to personal control requests for environmental changes.

For example, if a user wishes to increase the light level in a work zone to a particular level, but the ongoing daylight-based control of the lighting in the work zone does not permit increasing the light level in the work zone to the particular level, the light level in the work zone may only be permitted to increase to a different lower level. In many embodiments, whether or not a user is able to use a personal controller to control lighting in his/her work zone depends on whether or not the user has permissions to affect environmental conditions in the work zone. Permissions for authorizing users to control conditions in their work zones may be stored at commissioned units, and/or more centrally at one or more memories accessible, for example, to system modules such as environment manager module 110 or gateway module 130 of system 100A.

Commissioned units may be configured to behave in particular ways in response to personal control requests. For example, all luminaires (or lighting units or light sources) associated with a commissioned unit may be configured to provide 500 lux on a reference surface when a personal control device is used to request a particular scene for a particular work zone. There may also be one or more personal control modes associated with commissioned units and/or personal control devices. For example, a limited set-point mode may prevent a user from dimming beyond a maximum calibrated light set-point. An unlimited set-point mode may not impose such restrictions.

Commissioned units that typically adjust behavior based on control requests may be commissioned to enable or disable personal control requests. Such units may also assign a priority level to personal control requests. Additionally and/or alternatively, personal control devices themselves or users using the devices to create personal control requests may assign priority levels to personal control requests.

Personal control devices such as smart phones running personal control applications may be used by users to graphically view the zones and/or commissioned units that are under the control of the device. In some embodiments, any response to such requests may be required to be made within a configured amount of time (e.g. 3 seconds). Failure to respond within the allotted time may result in an error being reported by the personal control device itself to one or more modules of the system (e.g. environment manager module 110 or gateway module 130 of system 100A). Alternatively, in various embodiments, if a response to a user request made via a personal controller takes longer than a configured amount of time, then the user may be given feedback on the progress of the request (e.g. a progress bar or other visual or auditory notification).

Scene Selection and Light Tuning

Using personal controls, users may select preconfigured scenes for their work zones. For example, a user may select a standard scene where all lighting units associated with a commissioned unit providing light for the user's work zone switch to a particular light level. A user may also use personal controls to control the dim level of luminaires (or lighting units or light sources) associated with commissioned units. Commissioned units may be configured to provide illumination within a determined range (e.g. between a minimum light output and maximum light output), and a user's ability to control the dim level of such units may be confined to controlling output within such a range.

In some embodiments, manually-made environmental change requests may result in changes in environmental conditions which are thereafter controlled automatically. For example, if a manually-made personal request results in providing a fixed level of light in a space, automatic controls may regain control of the space after certain events occur (e.g. the space is determined to be vacant). In some embodiments, the manually-made change in conditions may be thereafter managed by automatic controls even without requiring that a particular event occur prior to transfer of control to the automatic means.

Figure 21:
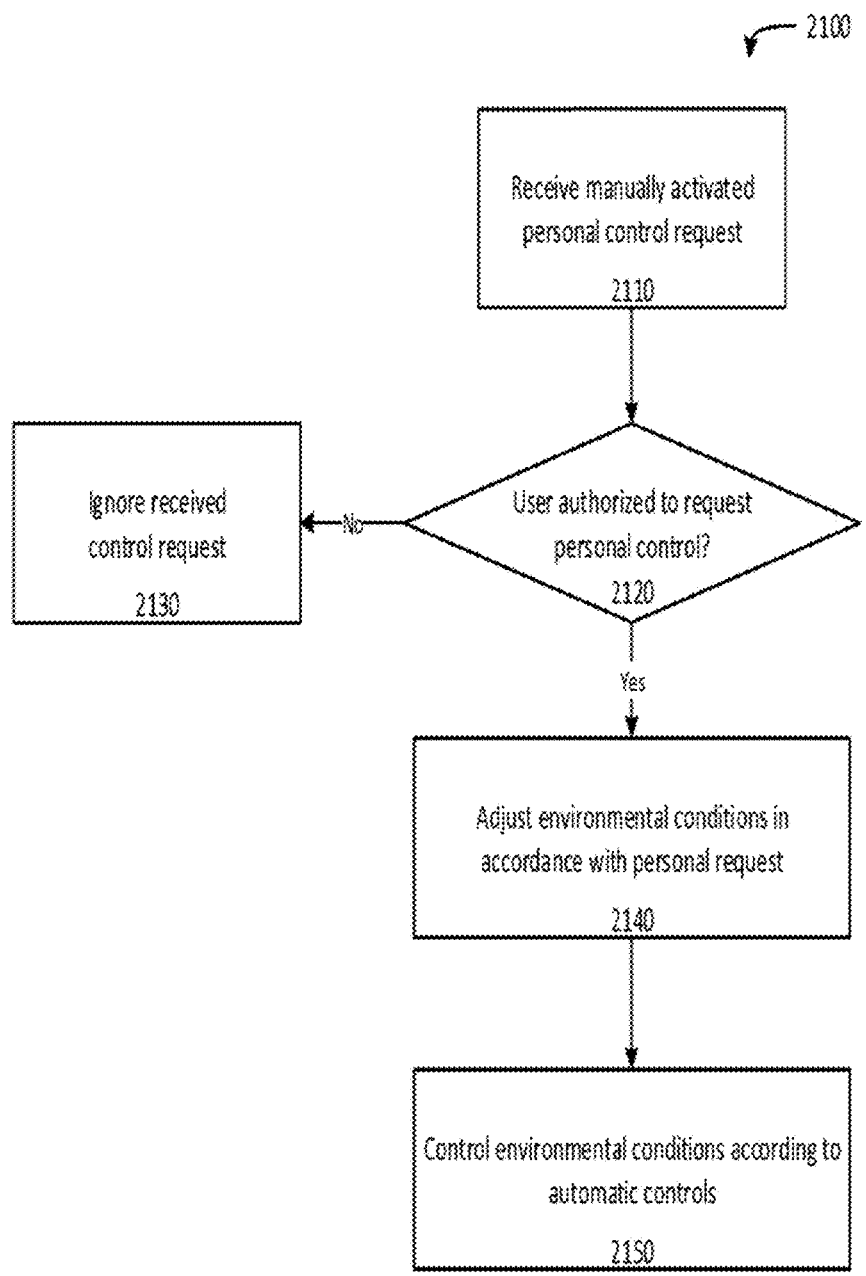
FIG. 21 illustrates a method for handling a manually-activated personal control request, performed by some embodiments of a system for managing environmental conditions.

FIG. 21 illustrates a method 2100 for handling a manually-activated personal control request, performed by some embodiments of a system for managing environmental conditions. Method 2100 comprises steps 2110-2150, which may be performed in an order different from that depicted. Steps may be omitted, and other steps may be added. In step 2110, a manually-activated personal control request is received. In various embodiments, the request may be received by a system module such as environment manager module 110 of system 100A depicted in FIG. 1, and a user may use a smartphone to issue the request. In some embodiments, the user may increase or decrease a current temperature set point to another set-point that is within a configurable range (e.g. within 2 degrees Celsius of the current set-point). The user interface being used to request the increase may permit increases or decreases according to a configurable level of granularity (e.g. increases or decreases in 0.1 degree Celsius steps may be permitted). In many embodiments, the requested adjustment of temperature may affect the HVAC areas associated with one or more commissioned lighting units in the user's work zone.

In step 2120, a determination is made on whether the user issuing the request is authorized to make the requested changes in environmental conditions. In some embodiments, this determination is made by one or more system modules such as environment manager module 110 or gateway module 130 of system 100A. The determination may be based on the user's location and/or identification (e.g. user ID and password) information. In embodiments that use a user's login information (e.g. user ID and password) to verify authorization, the user may have to provide his/her credentials only once unless he/she has been logged out since the last time the user's credentials were verified. If the user is not authorized to alter environmental conditions in accordance with the request, control transfers to step 2130, in which the personal control request is ignored. In the user is not authorized to alter environmental conditions in accordance with his/her request, he/she may be notified of this fact. If user authorization is additionally or alternatively dependent on the user's location, the location information may be cached for a configurable period of time, thereby avoiding the need to update the same user's location every time he/she requests a change in environmental conditions.

If the user is authorized to make the requested environmental changes, one or more commissioned units may be instructed to adjust environmental conditions in accordance with the personal control request in step 2140. For example, luminaires (or lighting units or light sources) associated with one or more commissioned units controlling lighting conditions in the user's work zone may transition to producing a requested level of light in the user's work zone (e.g. reference surface) in accordance with a configured fade time. In many embodiments, control then transfers to step 2150, in which the control of environmental conditions reverts back to automatic controls. For example, the light output produced by the one or more commissioned units associated with the user's work zone may thereafter revert to being controlled in accordance with previously used daylight-based and/or occupancy-based algorithms.

In many embodiments, personal controllers may allow authorized users to select or otherwise specify the geographic scope of their personal control. If the user making this scope selection is using his/her own personal controller device (e.g. a smartphone), information identifying the user may be linked to the scope selection and/or other profile settings of the user automatically, without requiring further input from the user. If, on the other hand, the user making the scope selection is using a publicly accessible personal controller device (e.g. a controller affixed to a wall in a space accessible to multiple users), the user may have to identify him/herself in order to link his/her scope selection to his/her identity within the system for managing environmental condition. Once a user successfully selects or specifies a geographic scope of personal control, environmental control requests affecting an area within the same geographic area, but received from users outside the geographic area, may be ignored.

Personal Settings and Recall of Previously Applied Environmental Conditions

Many embodiments enable a user to recall light settings or other environmental conditions previously requested. These settings or conditions may have been previously requested by the same user requesting the recall, or by other users of the same space. Commissioned units may store previously requested settings themselves and/or settings may be stored more centrally in one or more memories accessible to, for example, system modules such as environment manager module 110, gateway module 130 and/or commissioning module 120 of the system 100A. Previously requested environmental conditions may be associated with particular users, zones, and/or commissioned units.

Central Control

Central control refers to the means available to a user for preforming scheduled or real-time adjustments to system parameters that may affect environmental conditions within a space in a more global or pervasive way. Central control also refers to the control of environmental conditions using a user interface executed by a system module such as the environment manager module 110 or gateway module 130 of system 100A. Central control may be manual (e.g. a user manually adjusting light settings using a displayed user interface), or automatic (e.g. adjustments to environmental conditions occurring as a result of system reactions to detected events). In many embodiments, to centrally control one or more commissioned units within an area, the commissioned units need to be communicatively connected to a central dashboard. The central dashboard comprises computer code executing one or more user interfaces that allow authorized users to control various commissioned units, groups of commissioned units and/or entire zones within a physical structure. In many embodiments, the central dashboard may also be communicatively connected to and/or executed by one or more modules central to the operation of the systems for managing environmental changes described herein. For example, in many embodiments, the central dashboard is executed by or in conjunction with the environment manager module 110 or gateway module 130 of system 100A. In various embodiments, the central dashboard may be used to re-commission and/or re-configure commissioned units. In some of these embodiments, the user interface(s) of the central dashboard may display the reconfigurable parameters along with their present values or statuses, and prevent the user of the central dashboard from configuring parameters that are not re-configurable or setting parameters of commissioned units to values that are outside of permitted ranges.

Scheduled and Real Time Central Control

A user may utilize a centralized utility such as the central dashboard to alter settings of commissioned units in order to affect environmental conditions in real time or in a scheduled manner. Real time requests are processed such that resulting changes in environmental conditions are made within a configurable amount of time following the request. The central dashboard may also be used by appropriately authorized users (e.g. a facility manager) to alter parameters that affect overall system behavior such as the configurable amount of time within which real time requests need to be serviced.

Creating and Managing Schedules

The central dashboard may be used to create, edit and schedule tasks embodying changes in environmental conditions. Tasks may be scheduled to be triggered at specific times (e.g. at specific time intervals, at a time relative to an event, or at an absolute time), or upon the occurrence of a specific event. A task may specify changes that are more global in nature by, for example, resetting a parameter that affects multiple areas or commissioned units (e.g. changing a fade time, hold time, enabling or disabling a type of control). A task may also specify changes that are more local in nature by, for example, reducing the light output of a commissioned unit that only affects a particular work zone. During the commissioning process, an authorized user such as a facility manager may create and schedule default tasks. For example, a night task may be triggered to be executed after work hours and may change hold times and default light levels in order to conserve energy.

A scheduled task may comprise a series of tasks that are themselves scheduled to be performed at certain times, upon the occurrence of certain events and/or in compliance with certain logic. Users may select existing schedules for application. The same schedules may be repeatedly applied.

Accordingly, the central dashboard may provide user interface means for selecting one or more schedules for application, specifying the scope of schedules (e.g. the commissioned units or zones on which the selected schedules will be active), what events will trigger schedules (e.g. time of day, environmental condition, user activity), and/or the frequency with which the schedules are to be applied (e.g. one time only, a few times a day, whenever a triggering event occurs).

Schedules may also be activated immediately. In such cases, tasks in the schedule in question may take effect within a predetermined amount of time (e.g. within 5 seconds). Examples of tasks include changing the light output for a luminaire or commissioned unit (e.g. dimming up/down from a current light level, going to a particular dim level, recalling light scenes, switching off/on), reconfiguration of control parameters (e.g. enable/disable a control option, change a sensor hold time, change a fade time), changing the temperature in an area, running an emergency lighting test, and performing auto-calibration of selected sensors. In many embodiments, scheduled tasks may also involve database related tasks, such as rolling data from commissioned units (e.g. diagnostics logging, energy consumption data), sending reports or notifications to different system modules, and backing up specific data or categories of data.

In many embodiments, only one schedule may be active with respect to the same commissioned unit at any given time. Transitioning between settings of two consecutive tasks in a schedule may involve a fading transition within a fade time. Accordingly, creating and/or selecting schedules may involve specifying or selecting parameters such as a fade time and/or enabling or disabling a fade transition between tasks in a schedule.

Creating and Configuring Alarms

The central dashboard or a user interface associated with the commissioning module may allow an authorized user such as a facility manager to create and configure alarms. An alarm may be any means by which one or more modules, controllers or devices associated with the system for managing environmental conditions within a structure is notified of system statuses that are abnormal or may otherwise require action. An alarm may be associated with various configurable parameters. These parameters may be manually set or altered by an authorized user, or automatically updated during system operation. An alarm may have an associated type (e.g. an error or a warning). An alarm may indicate its source, or the event or condition that generated the alarm. Examples may include a change in a system status, a particular system status, or a scheduled or unscheduled event occurring. An alarm may also have an associated destination (e.g. a user account that must be notified about the alarm), a scope (e.g. commissioned units the alarm potentially affects), a format (e.g. SMS, e-mail, audio, visual, tactical), a trigger (e.g. a schedule or task that the alarm invokes), and a trigger condition that causes the alarm to be invoked (e.g. time, system status, change in system status, or a scheduled activity). Alarms may also cause particular data to be displayed on the central dashboard in order to visually present alarm data to responsible personnel. Examples include the location of the commissioned unit, device, or environmental condition causing the alarm, an indication of the severity of the alarm, and an indication of the status of the alarm (e.g. whether or not it is being handled).

Central Control Override

In some embodiments, an authorized user may use the central dashboard to issue an overriding central control command or otherwise configure the system for exclusive central environmental control, such that all other automatic or user-generated environmental control requests are blocked or ignored until the particular overriding central command or other event completes, or is manually ended. Such a central control override may be used during emergencies, such as during a building fire or a breach of security.

Central control may also take into account manually-requested environmental conditions that are in effect in various areas. For example, although the central dashboard may allow a facility manager to easily alter lighting conditions in a large open plan office area, the facility manager may wish to skip over areas that are under personal control of other users. In some embodiments, this is accomplished by using information about the different lighting conditions in various parts available in real time to system modules such as the environment manager module 110 or gateway module 130.

In many embodiments, a centrally-issued environmental control request that comes before or after a personal or manual control request may not affect the system's response to the personal or manual control request. For example, a central control request to switch a commissioned unit to a lower light level may result in the commissioned unit producing the lower light level. However, a personal or other manual control request may thereafter successfully switch the commissioned unit to produce a higher light level.

Back to Default Behavior

In many embodiments, a central control request may be issued to take effect in a space, and prevent other control requests from taking effect in that space until it is manually deactivated. To prevent a situation where a facility manager may inadvertently fail to deactivate such an overriding central control, automatic controls may override such central controls under some limited circumstances, such as when the system recognizes that the space is vacant. Under such circumstances, occupancy-based control may replace the central control of the space, and environmental changes in accordance with the occupancy-based control may take effect.

Load Shedding

In many embodiments, the central dashboard allows an appropriately authorized user (e.g. a facility manager) to cause the system to switch to a predefined load shedding mode. Such modes may be designed to save power by automatically causing various system-wide parameters to be altered, as well as causing various commissioned units to react in particular ways. For example, all personal controls may be disabled, all luminaires (or lighting units or light sources) in selected areas may be dimmed or switched off, and all hold times and grace periods for automatically triggered controls such as occupancy-based controls may be shortened.

Graphical User Interfaces

Customization of Views

The environmental control systems described herein provide a variety of different graphical user interfaces (GUIs) for facilitating interaction with users. Exemplary embodiments of three categories of such GUIs are described below. In additional, a customization graphical user interface (customization GUI) is provided that allows a user to create customized GUIs. A user may use the customization GUI to create GUIs for use in particular tasks (e.g. dimming luminaires associated with commissioned units in different rooms) or in particular areas the user frequents (e.g. a GUI that displays monitoring information for commissioned units in three rooms that the user is interested in). The customization GUI may also be used to create different views based upon the user's role (e.g. a user with a role that requires monitoring power consumption) may be provided a set of graphical views of a room where the power consumption information is highlighted or otherwise accessible with fewer clicks or interactions from the user. Based on the user's role and/or preconfigured profile of preferences, the customization GUI may suggest various custom views (e.g. overhead view of the user's cell office and surrounding area) comprising various details (e.g. temperature and humidity conditions in the cell office). While preparing one or more custom GUIs using the customization GUI, the user may choose to add or remove various details in order to achieve a custom GUI representative of the user's own preferences.

Central Dashboard

System modules may also allow a user to customize the GUI of the Central Dashboard Home Page according to the user's needs. For example, it may be possible for a user to create different views based on his/her role (e.g. end user of office space or facility manager). A facility manager may be presented with maintenance data as well as energy consumption data, while an end user may only be presented with energy consumption data and data on current environmental conditions (e.g. temperature, light levels), but not maintenance data.

The Dashboard GUI may also present (e.g. on the floor plan itself or on a side panel), operational statuses of various commissioned units (e.g. if an unresolved error has been reported for a unit, if a unit is turned on or off). In many embodiments, data regarding devices such as their functions or status data is presented to the user within 0.5 seconds of being requested by the user (e.g. by placing the cursor over the device on the floor plan). The devices may also be visually highlighted on the floor plan. The Dashboard GUI may also visually depict different categories of devices or commissioned units on the floor plan differently. For example, different icons may be used to visually depict lighting devices, HVAC devices, sensors, and control devices. The choice of icons may be customizable to the user's preferences. Different information may be presented for a commissioned unit depending on its category. For commissioned units used for lighting, the information may comprise the current light level, and energy usage, and whether or not occupancy-based or daylight-based control is enabled. For sensors, the measurement of the last sensed data, or an average of measurements over a particular recent time period may be presented.

The Central Dashboard GUI may also provide the user the ability to change parameters for commissioned devices. When the user selects a commissioned device, its parameters may be displayed, and the editable parameters, based on the user's permissions and/or role, may be visually displayed as being editable. Parameters that the user is not allowed to edit may be visually presented as being non-editable (e.g. greyed out). The acceptable range of a parameter may also be indicated and parameter values outside of the range may not be accepted by the central dashboard GUI. Help tips may also be available through the central dashboard GUI. For example, help tips may be presented as an overlay when the user's cursor hovers on a commissioned unit. Some embodiments of the central dashboard GUI may be available in languages other than English. The Central Dashboard GUI may also provide graphical means for a user to manage schedules. An authorized user may use the Dashboard GUI to create, edit, delete, prioritize and otherwise manage schedules.

The central dashboard GUI may also provide graphical means to centrally control operational settings of commissioned units throughout the system. For example, users may control light settings for a group of selected commissioned units or individual commissioned units in real time (e.g. by using graphical means to select multiple commissioned units and/or individual luminaires and select new light levels or dim light output by one or more steps). The new operational states (e.g. new illumination levels) may thereafter be visually reflected on the central dashboard as feedback to the user that the changes have taken place.

System modules or commissioned units themselves may also conduct analysis of available monitoring data to provide system modules such as the environment manager module 110 of system 100A recommendations on parameter settings that lead to optimal system performance (e.g. energy efficient performance). These recommendations may be presented to the user at the time he/she is presented with user interface means for adjusting operational parameters for commissioned units. Real time analysis of estimated energy usage and energy savings may be conducted and presented to the user, along with cost estimates, to help the user determine optimal parameter settings.

Monitoring Dashboard

The Central Dashboard (GUI) may also comprise a Monitoring Dashboard GUI that displays data collected by various components of the system (e.g. environment manager module 110, gateway module 130, IP luminaire 150, or area controller 320). The data collected (referred to herein generally as monitoring data), may be data reflecting, for example, space usage (occupancy, presence), energy consumption, temperature, humidity, carbon dioxide levels, usage of automatic controls and manual controls, and detected operational errors. Energy consumption data may be captured as actual energy measurements or notional energy measurements. Energy consumption may be measured in KWh. Each collected data sample may be associated with a time stamp, and a device identification or physical location. Presence may be recorded as a yes/no per commissioned unit(s) or areas in question; and occupancy may be recorded as a percentage of the time the commissioned unit(s) or areas in question are occupied. Occupancy status may be concluded based on multiple sensors associated with a commissioned unit. The generation of maintenance and diagnostic messages or reports may also be monitored and recorded. For example, alarms or alerts generated by commissioned units in the form of messages reporting operational errors or warnings may be monitored to predict potential future malfunctions.

The monitoring data may be presented in graphical form, and may be analyzed using any combination of standard and proprietary analytical methods. In many embodiments, the monitoring data may allow users such as facility managers to gain valuable insights into trends in the data, make comparisons with previously gathered data (e.g. historical data) and to implement strategies such as energy consumption strategies based on the data.

Commissioned devices being monitored may store monitored data on the device itself or the data may be stored in one or more memories (e.g. a database) accessible to system modules such as the environment manager module 110, commissioning module 120 or gateway module 130 of system 100A. Monitoring data may be logged at specified configurable time intervals. Additionally the occurrence of events (e.g. detection of occupancy) may cause monitoring to stop or resume. When monitoring occurs can be expressed by one or more configurable parameters on a system-wide basis (e.g. by the setting of system-wide parameters or rules affecting multiple areas and commissioned units) or on a device-by-device basis.

Monitoring Data and Presenting Monitored Data

The Monitoring Dashboard may allow an authorized user to select the information to be monitored, the spatial and temporal granularity with which the monitored data should be collected, the space(s) that should be monitored, analytical tools that should be applied to the data, and/or the visual presentation of the raw or analyzed data. Some users (e.g. facility managers) may have the authorization to select new areas for monitoring or to stop gathering data in other areas. Other users (e.g. office users) may be able to specify what types of monitoring data they view on the Monitoring Dashboard, or whether or not they view raw or analyzed monitoring data, but may not be able to affect the collection of the monitoring data itself.

Users may select areas (e.g. the campus, the building, particular floors, rooms or work areas) or particular commissioned units or types of commissioned units for monitoring from an interactive floor map. Users may also specify or select how much monitoring data they would like to access (e.g. a whole year, 6 months, 1 month, 1 week, 1 day), and how recent the data should be (e.g. in the past month, week, day, hour). Depending on the type of monitoring data, the temporal granularity of the available data may vary.

The user may also be able to configure the presentation of the monitoring data. For example, the Monitoring Dashboard may allow users to select the type of graph(s) used to present raw or analyzed data (e.g. heat maps), or choose other details affecting visual presentation. For example, a user may configure their own monitoring view to use a particular color code to indicate occupancy status (e.g. red for areas that are occupied more than 90% of the time during working hours, green for areas occupied less than 20% of the time during working hours). The user may also be able to generate reports based on collected monitoring data. Reports may be customizable and exportable in many formats such as pdf, doc, xls, and XML.

As user comfort is very important to the systems herein for managing environmental conditions within a structure, the monitored data includes key indicators of this metric. For example, the number of manual or personal overrides of prevailing environmental conditions associated with commissioned units or areas may be tracked over time. This includes manual changes in light levels, and manual changes in temperature, humidity, and air flow. These changes may be analyzed in the aggregate to reveal trends when all manual or personal overrides are considered over a period of time. Based on logged temperature data over a period of time, heat maps for commissioned units may be created and overheated commissioned units and under-heated commissioned units may be identified. Because temperatures in one zone may affect the temperature in adjacent zones, some zones may be over or under heated based on the temperature in adjacent zones. Analysis of logged temperature data may reveal such trends. Mathematical models may then be used to suggest changes in temperature and air flow parameters for commissioned units in order to counteract any identified negative trends.

Recording and Presenting Maintenance-Related Data

All monitoring data that relates to maintaining the system in working condition may be presented on one or more related user interfaces. In many embodiments, these UIs (presented as one or more windows, panels, or linked websites) present data such as diagnostic messages; alarms, warnings, and other events associated with commissioned units; emergency lighting activations; reports and notifications on device failures; and planned and completed device replacements. Unlike an alarm, which signifies that a device may not be operating as intended, a warning signifies that the system may be running near or outside its operating bounds (e.g. signifying a device nearing end of life, overvoltage or overcurrent circumstances). Different visual characteristics (e.g. different icons and colors) may be used to visually indicate different categories of device malfunction, such as communication failure and lack of power.

In some embodiments, when a faulty device or commissioned unit is replaced, a user with appropriate maintenance credentials may use the Central Dashboard to re-commission the device in accordance with the method depicted in FIG. 5. The replaced device may be discovered by the system and its location marked on the floor plan. Commissioning data about the device involved may be shared between system modules such as commissioning module 120 and environment manager module 110 in order to effectively re-commission a device after replacement. The process of binding a replaced device to sensors may be begun, for example, by an authorized user simply dragging and dropping an icon representing the discovered device onto icons representing one or more sensors on the digital floor plan displayed by the Central Dashboard.

System modules such as environment manager module 110 may perform system-wide or localized self-checks. The self-checks may be initiated automatically at regular intervals or manually by an authorized user. Reports and diagnostic messages may be generated by system modules or commissioned units on the health of various commissioned units or system modules, and presented on the Central Dashboard. For manually-requested self-checks, the system may provide feedback to the user on the progress of the self-check. Additionally, system modules may log and make available TCP/IP network messages related to various commissioned units.

User-Management Dashboard

The Central Dashboard may also comprise a User-Management GUI that allows an authorized user to create, edit and delete user accounts for users of the system. The user accounts may be accounts for users of the structure in question (e.g. office workers), as well as accounts for use by administrators with permissions to configure user accounts. Each user and administrator account may have an associated user ID and password for authentication purposes. In some embodiments, administrator accounts are able to configure, for example: what types of data is monitored, which users are able to view the monitored data and at what granularity, which system parameters are configurable and which users are able to alter the values of such parameters, which users receive system notifications, and which commissioned units are used for various system-level tasks (e.g. gathering monitoring data).

Aside from providing means for manually creating new user and administrative accounts, the User-Management GUI may also facilitate the creation of user accounts by importing previously existing user accounts from existing user account infrastructures (e.g. LDAP, RADIUS/active server). In some embodiments, user accounts may have an assigned role (e.g. the role of a maintenance engineer). All users assigned to a certain role may have the same level of access to information and the same level of control over various aspects of the system. For example, all users assigned the role of maintenance engineer may be allowed to view at a certain level of detail or granularity, monitored usage information (e.g. illumination levels in various locations of the building) pertinent to maintaining the system's functionality. Accordingly, a role may act as a template with certain permissions being enabled and others being disabled. Assigning roles to user accounts is consequently an efficient way to restrict users from accessing potentially sensitive information about other users' activities within the structure in question, while still allowing users to access to the appropriate types of information for performing functions related to their assigned roles.

The User-Management GUI may also allow for the creation and management of customer accounts, where administrative and user accounts are each associated with a customer account. The system may support multiple customer accounts, such that administrator accounts for each customer account may be authorized to edit user accounts associated only with its own customer account. Such an arrangement allows for the management of environmental conditions in the same physical space by separate entities. For example, the same office building may be occupied by one entity from Monday through Wednesdays and another entity on Thursdays and Fridays. Each entity may have a different customer account with user accounts associated with its own employees.

Maintenance and Reliability
Software Upgrades

System modules (e.g. environment manager module 110 or gateway module 130) may, in various embodiments, allow software upgrades of commissioned units. During various stages of the software upgrade process, devices undergoing the upgrade may not be operational. Software upgrades may be conducted on a scheduled basis, they may be started remotely using user interfaces such as the Central Dashboard, or on-site by a qualified user (e.g. field support engineer) using system tools such as the Commissioning tool. They may be conducted for select devices or on a class of devices, and the Central Dashboard may reflect on-going, scheduled and completed software upgrades for commissioned devices in the system.

During a software upgrade, the behavior of devices such as lighting devices may be different from their configured behavior prior to the upgrade. For example, commissioned lighting units involved in a software upgrade and subsequent reboot may provide a particular level of illumination (e.g. at a background level of illumination), and ignore any lighting control requests that are received. System modules involved in preparing and/or forwarding automatically or manually-generated environment control commands (e.g. environment manager module 110 or gateway module 130) to commissioned units may stop forwarding the commands to commissioned units that are presently undergoing a software upgrade. After a software upgrade has been completed, the upgraded device may, in some embodiments, return to its behavior just prior to the upgrade. In many embodiments, a software upgrade of a device does not overwrite or delete configuration parameters that were set prior to the upgrade.

In many embodiments, to protect against security breaches, only approved versions and types of firmware and computer code will be accepted by devices for upgrade purposes, and only authorized users will be able initiate software upgrades. The transmittance of upgrade-related data files may only be permitted through secure communication channels.

Reliability
Light Output Quality

In some embodiments, luminaires of different light effect (e.g. temperature and color) may be used, and the system may support lighting devices with the following specifications: Ra greater than 80; Uniformity for Task Lighting greater than 0.7; Uniformity for Background Lighting greater than 0.4; UGR (Unified Glare Rating) of 19 for office spaces, and 28 for circulation areas; and CCT of 4000K.

Network Failure

In situations where there is no network connectivity available system-wide, the system may behave in a predetermined way until network connectivity has been reestablished. For example, occupancy-based controls may be available in a limited capacity, to provide a minimum level of illumination in areas where occupancy is detected; and daylight-based control and personal controls may be unavailable. In situations where an individual luminaire or lighting unit detects that it is no longer connected to the network, it may also behave in a prescribed way. For example, it may continue to provide the same level of illumination as before the network failure was detected, and if it is switched off, it may switch to providing a minimum level of illumination if occupancy is subsequently detected in its vicinity. Such behavior ensures that even in the event of network failure, a minimum level of illumination will be present in areas that are occupied.

PoE Switch Failure

Figure 22:
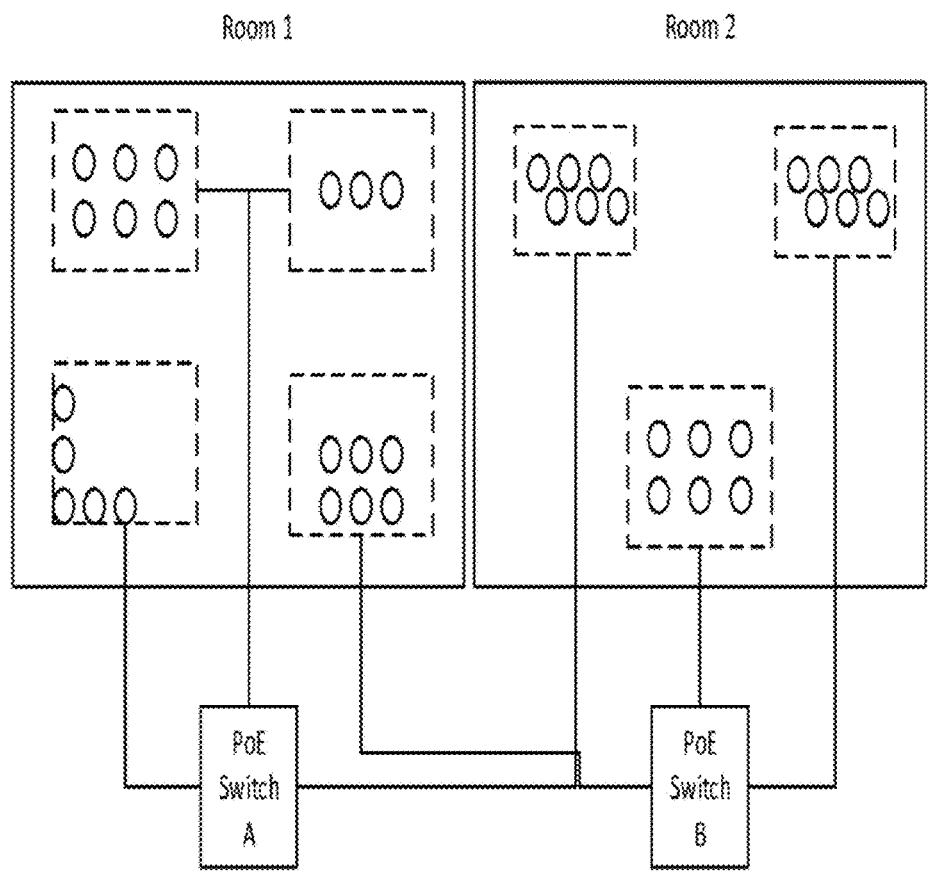
FIG. 22 illustrates an arrangement of commissioned units and associated PoE switches for reducing the visual impact of PoE switch failure, in accordance with some embodiments of a system for managing environmental conditions.

FIG. 22 depicts an arrangement of commissioned units and associated PoE switches for reducing the visual impact of PoE switch failure. In FIG. 22, two PoE switches (PoE Switch A and PoE Switch B) are shown supplying power to multiple commissioned units, identified using dotted rectangles, in two separate rooms. PoE Switch A is shown as supplying power to three commissioned units and their respective luminaires or lighting units (shown as circles within the dotted rectangles) in Room 1 and one commissioned unit and its luminaires in Room 2. PoE switch B is shown as supplying power to two commissioned units and their respective luminaires (or lighting units) in Room 2 and one commissioned unit and its luminaires (or lighting units) in Room 1. In such an arrangement, where each PoE Switch supplies power to at least one commissioned unit in each of the two rooms, neither room will be in complete darkness if one of the PoE switches fails.

Self-Diagnostics

Figure 23:
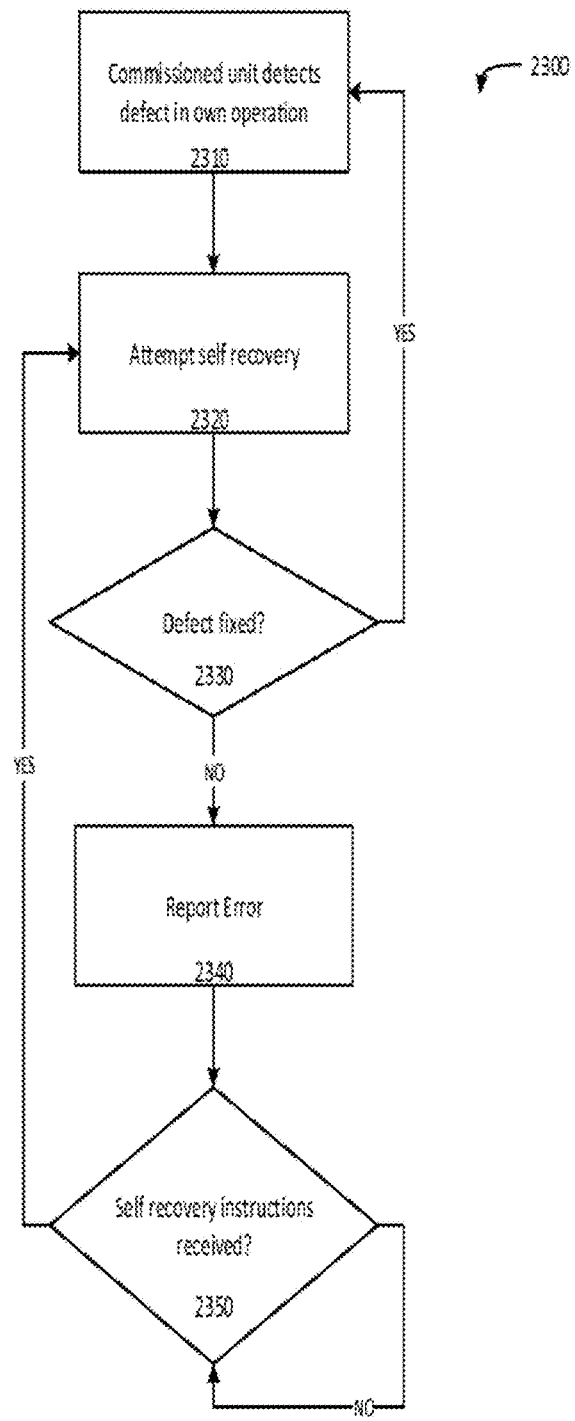
FIG. 23 illustrates a method for self-diagnosis and recovery performed by commissioned units in some embodiments of a system for managing environmental conditions.

FIG. 23 illustrates a method 2300 for self-diagnosis and recovery performed by commissioned units in some embodiments of a system for managing environmental conditions. FIG. 23 comprises steps 2310 through 2350. In some variations of the method 2300, all the depicted steps need not be performed in the order shown, one or more steps may be added to, and one or more steps may be deleted from the steps shown. In step 2710, a commissioned unit detects a defect in its own operation, with or without the aid of system modules such as gateway module 130. A defect may be the inability of the commissioned unit to respond to a requested control command when the request is within the technical bounds allowed by its specification. For example, a defect may be a luminaire (or lighting unit or light source) not being able to provide lighting at a particular level of illumination when its specification permits such a level of illumination. Once the commissioned unit has detected the defect, control transfers to step 2320. In step 2320, the commissioned unit attempt self recovery. Self recovery may involve the unit restarting itself and/or otherwise resetting itself. Some commissioned units may also be configured to attempt a series of other operations commonly known to fix operational errors if a restart or reset does not fix the defect. Once the commissioned unit has attempted self recovery, the commissioned unit proceeds to step 2330, where the commissioned unit, with or without the aid of system modules such as gateway module 130, checks to see if the detected defect is fixed. During this step, the commissioned unit may attempt to perform the same task that previously caused it to detect the defect. If the defect is fixed, the commissioned unit proceeds to function as usual and control transfers back to step 2310. In some embodiments, the commissioned unit may report the operational error to another system module such as the environment manager module 110, commissioning module 120 or gateway module 130, while also conveying the message that the commissioned unit has self-recovered from the error. Such an error report may not result in corrective action from the system modules notified, but may be used for statistical purposes (e.g. recording system-wide operational errors and how they were handled).

If the defect is not fixed, then control proceeds to step 2340 and the commissioned unit reports the error to another system module (e.g. environment manager module 110, commissioning module 120 or gateway module 130). The error report may have an urgency level associated with it, which may be set by the commissioned unit itself. The urgency level may influence how and when the module notified responds to the error. When reporting the error, the commissioned unit may also transmit information identifying itself to the module(s) it reports the error to. In response to the error report, one of the modules receiving the error report may respond by sending self-recovery instructions to the commissioned unit. The self-recovery instructions may be, for example, computer code, or information identifying the location in, one or more memories, of computer code or instructions for self-recovery. In some embodiments, a system module such as the environment manager module 110 may send a known bug fix in the form of computer code executable by the commissioned unit if the reported error relates to a known bug associated with the commissioned unit. In step 2350, the commissioned unit checks to determine if self-recovery instructions were received. If no instructions were received, control remains in step 2350, and the commissioned unit awaits receipt of such instructions or other action by an authorized system user, such as a hardware replacement. If self-recovery instructions are received, then control transfers back to step 2320, in which the commissioned unit attempts self recovery using the newly received instructions.

Figure 24:
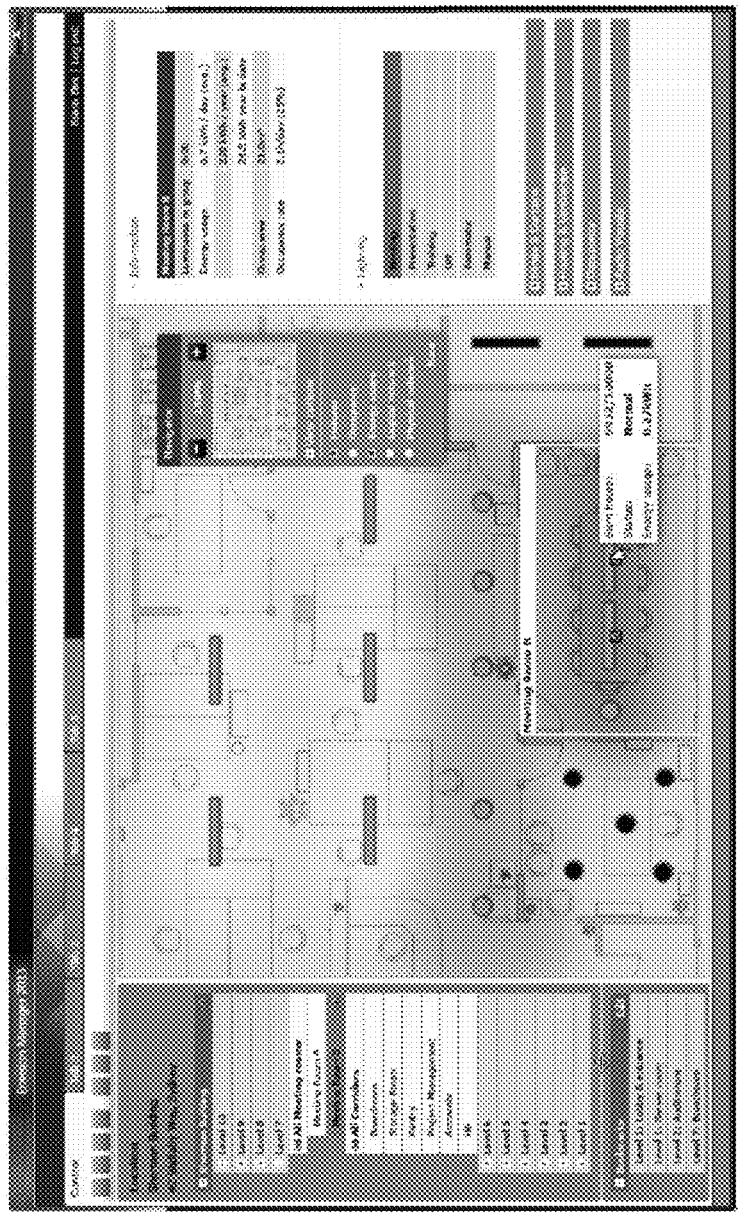
FIG. 24 illustrates an embodiment of an interactive graphical user interface displayed as a front end to an environment manager module, in accordance with some embodiments of a system for managing environmental conditions.
Figure 25:
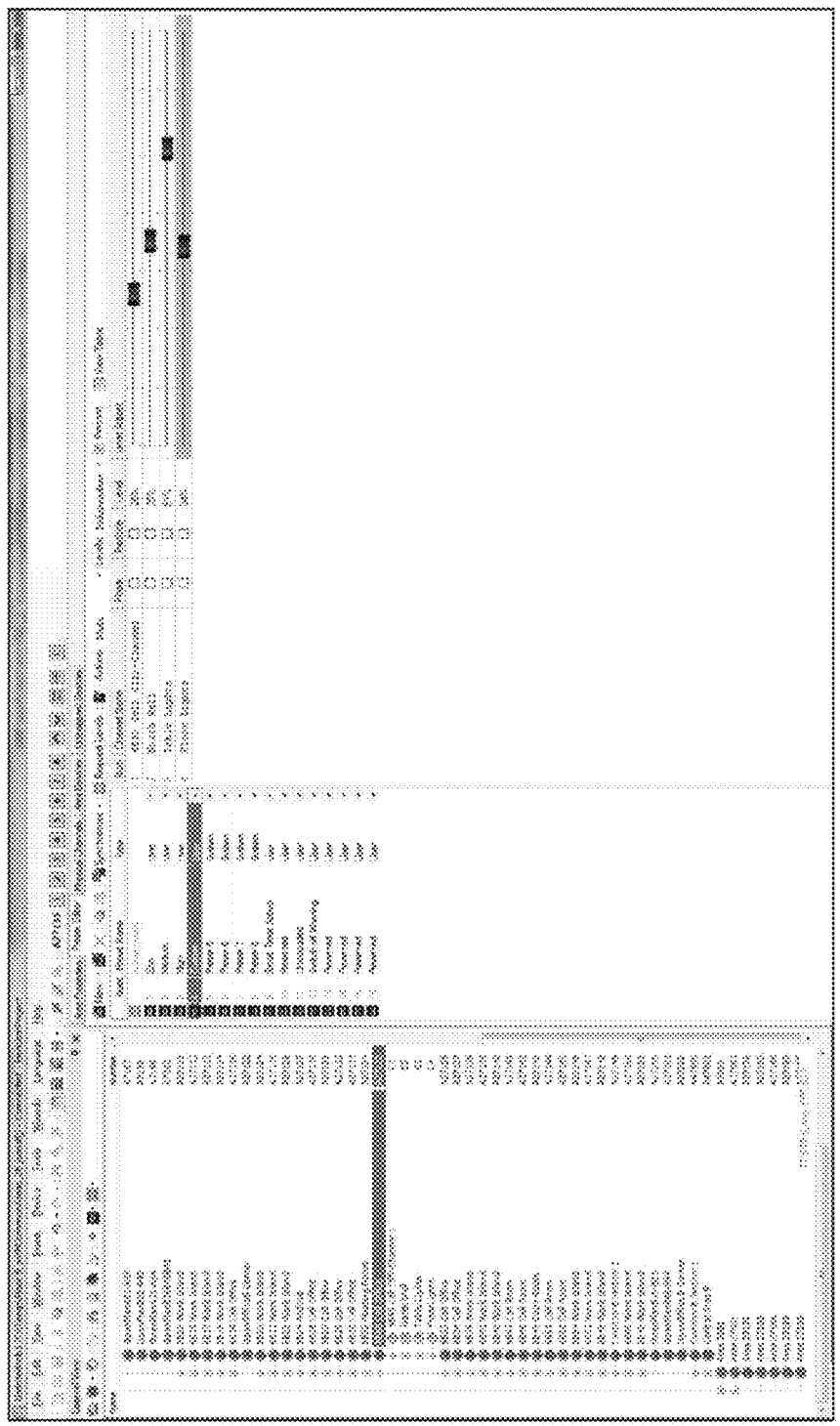
FIG. 25 illustrates an embodiment of an interactive graphical user interface displayed as a front end to a commissioning module, in accordance with some embodiments of a system for managing environmental conditions.
Figure 26:
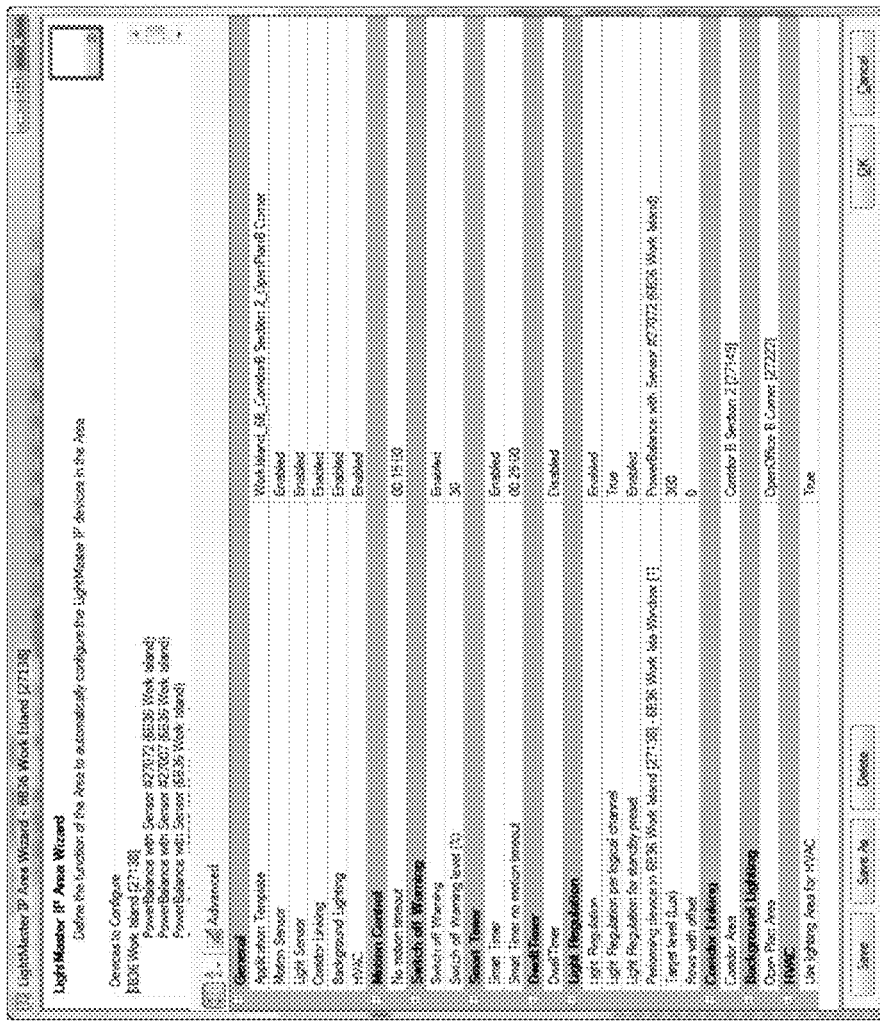
FIG. 26 illustrates an embodiment of an interactive area wizard for use as part of a front end to a commissioning module, the area wizard permitting a user to specify various parameters that together define the function(s) of an area within a physical structure.
Figure 27:
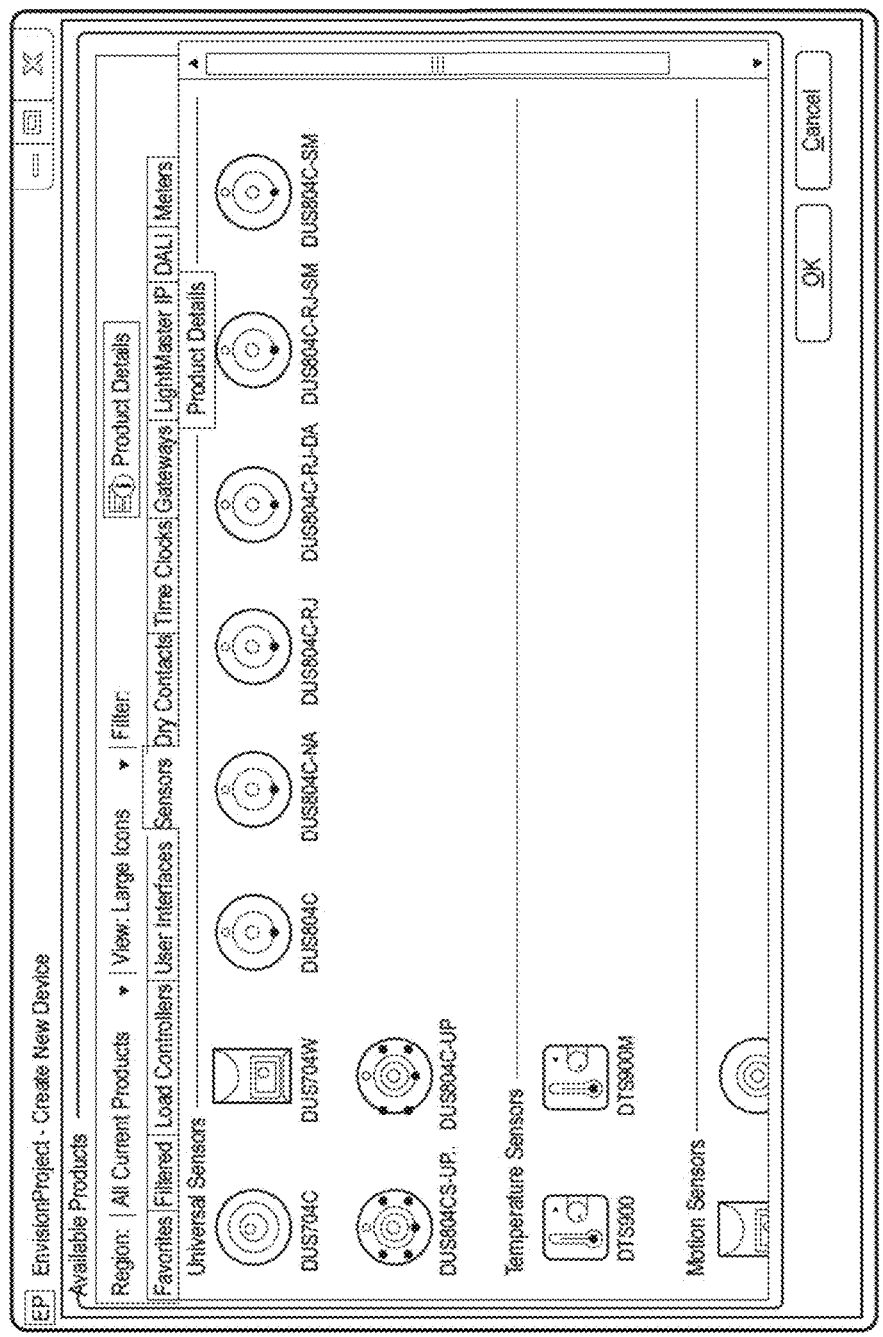
FIG. 27 illustrates an embodiment of an interactive graphical user interface for use in commissioning a new device for use in a system for managing environmental conditions.

FIG. 24 illustrates an embodiment of an interactive graphical user interface displayed as a front end to an environment manager module, in accordance with some embodiments of a system for managing environmental conditions. It depicts devices and commissioned units on an interactive floor plan and, when requested, depicts usage information (e.g. burn hours, energy usage) and status information for these devices and units. FIG. 25 illustrates an embodiment of an interactive graphical user interface displayed as a front end to a commissioning module, in accordance with some embodiments of a system for managing environmental conditions. The user interface allows a user to manually adjust, for example, light levels of various lighting units in an area such as a cell office. FIG. 26 illustrates an embodiment of an interactive area wizard for use as part of a front end to a commissioning module, the area wizard permitting a user to specify various parameters that together define the function(s) of an area within a physical structure. Information received from the user with respect to the functions(s) of an area may thereafter be used to automatically configure various devices inside the area. FIG. 27 illustrates an embodiment of an interactive graphical user interface for use in commissioning a new device (e.g. a sensor) for use in a system for managing environmental conditions.

Maintenance: Re-Commissioning and Re-Configuration of Devices

Floor Map and Hot Plugging

In some embodiments, the commissioning tool provides an interactive floor map depicting the actual physical placement of devices such as sensors, PoE switches, luminaires, area controllers and gateway modules. During hot-plugging and hot un-plugging of such devices, (e.g. placement and removal of devices while the overall system is powered and operational), the floor map may reflect, in real-time, the removal and addition of devices.

Automatic Re-Commissioning: Luminaire and Sensor Replacement

"Intelligent" luminaires and/or lighting units (hereinafter referred to generally as "lighting units") may include a controller, memory, and/or in some instances may also include one or more sensors configured to detect various stimuli. In environments in which multiple intelligent lighting units are deployed, each lighting unit may be configured and/or commissioned to operate in a particular way in order to fulfill a particular role. For example, two lighting units may output light having disparate properties that are selected to complement one another in a particular way. If one of those lighting units is rendered inoperative, light emitted by the remaining lighting unit may no longer be suitable. To replace an inoperative intelligent lighting unit that previously played a particular role, the replacement intelligent lighting unit may be commissioned to perform the same role as the replaced lighting unit. Manually commissioning replacement lighting units can be cumbersome and/or impractical, especially in large installations. Utilizing a central backup server to automate the process of commissioning replacement lights may introduce various challenges, such as single point of failure, sophisticated and/or arduous maintenance, and/or increased potential exposure to cyberattacks. Accordingly, there is a need in the art to facilitate automatic commissioning of replacement intelligent lighting units without relying on the use of a central server or other forms of centralized control. In view of the foregoing, various embodiments and implementations of the present disclosure are directed to automatic and decentralized commissioning of replacement lighting units.

Referring back to FIG. 1, in some embodiments, control module 140-3, 150-3 of each IP luminaire/lighting unit 140, 150 may be configured to, e.g., by way of executing microcode in memory (not depicted), automatically commission itself into the system. For example, in some embodiments, when a lighting unit 140, 150 is used to replace an inoperative lighting unit of system 100A, a control module (or "controller") of the replacement lighting unit may be configured to request and obtain, from one or more lighting units (e.g., 140, 150) already installed in system 100A over one or more communication networks, one or more identifiers associated with the one or more remote lighting units (e.g., 140, 150). The replacement lighting unit's controller may also be configured to obtain, from each of the one or more remote lighting units (e.g., 140, 150) over the one or more communication networks, lighting operation parameters associated with at least one other remote lighting unit. Then, the controller of the replacement lighting unit may be configured to selectively energize one or more of its light sources in accordance with the lighting operation parameters associated with an inoperative lighting unit. In this manner, the replacement lighting unit is able to automatically commission itself using information provided by other lighting units (e.g., 140, 150) that in turn do not need to be aware of each other's current operational statuses.

Semi-Automatic Re-Commissioning:

In many embodiments, when a lighting system controller or actuator device is replaced (sensor, luminaire, control UI, area controller), an authorized system user (e.g. commissioning engineer) may need to commission and configure the device to enable proper functioning. In many cases, this may be achieved using the commissioning tool. In some instances, when a commissioned unit is replaced, a system module such as the environment manager module 110 or gateway module 130 may discover the device on the network and present the device for commissioning on the commissioning tool.

Localizing a replaced device may be performed automatically, or semi-automatically, where an authorized user (e.g. commissioning engineer) is asked for confirmation of a successful localization. In case a single device is replaced in the system, the commissioning module may automatically re-configure the device with the configuration details of the malfunctioning one it replaced. An authorized user may also be able to request the latest version of the configuration data associated with the replaced device using, for example, the Central Dashboard.

Manual Re-Commissioning

An authorized user may use the Central Dashboard to manually re-commission commissioned units, and to re-configure parameters of selected commissioned units. For example, a user may select devices for adding to a commissioned unit or split a commissioned unit into sub-units, and specify various parameters used to control the behavior of the new commissioned unit(s).

Emergency Mode and Lighting

In situations where there is a power outage, or an un-switched mains line is switched off, the system may activate a system-wide emergency mode. During the emergency mode, commissioned units may not react to any daylight-based or occupancy-based controls, or to any control requests from individual users. In various embodiments, emergency luminaires or lighting units dispersed throughout the structure may be activated to produce sufficient light for purposes such as building evacuation. Such emergency luminaires may each have one or more indicator LEDs, with various light states indicating related system states. For example, a permanent green light may indicate that the system is functioning as required; a blinking green light may indicate that the system is performing a function or duration test; and a blinking red light with a four blink period may indicate battery failure.

Energy Usage: Green Power Down

While PoE comes with the benefit of convenience, it may also come at the cost of increased energy usage, particularly where PoE components (e.g., switches, occupancy sensors, luminaires, etc.) remain powered even when not in use. Accordingly, in various embodiments, various PoE components may implement what is referred to herein as a "Green Power Down" sequence in which the PoE components are switched off when a particular area or set of area's (where the PoE components may or may not be located) is vacated for a certain amount of time. Other PoE components, such as occupancy sensors, may remain powered. When occupancy is detected in the particular area, the PoE components that were switched off may be powered on once again.

In some embodiments, PoE components in an environment may be powered down in a cascading manner. For example, in some embodiments, a "parent" area of an environment may be defined. For instance, for a floor of an office building, the area around the elevators may be defined as a parent area. If the rest of the floor is vacated (e.g., occupancy not detected by any sensors on the rest of the floor for a predetermined time interval), and no occupancy is detected in the parent area for a predetermined amount of time, PoE components in the child area(s) may be powered down. In some embodiments, one or more PoE components in the parent area, such as one or more PoE occupancy sensors, remain powered in order to detect occupancy in the future. If occupancy is detected in the parent area, the PoE ports that were switched off elsewhere on the floor may be powered on once again.

In some embodiments, PoE components may be powered down using various communication protocols, such as Simple Network Management Protocol ("SNMP"). For example, and referring back to FIG. 3A, area controller 320 may issue SNMP commands to PoE switches 330 and 340 (referred to as "power supplies" in FIG. 3A) to cause the various luminaires 350-1 through 350-4 and 360-1 through 360-4 to be powered down. In some embodiments, area controller 320 may maintain, for each PoE component (e.g., 350-1 through 350-4, 360-1 through 360-4), a specific part of an object identifier for the component, a value to send (e.g., on or off), and/or a device identifier, e.g., so that area controller 320 may perform metric collection for PoE devices. Metric collection can then be stopped for devices that are powered down.

Figure 30:
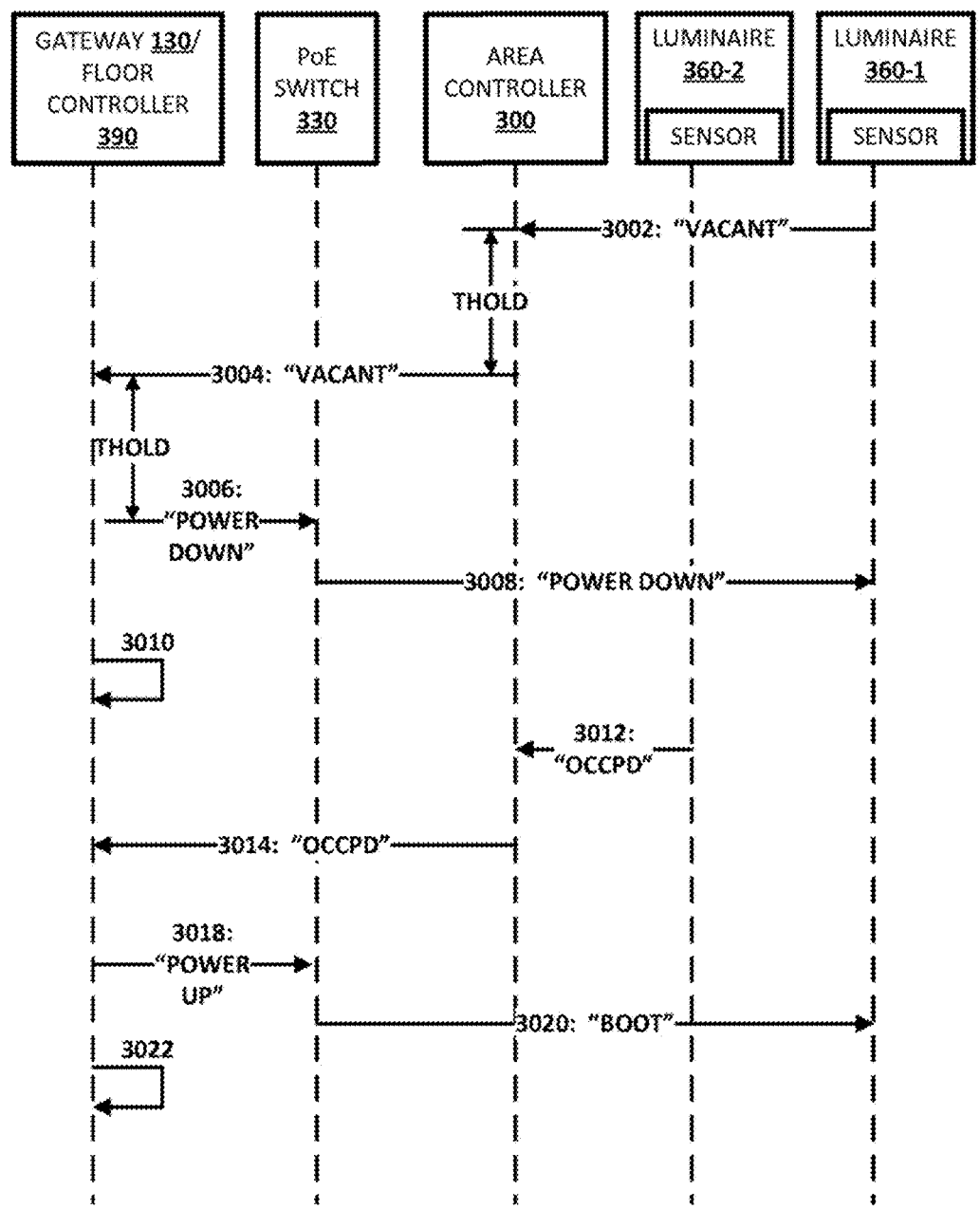
FIG. 30 depicts example communications that may be exchanged between various components as part of a so-called "green power down" routine, in accordance with various embodiments.

FIG. 30 depicts example communications that may be exchanged between a gateway module 130 and/or floor controller 390 (see FIG. 3B; in some embodiments, gateway module 130 may act as a floor controller 390), a PoE switch 330 (see FIGS. 3A-B), an area controller 320 (see FIGS. 3A-B), and two or more luminaires, such as luminaires 360-1 360-2 (see FIGS. 3A-B, both including integral presence sensors), as part of an example "Green Power Down" sequence. For this example, it may assumed at the outset that both PoE luminaires 360-1 and 360-2 are currently in a powered-up state. It may also be assumed that luminaire 360-2 is "always on," e.g., because it resides in a parent (e.g., common) area, and that luminaire 360-1 is not "always on" because it resides in a child area.

Communications 3002-3010 demonstrate what may occur during a green power down. At 3002, luminaire 360-1 may transmit a "VACANT" communication to area controller 300, e.g., to indicate that its integrated sensor has not detected occupancy for a predetermined time interval. After waiting a threshold (e.g., user-selected) time interval during which no "OCCUPIED" communications are received from any luminaires in the same area as luminaire 360-1, at 3004, area controller 300 may transmit a "VACANT" communication to gateway 130 and/or floor controller 390. Gateway module 130 and/or floor controller 390 likewise may wait for a threshold (e.g., user-selected) time interval during which no "OCCUPIED" communications are received from any area controller, such as area controller 330. Then, at 3006, gateway module 130 and/or floor controller 390 may transmit, to PoE switch 330, a "POWER DOWN" command. PoE switch 330 may then power down one or more of its ports as specified in the power down command, effectively stopping power from being supplied to luminaire 360-1, as indicated at 3008. It should be understood that in some embodiments, PoE switch 330 might not actually send a "power down" command to luminaire 360-1 as indicated at 3008, but instead may simply stop supplying power. As noted above, luminaire 360-2 may remain energized so that it can use its incorporated sensor to detect future occupancy.

At 3010, gateway module 130 may cease metric collection and/or roll calls of unpowered components.

Communications 3012-3022 demonstrate what may occur during a so-called "green power up." At 3012, luminaire 360-2 (which as noted above remains powered and thus able to detect occupancy) may transmit an "OCCUPIED" ("OCPD" in FIG. 30) communication to area controller 300, e.g., to indicate that its sensor has detected occupancy. At 3014, area controller 300 may transmit an "OCCUPIED" communication to gateway 130 and/or floor controller 390. At 3018, gateway module 130 and/or floor controller 390 may transmit, to PoE switch 330, a "POWER UP" command. At 3020, PoE switch 330 may then power up its ports, effectively booting luminaire 360-1. Similar to above, it should be understood that in some embodiments, PoE switch 330 might not actually send a "boot" command to luminaire 360-1 as indicated at 3020, but instead may simply start supplying power. At 3022, gateway module 130 and/or floor controller 390 may resume metric collection and/or roll calls of unpowered components.

In some embodiments, a particular luminaire may act as a master luminaire for its area, e.g., to resolve inconsistencies among a cluster of luminaires in the area. For example, in FIG. 30, luminaire 360-2 may act as a master luminaire for an area that also contains luminaires 360-1, 360-3, and 360-4 (see FIG. 3A). Each luminaire in the same area as luminaire 360-2 may be configured to request a state of the area after powering up. Only a master luminaire like luminaire 360-2 may respond to this request. In this manner, it can be ensured that all luminaires in an area are powered up consistently. If the master luminaire happens to be the last luminaire to be powered up, it may request the area state from itself, and then respond to its own request.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims between parentheses are provided merely for convenience in line with European patent practice and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

We claim:

1. A system for managing environmental conditions, the system comprising:
   a commissioned unit configured to:
   receive one or more signals comprising an environmental control request from a controller in communication with the commissioned unit, said environmental control request having a first priority level;
   determine whether the commissioned unit in communication with the controller is enabled to carry out the environmental control request;
   determine whether there is a competing environmental control request having a second priority level;
   compare the first priority level and the second priority level;
   adjust, if the first priority level is higher than the second priority level, an environmental condition based on the environmental control request; and,
   adjust, if the second priority level is higher than the first priority level, the environmental condition based on the competing environmental control request,
   wherein the commissioned unit is further configured to ignore the received environmental control request when the second priority level is higher than the first priority level and to adjust the environmental condition based on the ignored received environmental control request after an amount of time has elapsed.

2. The system of claim 1, wherein the environmental condition comprises light level, temperature, or humidity.

3. The system of claim 1, wherein the commissioned unit is further configured to adjust the environmental condition based on the competing environmental control request after the elapsed amount of time and within a retention period.

4. The system of claim 1, wherein the environmental control request comprises a request by a user to change an environmental condition.

5. The system of claim 1, wherein the environmental control request is generated based on a detected change in occupancy within a physical structure.

6. The system of claim 1, wherein the environmental control request is generated based on a detected change in daylight within a physical structure.

7. The system of claim 1, wherein the competing environmental control request comprises a request by a user.

8. The system of claim 1, wherein the commissioned unit is further configured to be controlled manually by a user.

* * * * *